US008788334B2

(12) United States Patent
Rose et al.

(10) Patent No.: US 8,788,334 B2
(45) Date of Patent: Jul. 22, 2014

(54) ONLINE MARKETING PLATFORM

(75) Inventors: Robert Rose, San Diego, CA (US);
Nichole Goodyear, San Diego, CA
(US); Camille Matthews, Silverdale,
WA (US); Jeremy Wiles, San Diego, CA
(US); Mark Seaman, San Diego, CA
(US); Brian Douglas Derfer, San Diego,
CA (US); Kevin Rollins, Denton, TX
(US); Kelvin Hung, San Diego, CA
(US); Gina Paoni, LaJolla, CA (US)

(73) Assignee: Social Mecca, Inc., Franklin Park, IL
(US)

( * ) Notice: Subject to any disclaimer, the term of this
patent is extended or adjusted under 35
U.S.C. 154(b) by 1259 days.

(21) Appl. No.: 11/893,765

(22) Filed: Aug. 17, 2007

(65) Prior Publication Data
US 2008/0313011 A1 Dec. 18, 2008

Related U.S. Application Data

(60) Provisional application No. 60/944,467, filed on Jun. 15, 2007, provisional application No. 60/958,219, filed on Jul. 3, 2007, provisional application No. 60/961,899, filed on Jul. 24, 2007, provisional application No. 60/962,184, filed on Jul. 27, 2007.

(51) Int. Cl.
G06Q 30/00 (2012.01)
(52) U.S. Cl.
USPC .......................................................... 705/14.4
(58) Field of Classification Search
None
See application file for complete search history.

(56) References Cited

U.S. PATENT DOCUMENTS 6,233,618 B1 5/2001 Shannon 6,578,008 B1 6/2003 Chacker
(Continued)

FOREIGN PATENT DOCUMENTS

WO 2009/006551 A3 12/2009
WO 2010/065032 A1 6/2010

OTHER PUBLICATIONS

International Search Report for International Application PCT/US2008/069093,. Report completed Aug. 23, 2008, mailed Sep. 3, 2008, 3 pgs.

(Continued)

Primary Examiner — Matthew T Sittner
(74) Attorney, Agent, or Firm — Barnes & Thornburg LLP

(57) ABSTRACT

Online marketing platforms are disclosed that harness user generated content to encourage the viral sharing and tracking of online marketing campaigns. One embodiment includes a campaign hosting system including a database connected to a network, a campaign creation device connected to the network and a plurality of user devices connected to the network. In addition, the campaign creation device is configured to provide campaign information to the campaign hosting system via the network, the campaign hosting system is configured to automatically create an online campaign that is customized according to the campaign information and to store the campaign as one of a plurality of online campaigns in the database, at least one of the user devices is configured to provide profile information to the campaign hosting system via the network, the campaign hosting system is configured to automatically create a user profile using the profile information and to store the user profile as one of a plurality of user profiles in the database, each user device is configured to engage with the online campaign by communicating with the campaign hosting system via the network and each user device is configured to access the user profile by communicating with the campaign hosting system via the network.

53 Claims, 54 Drawing Sheets

(56) References Cited

U.S. PATENT DOCUMENTS

| | | | |
|---|---|---|---|
| 6,631,404 | B1 | 10/2003 | Philyaw |
| 6,739,508 | B2 | 5/2004 | Ushioda et al. |
| 6,874,024 | B2 | 3/2005 | Cohen et al. |
| 7,020,635 | B2 | 3/2006 | Hamilton et al. |
| 7,020,781 | B1 | 3/2006 | Saw et al. |
| 7,035,926 | B1 | 4/2006 | Cohen et al. |
| 7,162,433 | B1 | 1/2007 | Foroutan |
| 7,353,239 | B2 | 4/2008 | Allard |
| 7,526,545 | B2 | 4/2009 | Jerome |
| 7,574,364 | B2 | 8/2009 | Hasegawa et al. |
| 7,640,181 | B2 | 12/2009 | McClure et al. |
| 7,703,611 | B1 | 4/2010 | Appelman et al. |
| 7,783,622 | B1 | 8/2010 | Vandermolen et al. |
| 8,359,276 | B2 * | 1/2013 | Zhuang et al. ............... 705/319 |
| 2002/0062393 | A1 * | 5/2002 | Borger et al. ............... 709/246 |
| 2002/0120501 | A1 | 8/2002 | Bell et al. |
| 2002/0147645 | A1 * | 10/2002 | Alao et al. ............... 705/14 |
| 2002/0198933 | A1 | 12/2002 | Kwak |
| 2003/0032409 | A1 * | 2/2003 | Hutcheson et al. ............ 455/414 |
| 2003/0171990 | A1 * | 9/2003 | Rao et al. ............... 705/14 |
| 2004/0015401 | A1 | 1/2004 | Lee et al. |
| 2004/0024643 | A1 | 2/2004 | Pollock et al. |
| 2004/0034559 | A1 | 2/2004 | Harris et al. |
| 2004/0244029 | A1 * | 12/2004 | Gross ............... 725/9 |
| 2005/0044413 | A1 | 2/2005 | Elms et al. |
| 2005/0071218 | A1 | 3/2005 | Lin et al. |
| 2005/0108107 | A1 * | 5/2005 | Grayson et al. ............... 705/26 |
| 2005/0216300 | A1 * | 9/2005 | Appelman et al. ............... 705/1 |
| 2006/0004627 | A1 * | 1/2006 | Baluja ............... 705/14 |
| 2006/0074751 | A1 | 4/2006 | Kline et al. |
| 2006/0282283 | A1 * | 12/2006 | Monahan ............... 705/1 |
| 2006/0282336 | A1 | 12/2006 | Huang |
| 2007/0027762 | A1 * | 2/2007 | Collins et al. ............... 705/14 |
| 2007/0033105 | A1 * | 2/2007 | Collins et al. ............... 705/14 |
| 2007/0067297 | A1 * | 3/2007 | Kublickis ............... 707/9 |
| 2007/0094076 | A1 * | 4/2007 | Perkowski et al. ............... 705/14 |
| 2007/0106551 | A1 * | 5/2007 | McGucken ............... 705/10 |
| 2007/0143750 | A1 | 6/2007 | Varela et al. |
| 2007/0162761 | A1 * | 7/2007 | Davis et al. ............... 713/182 |
| 2007/0168216 | A1 * | 7/2007 | Lemelson ............... 705/1 |
| 2007/0180468 | A1 | 8/2007 | Gill et al. |
| 2007/0191040 | A1 | 8/2007 | Kadar et al. |
| 2007/0192863 | A1 | 8/2007 | Kapoor et al. |
| 2007/0233564 | A1 | 10/2007 | Arnold |
| 2007/0244634 | A1 | 10/2007 | Koch et al. |
| 2007/0265915 | A1 * | 11/2007 | Gould et al. ............... 705/14 |
| 2008/0070209 | A1 * | 3/2008 | Zhuang et al. ............... 434/236 |
| 2008/0082381 | A1 * | 4/2008 | Muller et al. ............... 705/7 |
| 2008/0091555 | A1 * | 4/2008 | Heather et al. ............... 705/26 |
| 2008/0109296 | A1 * | 5/2008 | Leach et al. ............... 705/10 |
| 2008/0133488 | A1 | 6/2008 | Bandaru et al. |
| 2008/0140786 | A1 * | 6/2008 | Tran ............... 709/206 |
| 2008/0167947 | A1 * | 7/2008 | Skinner et al. ............... 705/10 |
| 2008/0172288 | A1 * | 7/2008 | Pilskalns et al. ............... 705/10 |
| 2008/0201218 | A1 * | 8/2008 | Broder et al. ............... 705/14 |
| 2008/0244038 | A1 | 10/2008 | Martinez |
| 2008/0256233 | A1 | 10/2008 | Hall et al. |
| 2008/0262908 | A1 | 10/2008 | Broady et al. |
| 2008/0270223 | A1 * | 10/2008 | Collins et al. ............... 705/10 |
| 2008/0320075 | A1 | 12/2008 | Livshits et al. |
| 2009/0043654 | A1 * | 2/2009 | Bates ............... 705/14 |
| 2009/0064005 | A1 | 3/2009 | Cunningham et al. |
| 2009/0119173 | A1 * | 5/2009 | Parsons et al. ............... 705/14 |
| 2009/0125391 | A1 | 5/2009 | Toutonghi |
| 2009/0164271 | A1 | 6/2009 | Johnson et al. |
| 2010/0042499 | A1 | 2/2010 | Barton |
| 2010/0094713 | A1 * | 4/2010 | Wax ............... 705/14.69 |
| 2011/0251970 | A1 * | 10/2011 | Oien et al. ............... 705/319 |

OTHER PUBLICATIONS

Written Opinion for International Application PCT/US2008/069093, Opinion completed Aug. 23, 2008, mailed Sep. 3, 2008, 6 pgs.

Zooppa.com, http://www.zooppa.com/corporate/press_releases/zooppa-com-advertising-goes-social, printed from the World Wide Web on Mar. 5, 2008, 3 pages.

Votigo.com, http://web.archive.org/web/20070202023933/http://votigo.com/, retrieved from Archive.org, printed from the World Wide Web on Mar. 5, 2008, 1 page.

Votigo.com, http://web.archive.org/web/20070206165655/http://votigo.com/, retrieved from Archive.org, printed from the World Wide Web on Mar. 5, 2008, 2 pages.

Moe's Southwest Grill, http://www.moes.sharkle.com/index.html, printed from the World Wide Web on Mar. 5, 2008, 1 page.

Moe's Southwest Grill, "Moe's Southwest Grill Video Contest—Official Rules", http://www.moes.sharkle.com/rules.html, printed from the World Wide Web on Mar. 5, 2008, 2 pages.

ViTrue, Inc., "Moe's Southwest Grill Partners with ViTrue, Inc. to Launch User-Created Advertising Campaign", dated Jun. 20, 2006, 3 pages.

Tapatap.com, http://www.tapatap.com/tapatap-userweb2/contests_index.htm?offset=1360&bpld=3&bdld . . . , printed from the World Wide Web on Mar. 5, 2008, 4 pages.

Shycast.com, "Rules Summary", http://www.shycast.com/rules/ikea, printed from the World Wide Web on Mar. 5, 2008, 3 pages.

Arrington et al., "Shycast: Social Network for People & Brands—Post and Comments", http://www.techcrunch.com/2007/01/17/shycast-social-network-for-people-brands/, printed from the World Wide Web on Mar. 5, 2008, 10 pages.

Kjeldsen et al., "Bix sees green in online contests—Post and Comments", dated Jul. 17, 2006, http://www.techcrunch.com/2006/07/17/bix-sees-green-in-online-contests/, printed from the World Wide Web on Mar. 5, 2008, 9 pages.

Kirkpatrick, Techcrunch.com, "Bix Posts", http://www.techcrunch.com/tag/bix/, printed from the World Wide Web on Mar. 5, 2008, 4 pages.

Rollmio.com, "What is rollmio", http://rollmio.com/nodes/view/whats, dated Aug. 8, 2007, printed from the World Wide Web on Apr. 23, 2008, 3 pages.

VMIX.com, "Official Rules—VMIX.com—JVC Create Our Commercial Contest", http://www.vmix.com/promos/jvc/rules.php, printed from the World Wide Web on Mar. 5, 2008, 1 page.

VMIX.com, "VMIX Past Online Contests and Sweepstakes", http://www.vmix.com/contests-past.php, printed from the World Wide Web on Mar. 5, 2008, 2 pages.

VMIX, "Enter the JVC "Create Our Commercial" Online Video Contest for free at VMIX.com!", http://www.vmix.com/jvc.php, printed from the World Wide Web on Mar. 5, 2008, 1 page.

Beaumont, "Napoleon Dynamite Dance Off Challenge!", http://blogcritics.org/archives/2006/05/04/032537.php, printed from the World Wide Web on Mar. 5, 2008, 3 pages.

PR Newswire Association LLC, "Do You Have the Hottest Dad in America?", http://www.prnewswire.com/cgi-bin/stories.pl?ACCT=104&STORY=/www/story/04-24-20 . . . , printed from the World Wide Web on Mar. 5, 2008, 2 pages.

The ARF, "Engagement: Definitions and Anatomy", dated Mar. 21, 2006, 21 pages.

Cramphorn et al., "Global Advertising that Sells—Progressing Towards the Holy Grail!", Part 5 / Can Advertising Travel?, Congress 2005, ESOMAR 2005, 10 pages.

International Search Report for International Application No. PCT/US2008/069223, Report completed Aug. 27, 2008, mailed Sep. 3, 2008, 3 pgs.

Written Opinion for International Application No. PCT/US2008/069223, Opinion completed Aug. 28, 2008, mailed Sep. 3, 2008, 5 pgs.

International Search Report for International Application PCT/US2008/069264 filed Jul. 3, 2008, Report completed Oct. 24, 2008, mailed Nov. 3, 2008, 3 pgs.

Written Opinion of the International Searching Authority for International Application PCT/US2008/069264 filed Jul. 3, 2008, Opinion completed Oct. 24, 2008, mailed Nov. 3, 2008, 4 pgs.

(56) References Cited

OTHER PUBLICATIONS

International Search Report for International Application No. PCT/US2008/069097, International Filing Date Jul. 2, 2008, Report completed Sep. 26, 2008, mailed Oct. 8, 2008, 2 pgs.

Written Opinion for International Application No. PCT/US2008/069097, filed Jul. 2, 2008, Opinion completed Sep. 26, 2008, mailed Oct. 8, 2008, 4 pgs.

Office Action issued in U.S. App. No. 12/497,916, 44 pgs., (Jan. 16, 2014).

* cited by examiner

Detailed View: Currently Analyzing for dates: May 30, 2007 to June 15, 2007

VIEW SUMMARY

Brickfish provides users with tools that allow them to post content from your campaign to other websites. This section provides a summary of where the views from this campaign are coming from across the internet.

Campaign Views

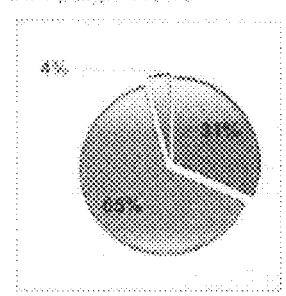

| Breakout of Total Views: | % of Total Views | # of Total Views |
|---|---|---|
| Members | 31.29 | 23,833 |
| Visitors | 64.56 | 49,182 |
| Across the Internet | 4.15 | 3,162 |

Key:
Members: Brickfish.com views that came from members of Brickfish.
Visitors: Brickfish.com views that came from non-members.
Across the Internet: Views that came from other websites using our propagation tools.

| Across the Internet: Breakout of Websites | Auto- Propagated Views | Manually Propagated Views | Total Offsite Views | % of Total Views | Total Clicks | Total Posts |
|---|---|---|---|---|---|---|
| myspace | 330 | 2,203 | 2,533 | 3.33 | 399 | 1,251 |
| Other Sites | 0 | 629 | 629 | 0.83 | 15 | 24 |
| komspace | 0 | 333 | 333 | 0.44 | 6 | 6 |
| brickfish | 0 | 36 | 36 | 0.05 | 0 | 2 |
| melodramatic | 0 | 34 | 34 | 0.04 | 0 | 13 |
| vampirefreaks | 0 | 3 | 3 | 0.00 | 0 | 2 |
| xook | 0 | 2 | 2 | 0.00 | 0 | 1 |
| All Other Sites/Undetermined | 0 | 221 | 221 | 0.29 | 0 | 1 |

CAMPAIGN ENGAGEMENT AVERAGES

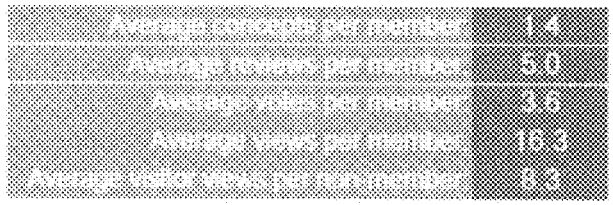

*FIG. 14F*

| | | | | | | |
|---|---|---|---|---|---|---|
| comment.myspace.com | 1 | 29 | 30 | 0.02 | 2 | 21 |
| editprofile.myspace.com | 0 | 17 | 17 | 0.01 | 0 | 17 |
| events.myspace.com | 0 | 13 | 13 | 0.01 | 0 | 12 |
| messaging.myspace.com | 0 | 2 | 2 | 0.00 | 10 | 2 |
| Other Sites | 37 | 2,785 | 2,822 | 1.81 | 89 | 160 |
| komspace | 0 | 1,782 | 1,782 | 1.14 | 37 | 14 |
| lj-toys | 0 | 221 | 221 | 0.14 | 2 | 76 |
| melodramatic | 0 | 173 | 173 | 0.11 | 1 | 29 |
| bookofmatches | 0 | 27 | 27 | 0.02 | 0 | 20 |
| anvyl | 0 | 23 | 23 | 0.01 | 1 | 3 |
| All Other Sites/Undetermined | 37 | 559 | 596 | 0.38 | 48 | 18 |

| | | | | | |
|---|---|---|---|---|---|
| tour poster.jpg | | 4 (1 auto posts) | blogger, myspace, undetermined | 113 | 1.55 |
| Family Values Poster C... | | 4 (1 auto posts) | myspace, undetermined | 32 | 0.44 |
| Family Values Tour 200... | | 4 (0 auto posts) | brickfish, korespace, myspace, undetermined | 424 | 5.80 |
| Family Values 2007!!! | | 4 (0 auto posts) | myspace, undetermined | 288 | 3.94 |
| family values family | | 4 (0 auto posts) | melodramatic, myspace, ranchaficionado, undetermined | 187 | 2.56 |
| poster family values.jpg | | 4 (0 auto posts) | stunnel, myspace, undetermined, vtunnel | 133 | 1.82 |
| FAMILY VALUES 2007 - 2 | | 4 (0 auto posts) | melodramatic, myspace, undetermined | 86 | 1.18 |
| 2.man | | 4 (0 auto posts) | myspace, tagged, undetermined, xanga | 47 | 0.64 |
| familyvalues-flyer.jpg | | 3 (0 auto posts) | ij-toys, myspace, undetermined | 238 | 3.26 |
| 126732394_be463e890-4.jpg | | 3 (0 auto posts) | myspace, undetermined | 194 | 2.65 |

*FIG. 15D*

```
<html xmlns="http://www.w3.org/1999/xhtml" >
<head>
    <title>VOSSGPure</title>
</head>
<body>
    <div><img src="/images/Main_02.gif" /></div>
    <div>
        <iframe src="http://www.brickfish.com/music/wetheliving?cpn=music" width="1024" height="800">
        </iframe>
    </div>
</body>
</html>
```

Moderation Status Report

| Category | Campaign ID | Campaign Name | Total Concepts | Total Approved | Total Flagged | Total Not Approved | Blog | Photo | Audio | Album | Video | Hours Since Moderation | Moderated By |
|---|---|---|---|---|---|---|---|---|---|---|---|---|---|
| Lifestyles | 95 | Test Campaign 1 | 19 | 4 | 3 | 15 | 1 | 10 | 1 | 0 | 3 | 96 | bricklayer |
| Lifestyles | 104 | Test Campaign 10 | 25 | 22 | 0 | 3 | 0 | 3 | 0 | 0 | 0 | 5 | bricklayer |
| Lifestyles | 194 | Test Campaign 100 | 1 | 0 | 0 | 1 | 0 | 1 | 1 | 0 | 0 | | |
| TOTALS: | | | 45 | 26 | 3 | 19 | 1 | 14 | 1 | 0 | 3 | | |
| PERCENT OF TOTAL: | | | 100.00 | 57.78 | 6.67 | 100.00 | 5.26 | 73.68 | 5.26 | 0.00 | 15.79 | | |

NOT APPROVED

ONLINE MARKETING PLATFORM

CROSS-REFERENCE TO RELATED APPLICATIONS

The present invention claims priority to U.S. Provisional Application Ser. No. 60/944,467 entitled "Online Content Marketing Platform" to Rose et al., filed Jun. 15, 2007, U.S. Provisional Patent Application Ser. No. 60/958,219 entitled "Online Content Marketing Platform" to Rose et al., filed on Jul. 3, 2007, U.S. Provisional Application Ser. No. 60/961,899 entitled "Content Distribution System Including Cost-Per-Engagement Based Advertising" to Rose et al., filed Jul. 24, 2007, and U.S. Provisional Application Ser. No. 60/962,184 entitled "System and Method for Voting in Online Competitions" to Rose et al., filed Jul. 27, 2007, the disclosure of which is expressly incorporated by reference herein in its entirety. The present application is also related to the U.S. patent application entitled "Content Distribution System Including Cost-Per-Engagement Based Advertising" to Rose et al., filed Aug. 17, 2007 and the U.S. patent application entitled "System and Method for Voting in Online Competitions" to Rose et al., filed Aug. 17, 2007, the disclosure of which is also expressly incorporated by reference herein in its entirety.

BACKGROUND

The present invention relates generally to online marketing and more specifically to online marketing platforms that facilitate consumer interaction and response through viral content creation and sharing.

Marketing via television and radio has traditionally involved purchasing blocks of advertising time during a program, sponsoring a program or arranging for product placement during a program. The cost of each of these options is often determined by the size of the program's audience.

The Internet has provided a new distribution channel on which consumers are spending increasing amounts of time. An approach similar to that used with television and radio was initially used when structuring marketing arrangements involving the Internet. Many early Internet marketing campaigns involved payment for advertisements on a cost per thousand impressions (CPM) basis, which is effectively basing payment on the size of the audience for a particular web page.

The Internet, unlike television and radio, enables the direct measurement of responses to advertisements placed on web pages. Therefore, marketing arrangements involving the Internet have grown to include in addition to CPM, the more quantifiable cost-per-click (CPC) basis. Under a CPC model, advertisers measure the number of visitors to a web site that view an advertisement or key word and click through the advertisement or key word to a web site designated by the advertiser.

Over time, the cost-per-click model has been enhanced and automated by companies such as Google, Inc. of Mountain View, Calif. For example, search engines now provide an advertiser with the opportunity to bid on a CPC basis for search terms that will drive traffic to the advertiser's web site. In addition, web site owners now have the option of including contextually relevant advertising on their web sites for a percentage of CPC revenue derived when visitors to the web site click through an advertisement.

SUMMARY OF THE INVENTION

Systems and methods of conducting online marketing campaigns are described. In many embodiments, the online marketing campaigns involve solicitations for responses to an idea. In a number of embodiments, the online marketing campaigns are conducted via a web site and users can create profiles within the web site and submit responses to the campaign via the web site. In several embodiments, an online marketing campaign can be engaged with in any of a variety of ways and the engagement is tracked. A group of embodiments, enable propagation of submission to other web sites and track engagement with the propagated submissions. In many embodiments, an entire campaign is syndicated to another web site.

One embodiment includes a campaign hosting system including a database connected to a network, a campaign creation device connected to the network and a plurality of user devices connected to the network. In addition, the campaign creation device is configured to provide campaign information to the campaign hosting system via the network, the campaign hosting system is configured to automatically create an online campaign that is customized according to the campaign information and to store the campaign as one of a plurality of online campaigns in the database, at least one of the user devices is configured to provide profile information to the campaign hosting system via the network, the campaign hosting system is configured to automatically create a user profile using the profile information and to store the user profile as one of a plurality of user profiles in the database, each user device is configured to engage with the online campaign by communicating with the campaign hosting system via the network and each user device is configured to access the user profile by communicating with the campaign hosting system via the network.

In a further embodiment, at least one user device is configured to provide a campaign response to the campaign hosting system via the network, the campaign hosting system is configured to store the campaign response in the database in a way that associates the campaign response with the campaign and the user profile of the user that submitted the campaign response and at least one user device is configured to access the campaign response by communicating with the campaign hosting system via the network.

In another embodiment, the campaign is a solicitation for a response to an idea.

In a still further embodiment, the campaign response is media.

In still another embodiment, the media is an image, an album of images, audio, a series of audio, video, a series of videos, a blog, a series of blog entries, a mashup, or a series of mashups.

In a yet further embodiment, the campaign is a solicitation for a response to a survey and the campaign response is a series of answers to the survey.

In yet another embodiment, at least one user device is configured to communicate a vote for the campaign response to the campaign hosting system via the network, the campaign hosting system is configured to add the vote to a vote tally for the campaign response and to store the vote tally in the database in a way that associates the vote tally with the campaign response and at least one user device is configured to access a real-time vote tally for the campaign response by communicating with the campaign hosting system via the network.

In a further embodiment again, at least one user device is configured to provide a rating of the campaign response to the campaign hosting system via the network, the campaign hosting system is configured to store the rating in the database in a way that associates the rating with the campaign response and at least one user device is configured to access the rating by communicating with the campaign hosting system via the network.

In another embodiment again, the rating is a score.

In a further additional embodiment, at least one user device is configured to provide a review of the campaign response to the campaign hosting system via the network, the campaign hosting system is configured to store the review in the database in a way that associates the review with the campaign response and at least one user device is configured to access the review by communicating with the campaign hosting system via the network.

In another additional embodiment, at least one user device is configured to provide a rating of the review to the campaign hosting system via the network, the campaign hosting system is configured to store the rating of the review in the database in a way that associates the rating with the review and at least one user device is configured to access the rating of the review by communicating with the campaign hosting system via the network.

In a still yet further embodiment, the rating of the review is a score.

In still yet another embodiment, at least one user device is configured to provide an award nomination for the campaign response to the campaign hosting system via the network, the campaign hosting system is configured to store the award nomination in the database in a way that associates the award nomination with the campaign response and at least one user device is configured to access the award nomination by communicating with the campaign hosting system via the network.

In a still further embodiment again, the campaign hosting system is configured to provide awards to the campaign response and record the award in the database in a way that associates the award with the campaign response and at least one user device is configured to access the award by communicating with the campaign hosting system via the network.

In still another embodiment again, at least one user device is configured to provide messages addressed to the user profile to the campaign hosting system via the network, the campaign hosting system is configured to store the message in the database in a way that associates the message with the user profile and at least one user device is configured to provide access to a user profile and retrieve messages addressed to the user profile by communicating with the campaign hosting system via the network.

In a still further additional embodiment, at least one user device is configured to provide an award nomination for a user profile to the campaign hosting system via the network, the campaign hosting system is configured to store the award nomination in the database in a way that associates the award nomination with the user profile and at least one user device is configured to access the award nomination by communicating with the campaign hosting system via the network.

In still another additional embodiment, the campaign hosting system is configured to provide awards to the user profile and record the award in the database in a way that associates the award with the user profile and at least one user device is configured to access the award by communicating with the campaign hosting system via the network.

In a yet further embodiment again, at least one user device is configured to provide access information concerning a remote server to the campaign hosting system via the network and the campaign hosting system is configured to use the access information to propagate the campaign response to a web page hosted by the remote server.

In yet another embodiment again, the user device is configured to access the campaign response via the remote server.

In a yet further additional embodiment, the campaign hosting system is configured to propagate the campaign response by inserting HTML code into the web page and the HTML code enables information concerning the submission to be retrieved from the campaign hosting system.

In yet another additional embodiment, the campaign creation device is configured to provide access information concerning a remote server to the campaign hosting system and the campaign hosting system is configured to use the access information to syndicate the online campaign to a remote server.

In a further additional embodiment again, the user device is configured to access the online campaign via the remote server.

In another additional embodiment again, the user device is configured to provide access information concerning the remote server to the campaign hosting platform and the campaign hosting platform is configured to use the access information to embed the online campaign within an iframe in a web page hosted by the remote server.

In a yet still further embodiment again, the campaign hosting system is configured to track in real time the engagement of the user devices with the online campaign.

In yet still another embodiment again, the campaign hosting system is configured to generate a real time engagement score for the online campaign based upon tracked real time engagement.

In a yet further additional embodiment again, the campaign hosting system is configured to generate real time reports of the tracked engagement.

In yet another additional embodiment again, at least one user device is configured to provide a campaign response to the campaign hosting system via the network, the campaign hosting system is configured to store the campaign response in the database in a way that associates the campaign response with the campaign and the user profile of the user that submitted the campaign response, at least one user device is configured to access the campaign response by communicating with the campaign hosting system via the network and the campaign hosting system is configured to track the submission of campaign responses.

In a still further additional embodiment again, at least one user device is configured to communicate a vote for the campaign response to the campaign hosting system via the network, the campaign hosting system is configured to add the vote to a vote tally for the campaign response and to store the vote tally in the database in a way that associates the vote tally with the campaign response, at least one user device is configured to access in real-time the vote tally for the campaign response by communicating with the campaign hosting system via the network and the campaign hosting system is configured to track the votes that the campaign response receives.

In still another additional embodiment again, at least one user device is configured to provide a rating of the campaign response to the campaign hosting system via the network, the campaign hosting system is configured to store the rating in the database in a way that associates the rating with the campaign response, at least one user device is configured to access the rating by communicating with the campaign hosting system via the network and the campaign hosting system is configured to track the average rating that the campaign response receives.

In a still yet further additional embodiment again, at least one user device is configured to provide a review of the campaign response to the campaign hosting system via the network, the campaign hosting system is configured to store the review in the database in a way that associates the review with the campaign response, at least one user device is configured to access the review by communicating with the campaign hosting system via the network and the campaign hosting system is configured to track the number of reviews that the campaign response receives.

In still yet another additional embodiment again, at least one user device is configured to provide a rating of the review to the campaign hosting system via the network, the campaign hosting system is configured to store the rating of the review in the database in a way that associates the rating with the review, at least one user device is configured to access the rating of the review by communicating with the campaign hosting system via the network and the campaign hosting system is configured to track the average rating that the review receives.

In another further embodiment, the campaign hosting system is configured to generate web pages that display a plurality of reviews ordered according to the average rating of each review.

In still another further embodiment, at least one user device is configured to provide an award nomination for the campaign response to the campaign hosting system via the network, the campaign hosting system is configured to store the award nomination in the database in a way that associates the award nomination with the campaign response, at least one user device is configured to access the award nomination by communicating with the campaign hosting system via the network and the campaign hosting system is configured to track the number of award nominations that the campaign response receives.

In yet another further embodiment, the campaign hosting system is configured to provide awards to the campaign response and record the award in the database in a way that associates the award with the campaign response, each user device is configured to access the award by communicating with the campaign hosting system via the network and the campaign hosting system is configured to track the number of awards that the campaign response receives.

In another further embodiment again, at least one user device is configured to provide messages recommending a campaign response to the campaign hosting system via the network and the campaign hosting system is configured to track the number of times a campaign response is recommended.

In another additional further embodiment, at least one user device is configured to provide an award nomination for a user profile to the campaign hosting system via the network, the campaign hosting system is configured to store the award nomination in the database in a way that associates the award nomination with the user profile, at least one user device is configured to access the award nomination by communicating with the campaign hosting system via the network, and the campaign hosting system is configured to track the number of awards that the user profile receives.

In still yet another further embodiment, the campaign hosting system is configured to provide awards to the user profile and record the award in the database in a way that associates the award with the user profile, at least one user device is configured to access the award by communicating with the campaign hosting system via the network and the campaign hosting system is configured to track the number of awards that the user profile receives.

In still another further embodiment again, at least one user device is configured to provide access information concerning a remote server to the campaign hosting system via the network and the campaign hosting system is configured to use the access information to propagate the campaign response to a web page hosted by the remote server and the campaign hosting system is configured to track the number of times a campaign response is propagated.

In still another additional further embodiment, at least one user device is configured to engage with the campaign response via the remote server and the campaign hosting system is configured to track engagement with the campaign response that occurs via the remote server.

In yet another further embodiment again, the campaign creation device is configured to provide access information concerning a remote server to the campaign hosting system and the campaign hosting system is configured to use the access information to syndicate the online campaign to a remote server and the campaign hosting system is configured to track the number of sites to which a campaign is syndicated.

In yet another additional further embodiment, at least one user device is configured to engage with the online campaign via the remote server and the campaign hosting system is configured to track engagement with the online campaign that occurs via the remote server.

In another additional further embodiment again, the campaign hosting system is configured to track the geographic location of the user devices that engage with the online campaign.

In still yet another further embodiment again, the campaign hosting system is configured to determine geographic location using information contained within a user profile stored in the database that is associated with the user device engaging with the online campaign.

In still yet another additional further embodiment, the campaign hosting system is configured to determine geographic location using an IP address associated with the user device engaging with the online campaign.

In still yet another additional further embodiment again, the campaign hosting system is configured to track demographic information concerning at least one user engaging with the online campaign.

In a further embodiment, the campaign hosting system is configured to determine demographic information concerning a user engaging with the online campaign by extracting information from a user profile stored in the database that is associated with the user device engaging with the online campaign.

In another embodiment, the campaign hosting system is configured to restrict access to the online campaign based upon campaign information provided by the campaign creation device.

In a still further embodiment, the campaign hosting system is configured to restrict access to the online campaign based upon the geographic location of the user device.

In still another embodiment, the campaign hosting system is configured to restrict access to the online campaign to a defined demographic of users.

One embodiment of the method of the claims includes using campaign information provided by users to create custom online campaigns, using profile information provided by users to create user profiles, receiving a response to one of the campaigns from one of the users, displaying the response in association with the user profile within the campaign to which the response relates and determining a winner of the campaign to which the response relates.

A further embodiment of the method of the claims includes creating an online campaign using campaign information received from a campaign creator, enabling users to engage with the campaign by receiving responses to the campaign from users, providing users with access to responses to the campaign and receiving votes from users, tracking in real time each engagement with the campaign and displaying within the online campaign the number of each type of engagement that has occurred.

A campaign hosting system in accordance with an embodiment of the invention includes at least one server connected to a database and a network. In addition, the database is configured to store information concerning a plurality of custom online campaigns, the database is configured to store information concerning user profiles, the database is configured to store campaign responses and to associate the campaign responses with a campaign and a user profile, and the server is configured to transmit information stored in the database concerning at least one of the plurality of online campaigns via the network.

A campaign hosting system in accordance with another embodiment of the invention includes at least one server connected to a database and a network. In addition, the database includes information concerning at least one online campaign, the server is configured to transmit information concerning the online campaign via the network, the server is configured to receive at least one submission responsive to the online campaign via the network and to store the at least one submission in the database, the server is configured to receive requests to automatically propagate one of the submissions stored in the database to a another web site via the network, the server is configured to transmit propagation information via the network, the server is configured to receive requests for information concerning the propagated submission via the network, and the server and the database are configured to track the requests for information.

A still further embodiment of the method of the invention includes receiving campaign information, automatically generating an online campaign using the campaign information, receiving a submission responsive to the online campaign, receiving propagation information identifying a submission and a web site and including access information, automatically propagating the submission to the identified web site using the access information, receiving request for information from the identified web site associated with users engaging with the propagated submission, and tracking user engagement with the propagated submission.

BRIEF DESCRIPTION OF DRAWINGS

FIGS. 5A-5F are screen shots of a graphical user interface provided by an online marketing platform for submitting different types of content in response to campaigns.

FIG. 14A-FIG. 14G are pages from a report generated by an online marketing platform in accordance with an embodiment of the invention.

Figure 15C:
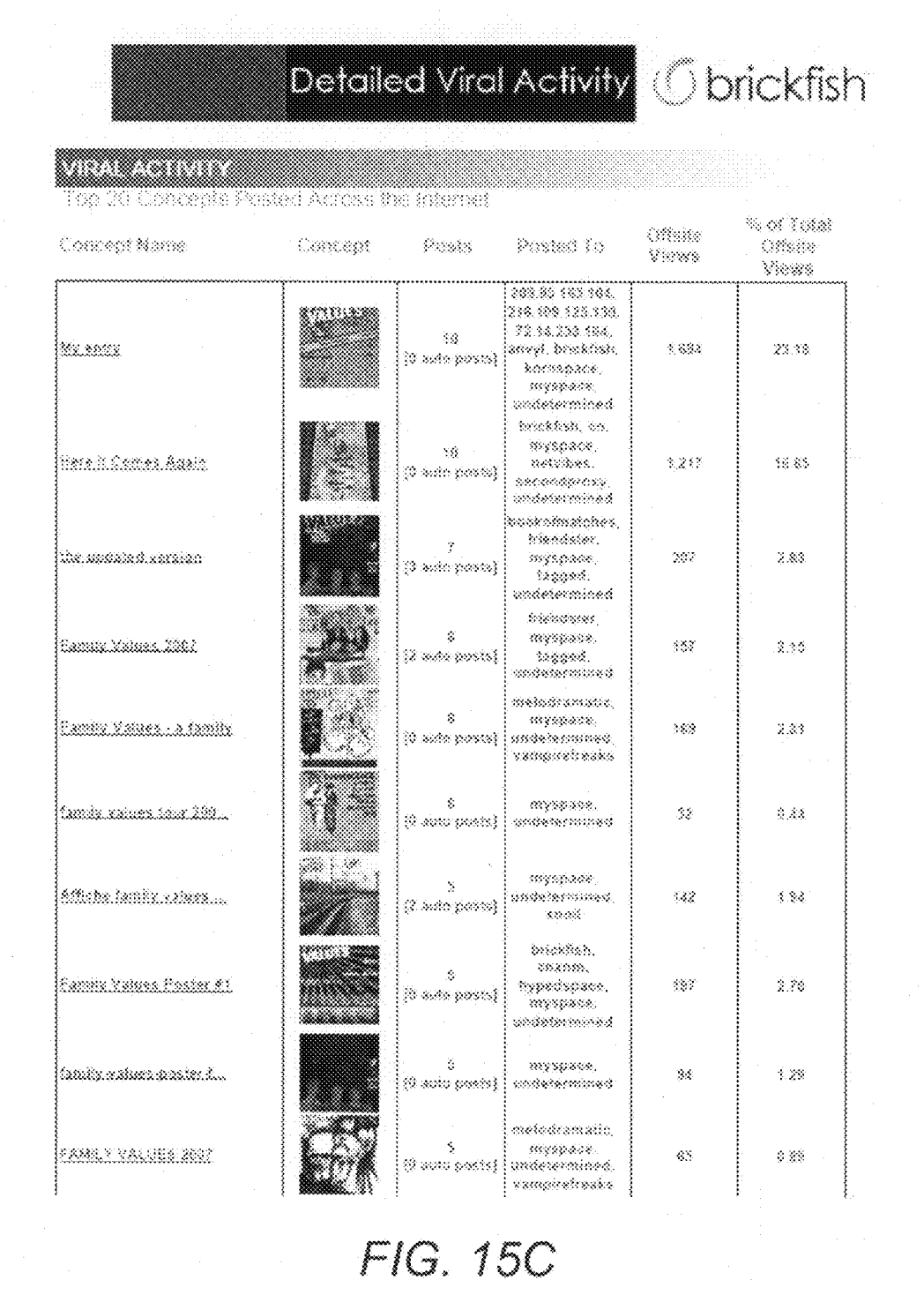

FIGS. 15A-15D are pages from a report relating to viral activity generated by an online marketing platform in accordance with an embodiment of the invention.

FIG. 19 is an HTML excerpt that can be used to syndicate an entire online campaign in accordance with an embodiment of the invention.

FIG. 22 is a screen shot of a web page generated by a campaign manager application showing the moderation history for a submission in accordance with an embodiment of the invention.

FIG. 24 is a screen shot of a moderation report generated by a campaign manager application in accordance with an embodiment of the invention.

DETAILED DESCRIPTION OF THE INVENTION

Figure 1:
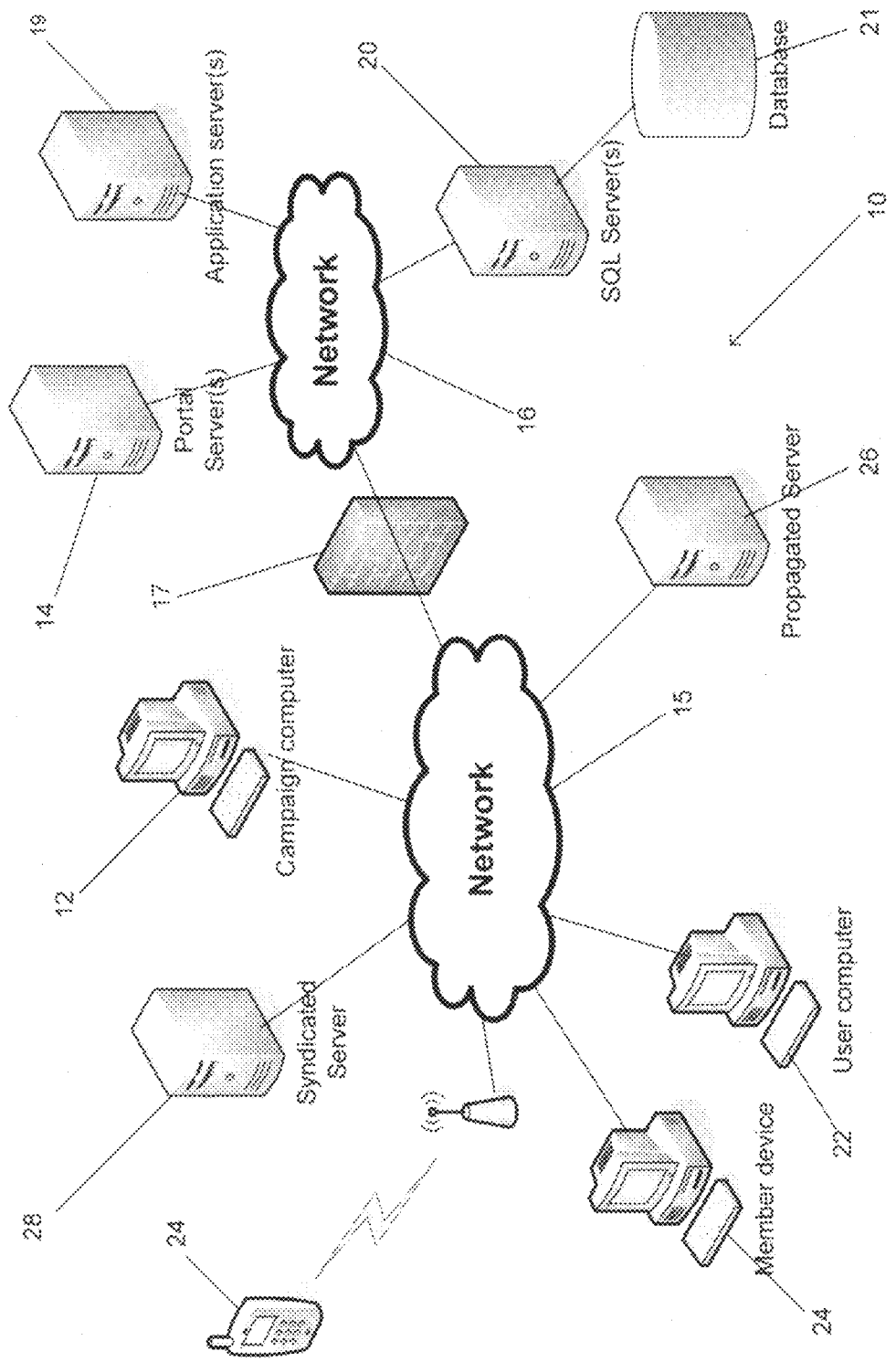
FIG. 1 is a schematic network diagram of an online marketing platform in accordance with an embodiment of the invention.

Turning now to the drawings, systems and methods for creating an online marketing platform are shown. Online marketing platforms in accordance with embodiments of the invention harness user generated content to encourage the viral sharing and tracking of online marketing campaigns. The term "user generated content" (UGC) is commonly used to refer to electronic media posted on the Internet by an individual. Examples of UGC include text posted in the form of a blog, audio posted in the form of a podcast, images posted as photos or graphic designs, video uploaded to a media sharing web site, various combinations of these forms of media, and other media types including SMS text messages, MMS messages, non-digital media, and new media types. A feature of UGC is that it typically relies upon viral distribution to reach its audience, often through web sites such as, but not limited to, MySpace, Xanga, and YouTube that facilitate the distribution and exchange of UGC. "Viral distribution" is a term that is used to describe the distribution of information or media as a result of one to one or one to many interactions between individual users. Campaigns hosted using online marketing platforms in accordance with embodiments of the invention are solicitations for UGC in response to a particular theme or idea. Once a campaign has been created using the online marketing platform, users can generate and submit UGC in response to the campaign. Rather than a single piece of UGC being the basis of a marketing campaign, the marketing campaign itself stimulates the generation of UGC and the online marketing platform then enables users to virally propagate the UGC and the campaign throughout the Internet in ways that encourage other users to interact and engage with the campaign. In many embodiments, the online marketing platform allows content to be a catalyst for a new marketing model by, among other things, providing the ability to launch a campaign and for users to interact virally, distribute the campaign message, and engage in interactions such as those described above.

Online marketing platforms in accordance with several embodiments of the invention drive consumer interaction and response through UGC. In many embodiments, a campaign designed by a client can facilitate peer-to-peer (P2P) sharing of UGC through multiple methods and is a primary driver of consumer interactions and response. Online marketing platforms in accordance with a number of embodiments of the invention also provide the ability to track interactions occurring during a campaign (including UGC submissions, views, votes, plays, peer to peer shares, peer reviews, peer review ratings, peer award nominations and/or other forms of engagement) and to provide reports to the client and/or the user summarizing the interactions. In several embodiments, an online marketing platform is combined with a marketing arrangement involving the use of a "cost per engagement" (CPE) metric that quantifies the interactions and can thus be used for pricing and other transactions or evaluations, which are facilitated by quantitative information about a campaign. In many embodiments, the CPE metric is determined based on a number of factors including several forms of measurable engagement.

Online Marketing Platforms

An online marketing platform in accordance with an embodiment of the invention is shown in FIG. 1. The online marketing platform 10 includes a campaign computer 12 that can connect to a portal server 14. In the illustrated embodiment, the campaign computer 12 is connected to a public network 15, such as the internet, and the portal server 14 is connected to a private network 16, which is in turn connected to the public network 15 via a firewall 17. In many embodiments of the invention, multiple portal servers can be used in conjunction with a load balancer. In addition, at least one application server 19 can be connected to the private network 16 and at least one SQL server 20 is connected to the private network 16. The SQL servers 20 are also connected to a database 21.

The portal server 14 can communicate over the private network 16 and the public network 15 with a user computer 22 and member devices 24. In the illustrated embodiment, a number of member devices 24 are shown including a cell phone handset and a computer. Although the devices are referred to as member devices, which implies membership of an online community, similarly configured devices can enable guests and visitors to engage with campaigns in accordance with embodiments of the invention. For simplicity, all devices capable of enabling a member, guest, visitor or other user to engage with a campaign are referred to throughout as a member device or a user device. The application server 19 can also communicate with a propagated server 26 and a syndicated server 28 via the private network 16 and the public network 15.

As discussed above, online marketing platforms in accordance with embodiments of the invention enable the creation of campaigns. A person wishing to create a campaign connects to the portal server 14 using a campaign computer 12. In many embodiments, the portal server provides a web based interface. Using a campaign computer 12 with an appropriately configured web browsing application, the campaign computer 12 provides information to the portal server 14 concerning the characteristics of the campaign. Examples of campaign computers include personal computers capable of connecting to the Internet and configured with a web browser such as Internet Explorer distributed by Microsoft Corporation of Redmond, Wash. or any other networked device including consumer electronics devices and cell phone handsets. In many embodiments, campaigns are created using a wizard or a template that obtains the information required by the portal server to establish the campaign. A feature of many embodiments is that anyone that can access the portal server can create an online campaign within the online marketing platform. Processes for creating campaigns in accordance with various embodiments of the invention are discussed in greater detail below.

When a portal server 14 receives a request to create a campaign from a campaign computer 12, the portal server causes the information concerning the new campaign to be stored in the database 21, along with assets stored in many other locations such as the content delivery network and files on the portal server. In many embodiments, the storage of the campaign information is coordinated by one of the SQL servers 20. Once the campaign has been created, the campaign can be accessed via one of the portal servers 14. When a request to access the campaign is received by a portal server 14, the portal server generates a web page using information concerning the campaign, which is retrieved from the database 21 with the cooperation of an SQL server 20. A computing device configured with an appropriate web browsing application can then review the web pages associated with the campaign.

In many embodiments, the portal server 14 generates web pages including mechanisms that can be used by users to provide submissions in response to a campaign. Processes for providing submissions in accordance with various embodiments of the invention are discussed below. When the campaign calls for a submission in the form of user generated content, the user generates content and uploads the content to the portal server 14 via a user computer 22. In instances where the submission includes video, an application server 19 can perform video conversion prior to inclusion of the video in the database 21 and provide for custom frame captures for use as thumbnails in the description of the video content. The portal server 14 stores the submission in the database 21 in a way that associates the submission with the campaign to which the submission is responsive.

Once submissions have been received, the portal server 14 can generate web pages showing one or more of the submissions that are responsive to a campaign. Computing devices with appropriately configured web browsing applications (e.g. member devices 24) can be used to review the web pages provided by the portal server 14. As discussed above, online marketing platforms often seek to facilitate user engagement and viral distribution of the campaign. In a number of embodiments, the web pages generated by the portal server 14 include mechanisms that enable members and guests to engage with and virally distribute the content displayed on the web pages. The distinction between members, guests and visitors in the context of an online community are discussed further below. Actions associated with user engagement and viral distribution of content typically involve a member device 22 requesting additional information from the portal server 14. In many embodiments, the portal server 14 uses the information requests to track the engagement of the user and stores information concerning the member's engagement in the database 21. Examples of mechanisms that facilitate engagement, viral distribution and the tracking of user engagement and viral distribution are discussed in more detail below.

As discussed above, a user can virally distribute a campaign to other users via propagation of a submission to web sites other than the web site hosted by the portal server 14. In the illustrated embodiment, web pages provided by the portal server 14 include mechanisms for propagating a submission to another web site. A member or a guest using a member device 24 can provide instructions to the portal server 14 that cause one of the application servers 19 to propagate a submission to a specified web site. The application server 19 is configured to respond to a propagation request by posting display information to the propagated server 26. The propagated server 26 is then able to provide web pages that include the display information to appropriately configured user computers 22 and member devices 24. The display information enables the user computers 22 and member devices 24 to retrieve information concerning the propagated submission from the database 21 via the portal server 14. The information concerning the propagated submission is then displayed as part of the propagated server's web site by the user computer 22 or member device 24. Processes for propagating submissions in accordance with various embodiments of the invention are discussed further below.

In many embodiments, a portal server 14 hosts a number of campaigns. Someone posting a campaign to the portal server may wish to incorporate the campaign entirely within another web site. Benefits of syndicating a campaign in this way can include driving additional traffic to the campaign from the syndicated web site. In the illustrated embodiment, the portal server 14 provides a mechanism to a person uploading a campaign that enables the campaign to be syndicated to another site. The person uploading the campaign can use a campaign computer 12 to provide instructions to the portal server 14 that cause one of the application servers 19 to syndicate the campaign to a specified web site. The application server 19 is configured to respond to such a syndication request by posting display information to an identified syndicated server 28. The syndicated server 28 is then able to provide web pages that include the display information to appropriately configured user computers 22 and member devices 24. The display information enables the user computers 22 and member devices 24 to retrieve information concerning the syndicated campaign from the database 21 via the portal server 14. The information concerning the syndicated campaign is then displayed as part of the syndicated web site by the user computer 22 or member device 24. In several embodiments, the syndicated campaign is accessible via both the portal server 14 and the syndicated server 28. In other embodiments, the syndicated campaign is only accessible via the syndicated server 28. Processes for syndicating campaigns to a syndicated server in accordance with various embodiments of the invention are discussed further below.

Although a specific architecture is shown in FIG. 1, many other architectures in accordance with embodiments of the invention can be implemented to provide the appropriate hardware to support an online marketing platform. For example, the functions of the portal server(s), application server(s) and SQL server(s) can be performed by servers configured in other ways. In addition, other network topologies can be used.

Campaigns

A campaign is both a template and a solicitation for user responses to a theme or an idea. Campaigns in accordance with embodiments of the invention can include a competition involving a reward, a survey or poll, and/or an opportunity to express a point of view. The following are examples of different types of campaigns that can be hosted on an online marketing platform in accordance with embodiments of the invention and are by no means constitute the limits of the types of campaigns that can be supported. A campaign can be any request for a response made by a campaign creator using an online marketing platform that automates the submission of responses to the campaign and the engagement of users with the campaign.

Campaigns Involving Rewards

A number of embodiments of the invention include campaigns involving rewards. In a campaign involving a reward, users are requested to submit UGC in exchange for a chance to win one or more prizes. The prizes can be awarded randomly, by the campaign creator and/or based upon measurable metrics such as a score. In a number of embodiments, prizes are awarded to the submission(s) judged by the campaign creator to be the best submission(s). In several embodiments, voting by users is supported and prizes are awarded to the submission(s) that receive the highest score, which is a calculation based in part on the number of votes received. In many embodiments, viral distribution of submissions is supported and prizes are awarded to the submission(s) that receive the widest viral distribution. In a proportion of embodiments, submissions are scored and the submission(s) that receives the highest score receives a reward. In other embodiments, prizes are awarded in a number of categories, including those described above and/or are awarded based upon other quantifiable metrics, including votes by members of a site (excluding votes of visitors and/or guests), the entry with the highest engagement, a formulation that is a function of popular vote and campaign creator's selections, the submission with the highest number of reviews, the submission with the highest number of views, entries with the highest viral impact throughout the internet, the submission chosen by a panel of experts, the submission for the top x submissions and/or a random submission. In many embodiments, the submission that has had the highest viral impact throughout the Internet is determined as being the submission that has received the most views and/or click-throughs from the greatest number of unique users (determined by client IP address) through propagated servers. In a number of embodiments, prizes are awarded to users for engagement. Such prizes can be awarded based upon the user that cast the most votes, posted the most reviews, and/or posted the most high quality reviews.

Many campaigns that involve rewards solicit a user response in exchange for a reward. In other words, a user is encouraged to respond to the campaign in exchange for a specified reward (as opposed to a chance to obtain a reward). In many embodiments, the user response is the submission of UGC. In several embodiments, the user response involves performing a number of actions such as participation in a poll or the completion of a survey. In a number of embodiments, the user response includes participation in an online scavenger hunt (i.e. visiting/locating various websites to solve puzzles and/or retrieve information).

Although the campaigns described above involve rewards, similar campaigns can be conducted in accordance with embodiments of the invention that do not include tangible rewards. Such campaigns can involve selection of a winner or winner(s) and the incentive of participation in the campaign is the prestige of being selected.

Campaigns Involving Polls and Surveys

In a number of embodiments, campaigns involving surveys or polls are used to solicit opinions from users. A survey or poll could be on any topic and can be as simple as requesting user feedback with respect to a product or idea that is the subject of the campaign. A user's responses can be published as part of the campaign in a way that can be viewed by other users. Many surveys in accordance with embodiments of the invention include questions, the answers to which would be of interest to other users in a social media or networking environment. The questions and/or the answers can then be propagated to another website. In a number of embodiments, users who complete a poll or survey are provided with links to profiles of other users who submitted similar responses to a poll or survey.

In several embodiments, a user's responses are not accessible by other users. When a user's responses are not published, a user is still able to virally distribute the campaign's survey or poll (as opposed to a particular survey or poll response). A user could include the campaign survey or poll on a website and/or recommend the survey or poll to other users. The viral distribution of UGC and campaigns is discussed further below.

Campaigns involving polls and surveys can include rewards and/or the chance of rewards in order to encourage users to submit responses. In many embodiments, the rewards are allocated randomly. In a number of embodiments, a user's submissions in response to a poll or survey are scored and the user(s) that achieves the highest score receives a reward. Several embodiments require an action in addition to completion of a survey or poll in order to be eligible for a reward.

Point of View Campaigns

Online marketing platforms in accordance with embodiments of the invention are also capable of supporting campaigns involving the submission of points of view. Examples of point of view campaigns include participation in a discussion forum or a debate. In a number of embodiments, submissions on a debate topic are displayed side by side to compare points and rebuttals. In other embodiments, a point of view campaign includes solicitations for a point of view in response to another point of view. Users may be motivated to participate in a point of view campaign due to a desire to participate in the dialogue created by the campaign. In several embodiments, rewards are used to create incentives for users to participate in a point of view campaign. In many embodiments, the rewards are randomly allocated to participants in a forum. In a number of embodiments, rewards are allocated to a winner of a debate, where a moderator, voting, and/or metrics determine the winner.

Conducting a Campaign

Figure 2:
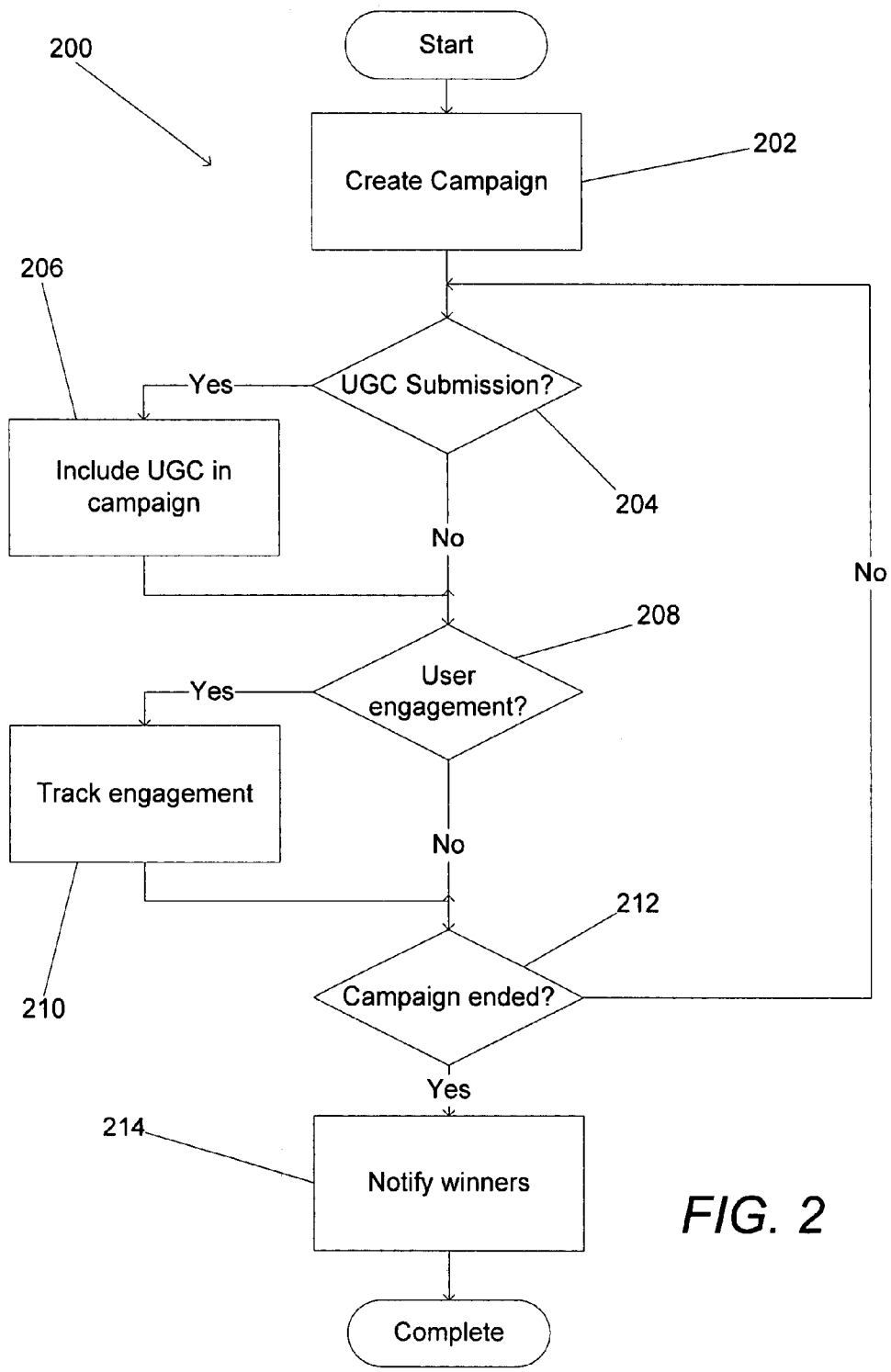
FIG. 2 is a flow chart illustrating a process for conducting a campaign in accordance with an embodiment of the invention.

A process for conducting a campaign involving submission of UGC using an online marketing platform in accordance with an embodiment of the invention is shown in FIG. 2. The process 200 commences with the creation (202) of a campaign. Once the campaign has been created and launched, UGC can be submitted. The process determines (204) whether UGC has been submitted. If UGC has been submitted, the UGC is included (206) in the campaign. The process also involves determining (208) whether users are engaging with the campaign. Examples of various different types of engagement including the viral or peer-to-peer distribution of UGC are discussed below. When a user engages with the campaign, the engagement is tracked (210). The process continues to allow submission of UGC and to track user engagement with the campaign until a determination is made (212) that the campaign has ended. Once the campaign has ended, the winners of any prizes associate with the campaign are notified (214). In many embodiments, users that engaged with the campaign are also notified of the winners. Although, a specific process is shown in FIG. 2 for conducting campaigns, the process is simply one embodiment of the invention. In other embodiments, other processes can be used to conduct a campaign. In many instances, the process used to conduct the campaign is impacted by the architecture of the online marketing platform and the nature of the campaigns supported by the online marketing platforms.

Creating a Campaign

Online marketing platforms in accordance with embodiments of the invention typically include a campaign creation application to assist with the creation of a campaign. In many embodiments, the campaign creation application includes a series of templates that request information from the campaign creator concerning the nature of the campaign. In several embodiments, campaign creators access a campaign creation application via a web interface. In embodiments where the campaign creation application uses templates, the templates are provided as web pages including fields. Application servers use data collected from the fields to create a campaign. Information concerning the campaign is stored in a database and, once the campaign launches, the campaign is accessible to users via web servers that retrieve information concerning the campaign from the database.

Figure 3A:
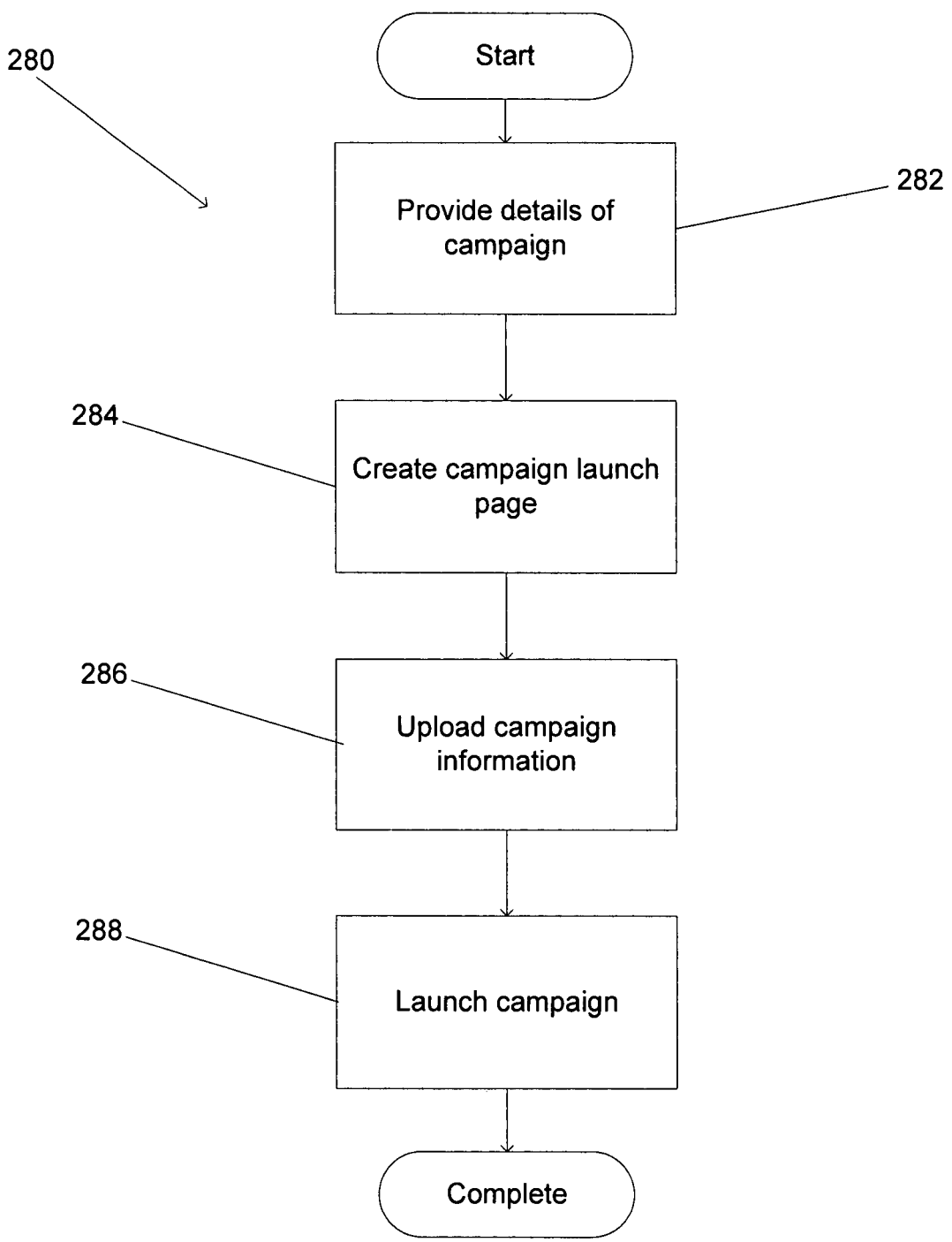
FIG. 3A is a flow chart showing a process for creating a campaign in accordance with an embodiment of the invention.

A process for creating a campaign in accordance with an embodiment of the invention is shown in FIG. 3A. The process 280 includes providing (282) details of a campaign, creating (284) a campaign landing page, uploading (286) the campaign information and launch page to the online marketing platform and launching (288) the campaign.

As discussed above, campaign information can be automatically uploaded using templates provided by a web based interface. In other embodiments, the details of the campaign can be provided to a person associated with the online marketing platform and that person can create the campaign in accordance to the campaign creator's instructions. The information captured concerning the campaign can be used to generate a campaign landing page. A campaign landing page is a web page or other user interface that is provided as a point of entry to members, visitors, guests or other users. The campaign landing page contains information concerning the page. The information can be in the form of text and can often include video and/or audio concerning the campaign. In many embodiments, the campaign features a host a video and/or audio of the host is provided as part of the campaign landing page. In addition to information concerning the campaign, the campaign landing page includes links that enable members, guests, visitors or other users to engage with the campaign. Engagement with campaigns is discussed further below.

Online marketing platforms in accordance with a number of embodiments of the invention enable the automatic uploading of campaign information and/or a campaign landing page. In many instances, the campaign is accessible as soon as it is uploaded. In other embodiments, the campaign launches in accordance with launch information provided by the campaign creator. In a number of embodiments, the campaign landing page is accessible prior to the campaign launch, however, users cannot submit responses to the campaign until the campaign launches.

The process shown in FIG. 3A is one example of a process in accordance with an embodiment of the invention that can be used to create a campaign. FIGS. 3B-3E provide examples of templates that can be used to automatically create a campaign that is hosted on an online marketing platform in accordance with a number of embodiments of the invention.

A screen shot of a web page template provided by a campaign creator application in accordance with an embodiment of the invention is shown in FIG. 3A. The screen shot 300 includes a template possessing a number of fields that enable the entry of information concerning a campaign. In the illustrated embodiment, the fields include a first set of fields 301 associated with identifying the campaign, a second set of fields 302 associated with defining the attributes of the campaign, and a third set of fields 303 associated with the visual appearance of the campaign.

The set of fields 301 associated with identifying the campaign includes a first field 304 that identifies the sponsor of the campaign. The sponsor can be the campaign creator, however, another entity such as an advertising agency can create a campaign on behalf of another entity that is the sponsor of the campaign. A second field 306 is also provided for entry of a campaign title. In the illustrated embodiment, the campaign title is "Brickfish $1,000 Show Us Your Art Scholarship". In other embodiments, other information can be used to identify the campaign.

The set of fields 302 that define the attributes of the campaign includes a pull down list of categories 308. The pull down list enables the campaign creator to classify the nature of the campaign from a list of predefined campaign categories. A campaign category is a categorization of the subject matter of the campaign. In a number of embodiments, categories such as music, fashion, sport, and politics are used to group campaigns, which facilitate user location of campaigns on the online marketing platform that are likely to engage them. In addition to the pull down list, a set of check boxes 310 enables the selection of one or more secondary categories. The secondary categories can be used for indicating that the campaign should be displayed under categories other than the primary category. In many embodiments, a campaign creator can also identify the campaign type for example contest, survey, poll, debate, runoff etc.

An important attribute of many campaigns is the duration of the campaign. A set of fields 312 defines the start date and time and end date and time of the campaign. A series of check boxes 314 also enables the selection of the types of media that can be submitted as part of the campaign. In the illustrated embodiment, the selections include an album, audio, a blog entry, a photo, and/or a video. Different types of media and the various ways in which they can be submitted are discussed further below. In other embodiments, campaigns can be created that run for a predefined engagement or engagement score value. For example the campaign creator would purchase 500,000 units of engagement. Once the engagement score reached 500,000 the campaign would end or the campaign creator could purchase additional blocks of engagement to keep the campaign running. Calculation of engagement and engagement scores are discussed further below Voting is an integral part of many campaigns. An attribute that can be defined with respect to a number of campaigns is the frequency with which an individual user can vote. In the illustrated embodiment, the vote frequency can be specified in a text field 314 as a number of minutes. The template also includes a toggle 318 to set whether the campaign should go live. The toggle enables a campaign to be fully created before going live.

In many embodiments, campaign creators are interested in tracking new members that join an online marketing platform as a result of a particular campaign. In the illustrated embodiment, the campaign creation template includes a field 320 that enables the entry of referral codes. Referral codes are codes that can be provided in marketing materials, which encourage participation in a specific campaign. The campaign creator can then use referral codes entered by new members to draw conclusions concerning the effectiveness of a campaign and/ or a particular marketing activity. As is discussed further below, reports can be generated concerning engagement with a campaign and engagement from members using referral codes can be separately identified as campaign creator sourced and all other engagement can be identified as viral.

The template also includes a text field 322 that enables the entry of a number of keywords. In the illustrated embodiment, the keywords are comma delimited and facilitate the location of the campaign during searches. In several embodiments, keywords are drawn from a standard vocabulary. In a number of embodiments, keywords are selected from a pull down box.

Although specific fields are discussed above as defining the attributes of a campaign, in many embodiments other fields are used to define attributes of campaigns. For example, campaigns can be run that only allow participation by a specific set of users or users that set up accounts with a specific referral code.

As discussed above, the template includes a set of attributes that define the graphical appearance of the campaign. In the illustrated embodiment, the template includes a field 324 in which a graphics file can be specified as the thumbnail graphic for the campaign. The campaign creation application uploads the specified file and displays the content of the uploaded file in a preview window 325. In many embodiments, the thumbnail graphic is used as the logo for the campaign. The template also includes a field 326 in which a header graphic can be specified and a preview window 327 in which the uploaded header graphic can be displayed. A text box 328 provides the ability to provide header text. A propagation thumbnail graphics file can also be specified in the field 330 and previewed in the preview window 331. As can be readily appreciated, the graphics files that are uploaded entirely depend upon the layout of the campaign landing page when displayed to users by the online marketing platform. In a number of embodiments, a different combination of graphics files is uploaded and the capability is provided to include a number of different portions of text.

During the creation of a campaign, the template provides a series of control buttons 332 that enable the template to be deleted, the information entered into the template to be reset, the information saved, or a transition made to another template. The following discussion provides examples of additional information concerning a campaign that can be captured using templates in accordance with embodiments of the invention.

The template 300 also includes a set of fields 332 referred to as "brick values" that relate to virtual rewards, which the online marketing platform allocates to users in exchange for engagement with the campaign. The campaign creator can set the various virtual rewards that can be allocated for particular forms of engagement including entering the campaign, voting, self-voting, rating a submission, self-rating a submission, commenting on or reviewing a submission, or self-commenting on a submission. In other embodiments, other forms of engagement can be allocated virtual rewards. In a number of embodiments, the virtual rewards are similar to an airline frequent flier program in that the virtual rewards are maintained in an account on behalf of the user that accrues the virtual rewards and the user can exchange the virtual rewards for real world benefits.

Figure 3B:
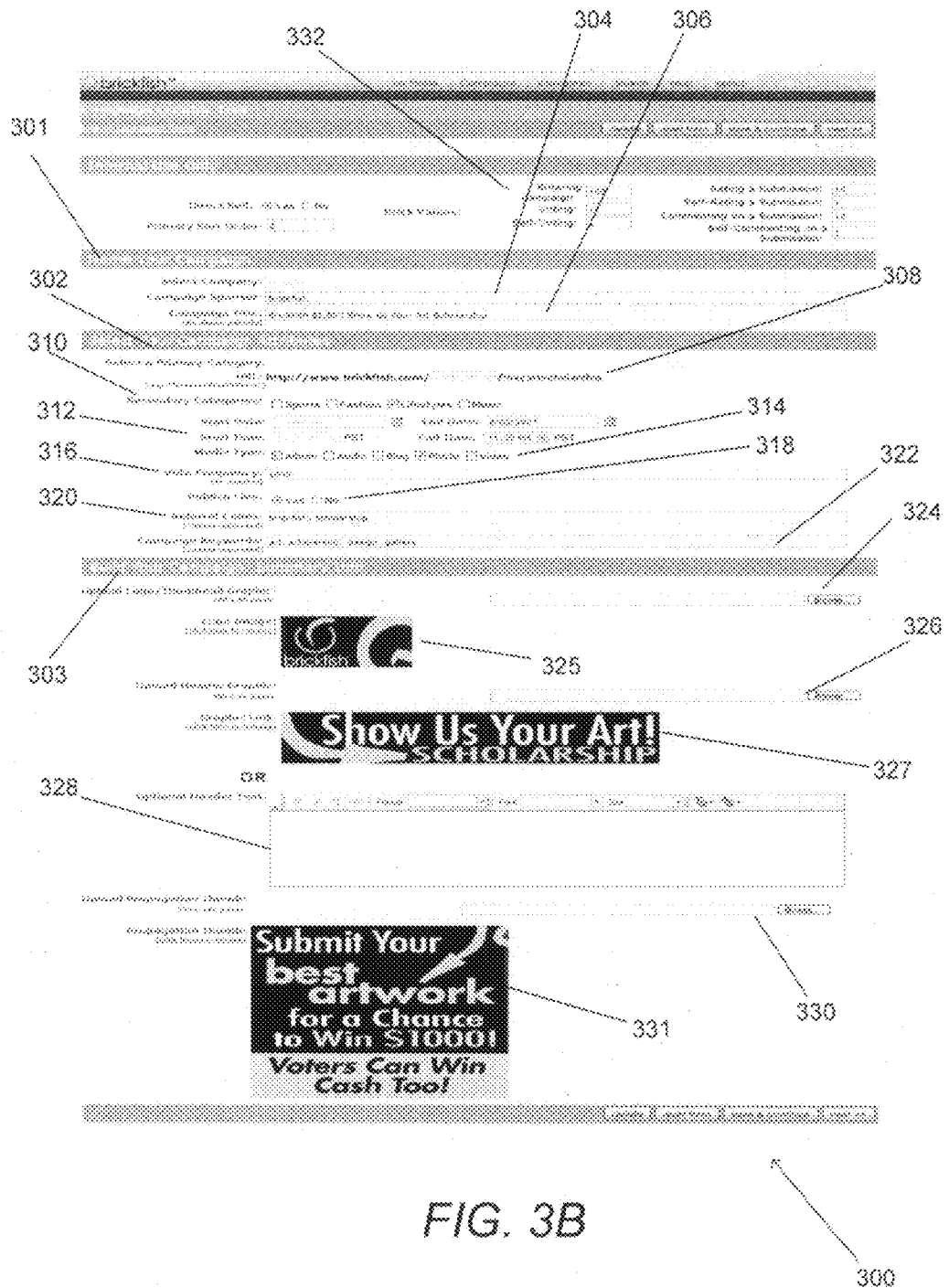
FIGS. 3B-3E are screen shots of a graphical user interface of a campaign creation tool in accordance with an embodiment of the invention.
Figure 3C:
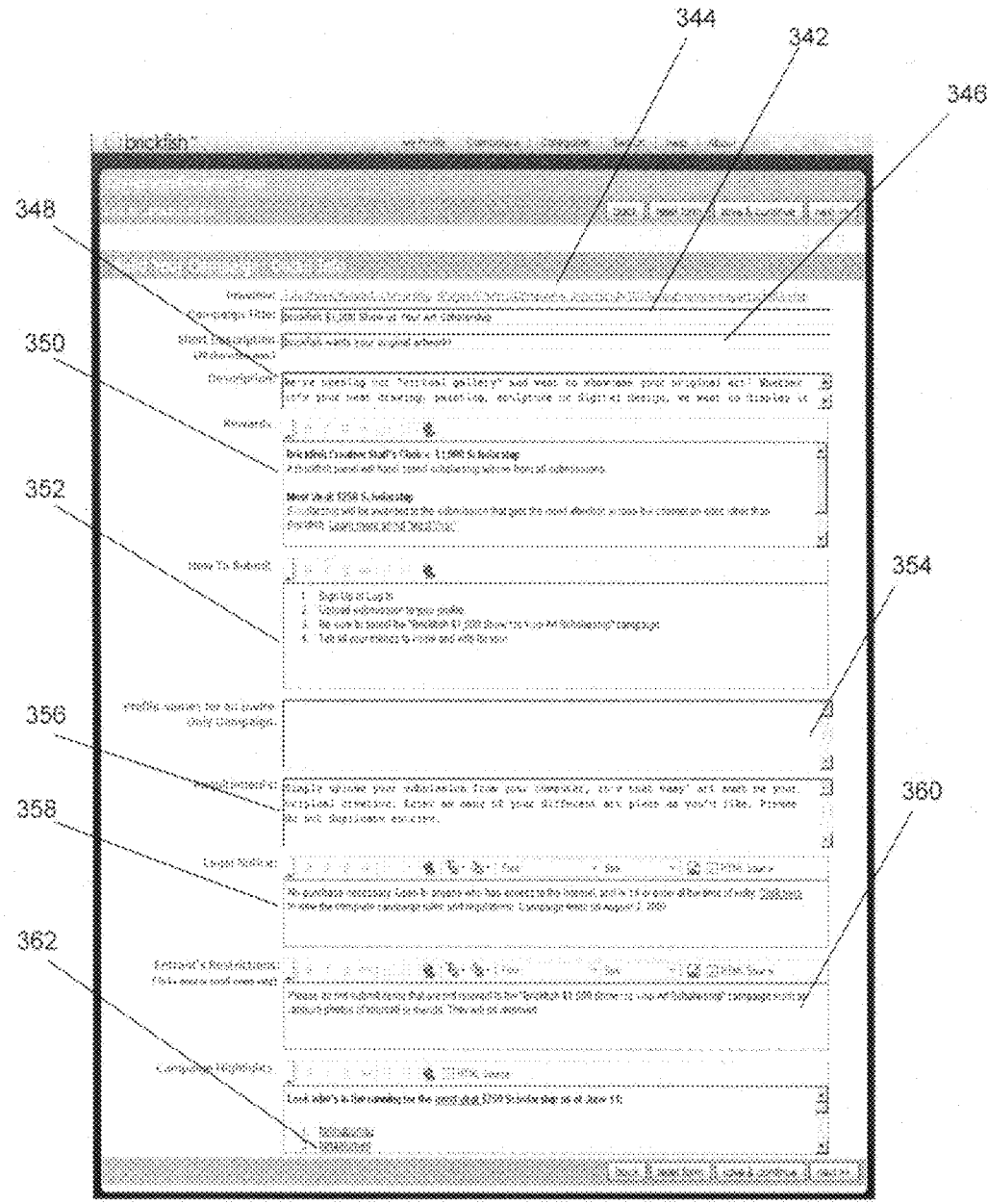

Another template for capturing information concerning a campaign in accordance with an embodiment of the invention is shown in FIG. 3C. The template 340 includes a number of fields in which a campaign creator can insert detailed information concerning a campaign. The fields include a link 342 to a preview of the campaign, a text field 344 containing the campaign title, a text field 346 containing a short description of the campaign, a text field 348 containing a longer description of the campaign, a text field 350 containing a description of the rewards that can be received for participating in a campaign, a text field 352 containing a description of how to participate in the campaign, a text field 354 in which profile names can be listed for campaigns that are by invitation only, a text field 356 that includes a list of requirements for eligibility to receive rewards, a text field 358 in which any legal notices associated with the campaign can be entered, a text field 360 for entry of requirements that will be displayed when a user scrolls over a campaign, and a text field 362 in which a user can enter campaign highlights. In other embodiments, other templates are used including text fields enabling the capture of text relating to different sets of detailed information for inclusion in the description of a campaign. A similar set of control buttons 364 to the control buttons of the template 300 shown in FIG. 3B are included at the bottom of the template 340 shown in FIG. 3C.

Figure 3D:
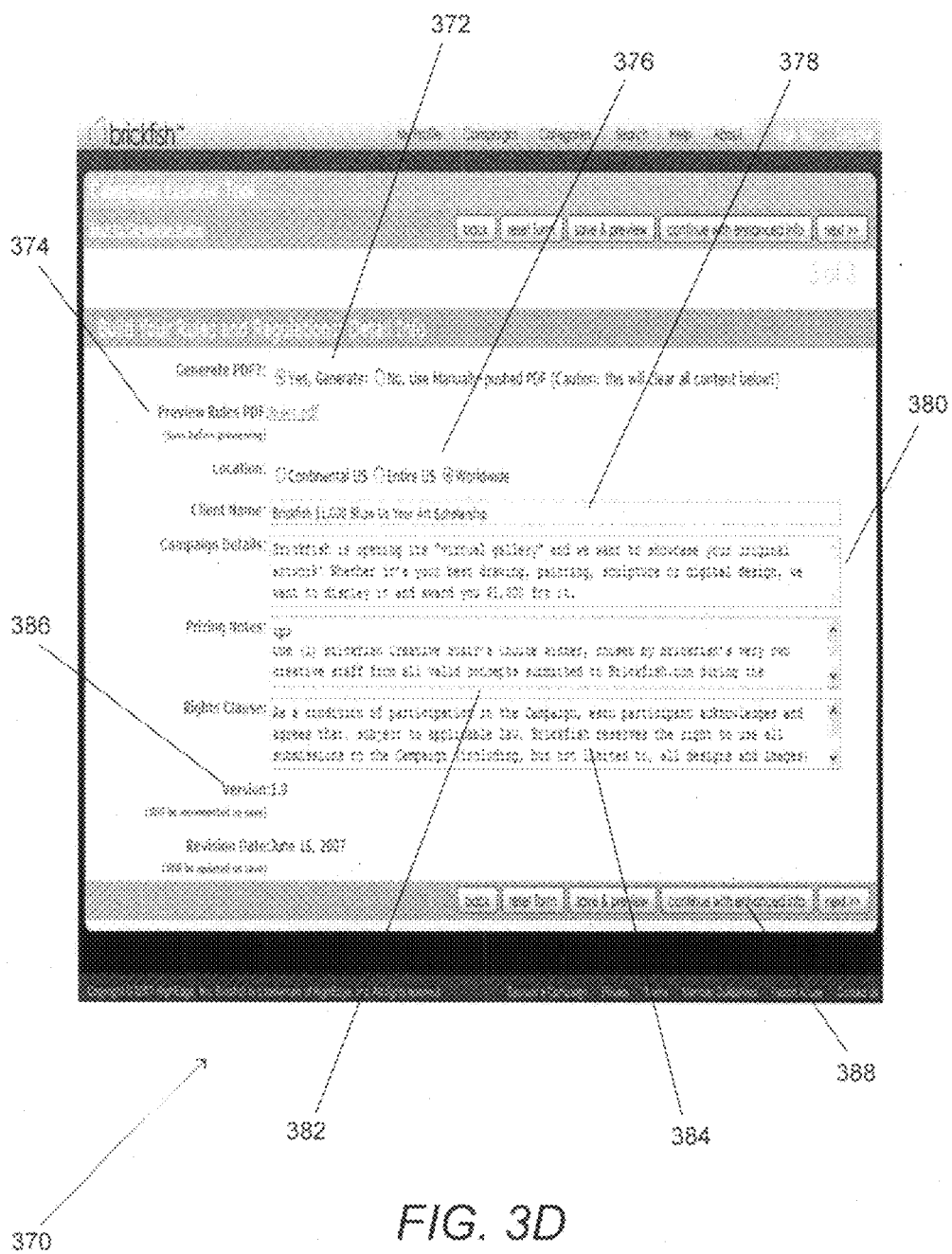

Campaigns in accordance with a number of embodiments of the invention often require a published set of rules and regulations. A template for generating a set of campaign rules and regulations in accordance with an embodiment of the invention is shown in FIG. 3D. The template 370 includes a toggle 372 that indicates whether the template should be automatically populated with preprogrammed boilerplate language. If the toggle indicates that the standard text should not be used, then the text fields are cleared and custom text can be inserted. The template also includes a link 374 to a file in a pdf file format, specified by Adobe Systems Incorporated of San Jose, Calif. The file contains the rules and regulations formatted as a publishable document. The template also includes a toggle 376 that indicates the geographic region from which submissions can be made to the campaign.

In the illustrated embodiment, the text fields defining the rules and regulations of the campaign include a client name field 378, a campaign details field 380, a prize notes field 382, a rights clause field 384. These fields specify the substantive text of the rules and regulations document. In many embodiments, other fields are used to capture information concerning the rules and regulations that will be published with respect to a particular campaign.

Templates in accordance with a number of embodiments of the invention include fields 386 containing the version and revision date of the rules and regulations. In many embodiments, the version and revision date are updated when the rules and regulations are saved using the control buttons 388 included in the template.

Figure 3E:
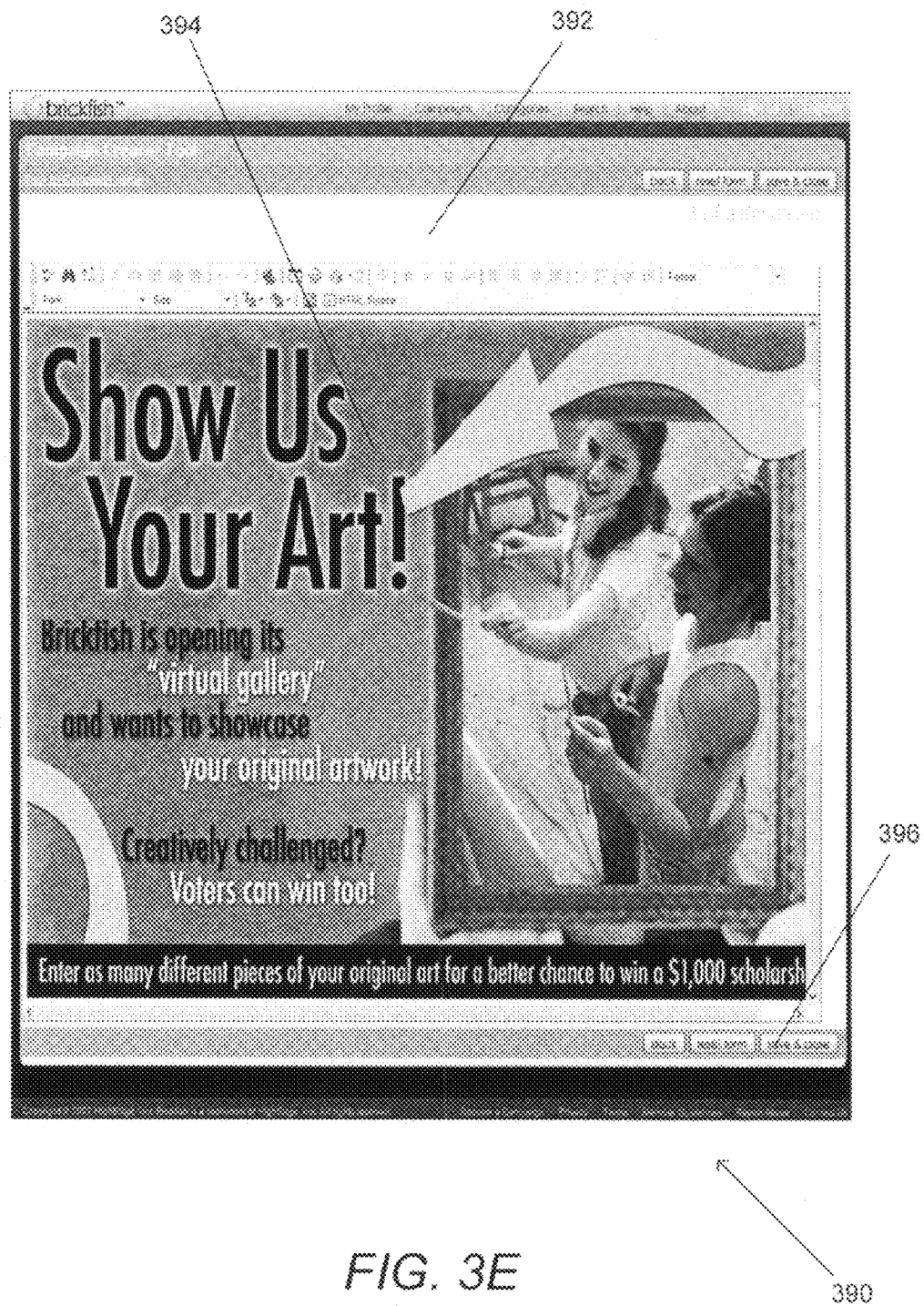

In many embodiments, the information entered via the template is used to generate a campaign home page (often referred to as a landing page). The landing page can be further enhanced using a HTML editor. A screen shot of a WYSIWIG HTML editor such as the FCKEditor.net distributed by Frederico Caldeira Knabben of Warsaw, Poland, provided by a campaign creator application to enable the enhancement of a campaign landing page generated from a template in accordance with an embodiment of the invention is shown in FIG. 3E. The screen shot 390 includes a series of toolbars enabling the addition of freeform text and graphics to the campaign landing page. The screen shot also shows a preview window 394 in which the campaign landing page can be reviewed and control buttons 396 enabling functions including the saving of the landing page. Although not shown in the templates described above, many campaign creation applications in accordance with embodiments of the invention include the ability to restrict the users that can access a campaign. In a number of embodiments the campaign creator is able to specify that the campaign be restricted based upon the geographic location of the user. When an online marketing platform supports geographically restricted campaigns, the platform uses the I.P. address of the user to determine the geographical location of the user. Once the user's location is known, the platform only display campaigns inclusive of submission from the user's region. In several embodiments, campaigns can also be created that are restricted to particular user demographics. An online marketing platform can restrict access to the campaign those users having a user profile that places them within the restricted geographic. In a number of embodiments campaigns are created as invitation only campaigns where invitations are issued based on geography and/or user demographic. In other embodiments, campaigns can be created that are restricted based upon any user characteristic capable of being detected by an online marketing platform.

Campaign Landing Page

Figure 4:
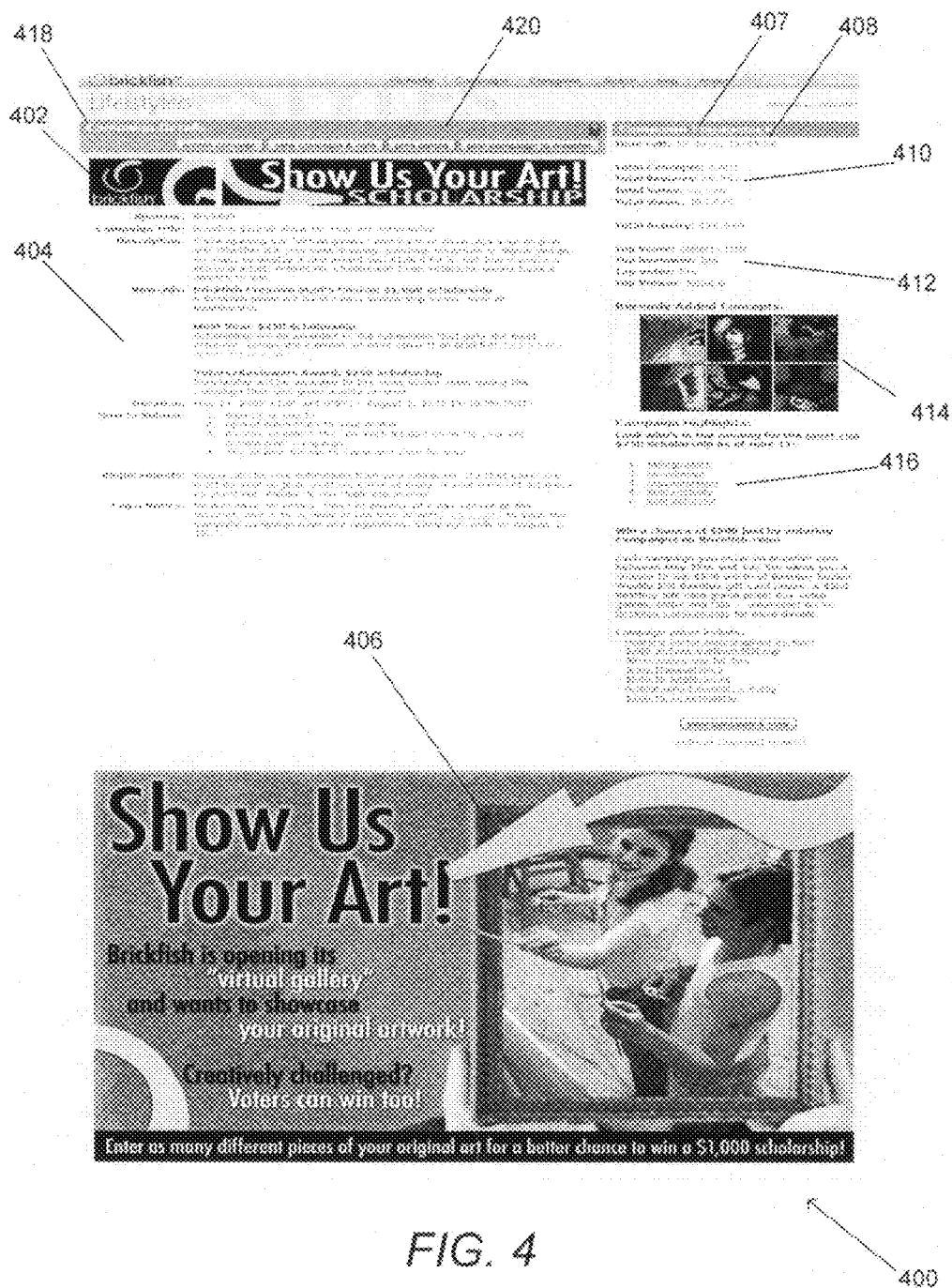
FIGS. 4 and 4A are screen shots of campaign landing web pages for two different campaigns in accordance with embodiments of the invention.

Once a campaign has been created and the campaign launches, online marketing platforms in accordance with many embodiments of the invention enable users to access a campaign landing page to find out more information about a campaign. A campaign landing page in accordance with embodiments of the invention is shown in FIG. 4. The campaign landing page includes a header graphic 402 that is positioned above a block of text 404. In the illustrated embodiment, the block of text incorporates information extracted from a variety of fields in the templates shown in FIGS. 3B and 3C. Below the text box is a graphic, which in the illustrated embodiment was inserted into the campaign landing page using the HTML editor shown in FIG. 3E.

On the right hand side of the campaign landing page is a panel 407 of information concerning user engagement with the campaign. The panel includes information 408 concerning the amount of time left in the campaign and statistics 410 concerning various aspects of the campaign. In the illustrated embodiment, the statistics include the total number of concepts submitted with respect to the campaign, the number of the concepts that are eligible to win the campaign, the total number of reviews submitted by users, the total number of votes that have been cast and the total number of views that have been registered. In other embodiments, a variety of statistics relating to engagement are displayed. The various ways in which a user can engage a campaign are discussed further below.

In addition to statistics concerning engagement, the panel 407 includes information 412 identifying users that are impacting the campaign. In the illustrated embodiment, the panel identifies the user with the highest score, the user that has provided the largest number of reviews, the user that has cast the most votes and the user that has viewed the greatest number of submissions. In other embodiments, other users can be identified based upon other metrics.

The panel 407 includes a series of thumbnails from recently added submissions. In other embodiments, thumbnails from the highest ranking submissions and/or randomly selected submissions can be displayed. In addition to thumbnails, the panel 407 also includes information 416 providing an overview of the campaign. When viewed by a user using an appropriately configured member device, the thumbnails are links that enable the user to access the submission represented by the thumbnails.

A user visiting a campaign landing page is provided with a number of buttons 420 that can be selected to perform functions including submitting a concept, transitioning to a view where submissions can be viewed and votes cast, printing the campaign details and propagating the campaign to other websites. Submission of concepts, viewing and voting for submissions and propagating campaigns to other websites are discussed further below. In a number of embodiments, printing the campaign details involves printing a pdf file generated using information collected with a template similar to the template 370 shown in FIG. 3D.

Figure 4A:

Although a specific layout for a campaign landing page is shown in FIG. 4, other layouts can be shown in accordance with embodiments of the invention. A screen shot of a campaign landing page that includes a video host is shown in FIG. 4A. Video clips of the video host are embedded in the campaign landing page 450 using an embedded video player 452. In other embodiments, other layouts and media content can be used to create campaign landing pages in accordance with embodiments of the invention.

Engagement

Engagement is any action that relates to any aspect of a campaign. A significant form of engagement is the act of submitting a response to a campaign. Other forms of engagement include user actions relating to another user's submissions, such as viewing a submission, and/or voting for the "best" amongst a number of different submissions. Engagement can also include the action of providing direct feedback in response to a submission. Associating a comment or a rating with a submission are examples of direct feedback. In many instances, engagement involves peer-to-peer or viral distribution of a submission or campaign. One form of peer-to-peer distribution is to send another user a link to a submission with a recommendation that the user review the submission. Another form of viral distribution is the propagation of a submission to a web site other than the web site that is hosting the campaign. Each of these forms of engagement is discussed further below.

Submission of a Concept

Figure 5:
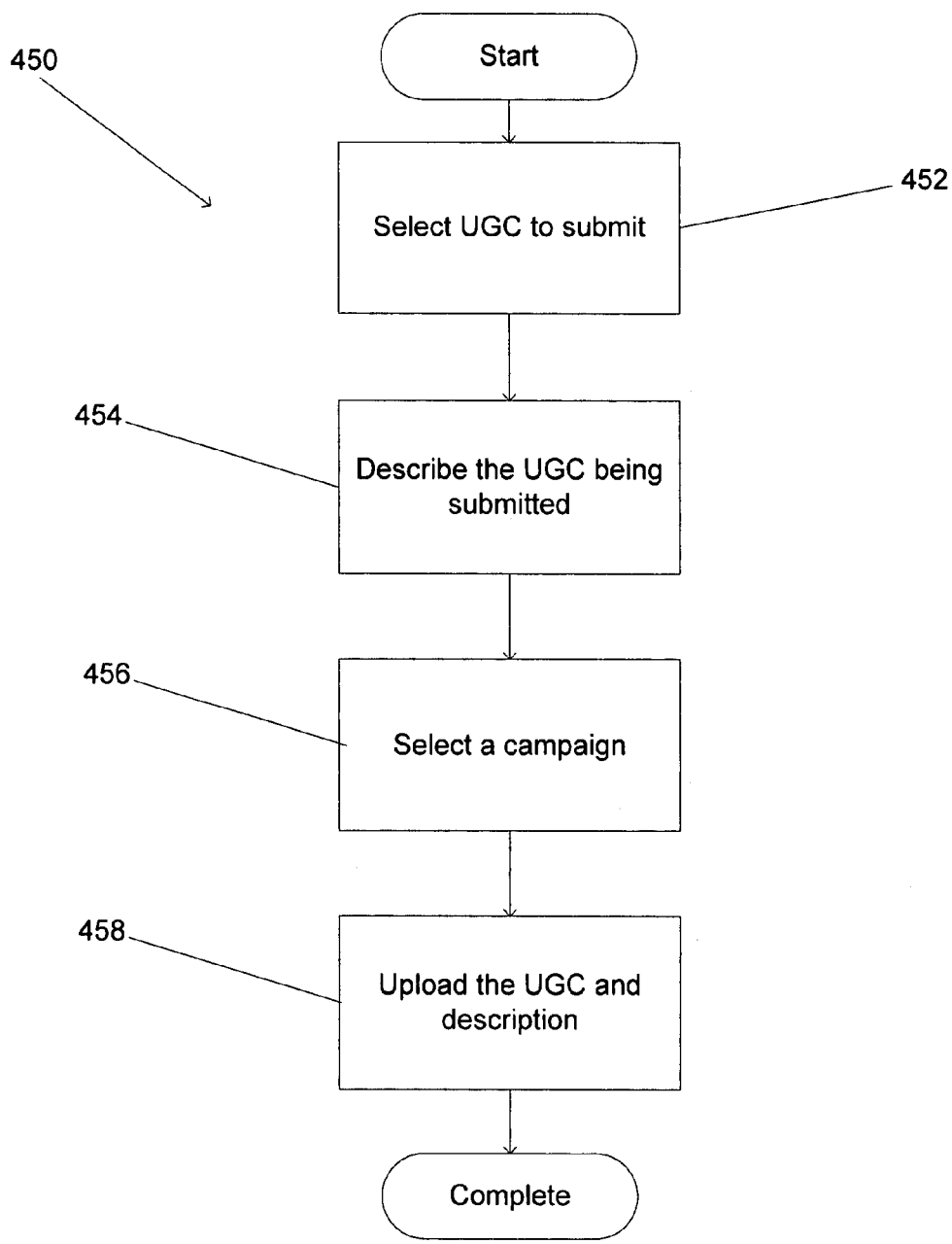
FIG. 5 is a flow chart showing a process for uploading user generated content in response to a campaign in accordance with an embodiment of the invention.

Submission of a concept in response to a campaign is a form of engagement that tends to drive wider engagement with a campaign. Online marketing platforms in accordance with embodiments of the invention typically include tools that automate the submission process. In a number of embodiments, web servers provide templates that are used to upload information associated with a submission into a database. The information stored in the database can then be used to generate web pages that include the submission and that facilitate engagement with the submission. The nature of the template used to automate submission is often dependent upon the nature of the UGC being submitted. A process for submitting a response to a campaign in accordance with an embodiment of the invention is shown in FIG. 5. The process 450 includes selecting (452) UGC to submit, describing (454) the UGC, identifying (458) the campaign to which the submission is responsive, and uploading (456) the UGC. In other embodiments, other processes can be used to make a submission responsive to a campaign. For example, several embodiments include campaigns that automatically submit a user's UGC in response to the campaign. In many embodiments, all UGC relevant to the type of the campaign is automatically submitted.

Image Submissions

Figure 5A:
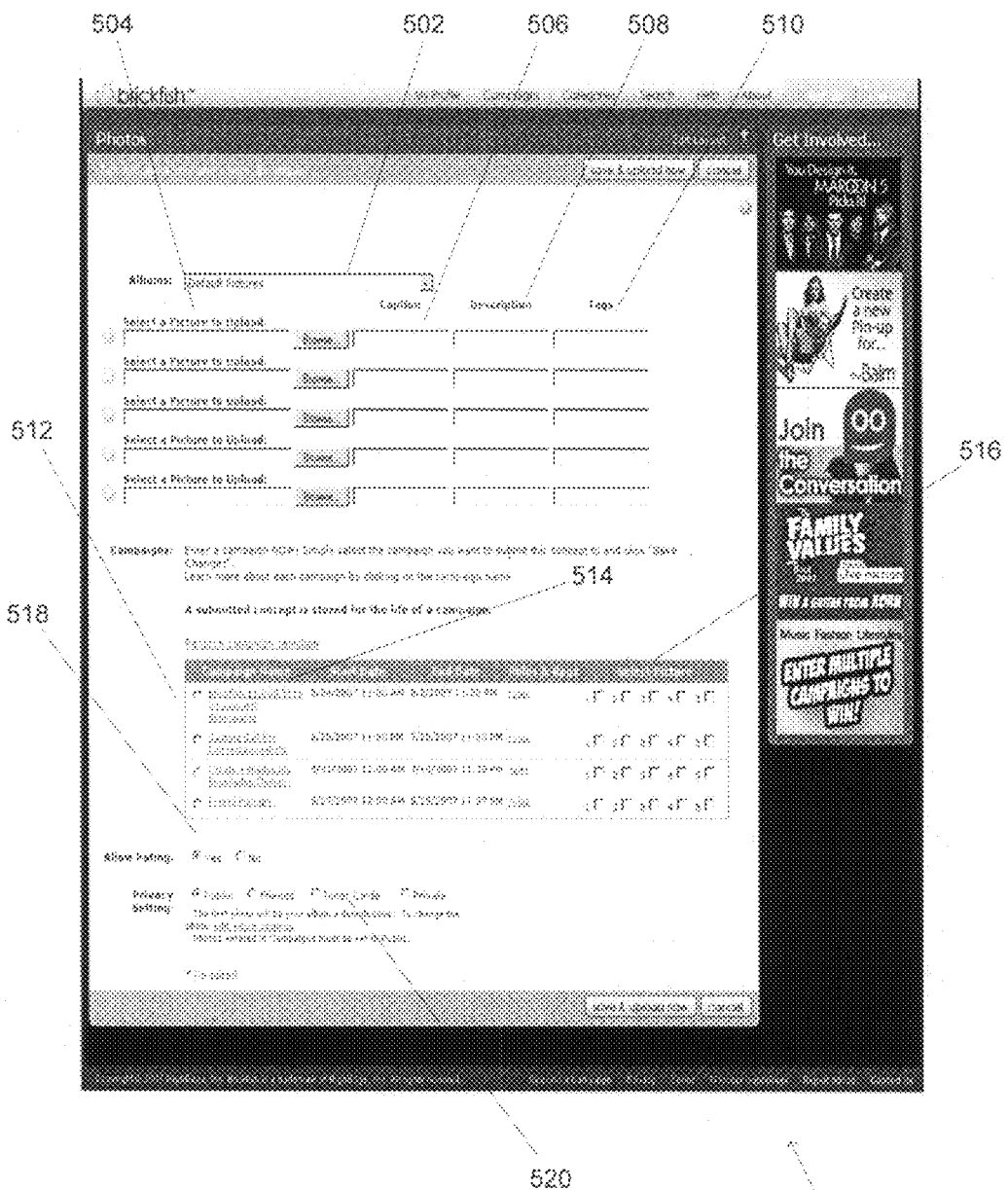

Any of a variety of templates and/or upload tools can be used to upload images in accordance with embodiments of the invention. A screen shot of a template provided by a web server that enables the uploading of multiple images for submission to one or more campaigns in accordance with an embodiment of the invention is shown in FIG. 5A. The template 500 includes a pull down menu enabling the selection of an album in which to upload one or more images. In many embodiments, users are able to establish profiles and upload images to their profiles. The incorporation of user profiles into an online marketing platform in accordance with an embodiment of the invention is discussed further below.

The template 500 also includes fields enabling the uploading of image files and the description of the content in the image files. A number of buttons 504 enable the selection of a file locally stored on the user's computer. A number of text boxes enable description of the image content. In the illustrated embodiment, five image files can be uploaded and a caption text box 502, a description text box 506, and a tags text box 510 are provided for description of each uploaded file. Text can be entered into these boxes that is used to generate a caption, a description and searchable tags associated with the image. In other embodiments, any number of files can be uploaded using the template and any variety of descriptive information can be captured concerning the content in each image file using any combination of data entry fields.

In addition to enabling uploading of image files, the template 500 shown in FIG. 5A enables the uploaded image to be submitted in response to a campaign. In the illustrated embodiment, all of the active campaigns, which are accepting images as submissions are presented in a list 512. The template provides check boxes 514 enabling the selection of a particular campaign and check boxes 516 that enables a user to indicate which of the uploaded images should be submitted as a response to a particular checked campaign. In other embodiments, other user interfaces can be used to upload image files and submit images to one or more currently active campaigns.

The template 500 also provides a number of additional fields that impact the ability of other users to engage with the images. In the illustrated embodiment, the template provides a toggle field 518 that enables a user to indicate whether the images can be rated by other users. The template also includes a toggle field 520 that enables users to grant permissions to access the image. For example, the image could be accessible to all users (i.e. "Public"), accessible to friends, an inner circle of defined friends or maintained as private. In other embodiments, other aspects of user engagement can be controlled by the user including the level of engagement granted to other users based upon those users' permissions. The various ways in which users can engage UGC are discussed further below.

When image files are uploaded, the images contained within the files are uploaded to a database within the online marketing platform and are associated with a particular campaign. In a number of embodiments, conversion applications are used to convert the images within the uploaded files to one or more selected formats. In one embodiment, images are stored in either the JPEG file format specified by the Joint Photographic Experts Group and adopted as ISO 10918-1 or the gif file format specified by CompuServe Information Services, which was acquired by AOL, LLC of Dulles, Va. In other embodiments, uploaded image files are converted to other file formats. When users view the campaign, the submission is presented as one of the submissions to the campaign. Viewing submissions and other forms of engagement are discussed further below.

Audio Submissions

Figure 5B:
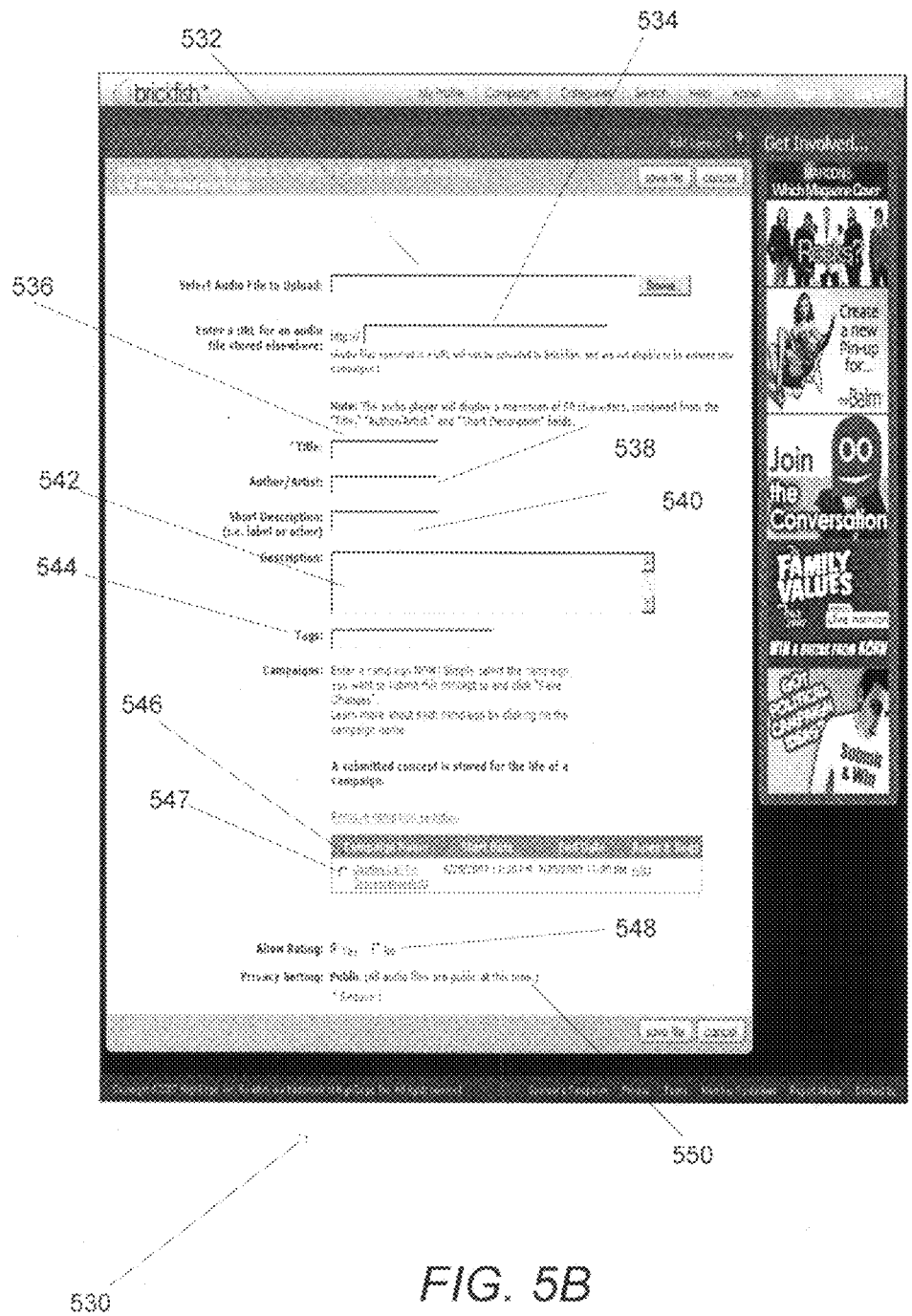

A screen shot of a template that can be used to provide audio submissions in response to a campaign in accordance with an embodiment of the invention is shown in FIG. 5B. The template 530 includes a button 532 that enables an audio file to be uploaded from a user's computer. An alternative to uploading a file is to specify the URL of an audio file in the text box 534.

In addition to providing information concerning the location of an audio file, the template 530 includes fields that enable the entry of descriptive information concerning the audio content. In the illustrated embodiment, the template 530 includes a text box 536 in which the title of the audio content can be entered, a text box 538 in which the author or artist of the audio content can be identified, a text box 540 in which a short description of the audio content can be entered, a text box 542 in which a more detailed description of the audio content can be entered, and a text box 544 in which tags can be entered. Tags can be used by online marketing platforms in accordance with embodiments of the invention to perform searches. In other embodiments, other fields can be used to obtain descriptive information concerning the content.

The template also provides information enabling the identified audio file to be submitted as a response to a campaign. The template includes a list 546 of campaigns that are currently accepting audio submissions and the user can submit the audio content to a campaign by checking a check box 547 associated with the campaign. In other embodiments, other user interfaces can be used to submit audio content in response to a campaign.

Incorporated within the template is another set of fields that determine the manner in which other users can engage the uploaded audio content. In the illustrated embodiment, the fields include a toggle 548 that indicates whether other users are allowed to rate the audio. Included on the template is a notice 550 that all audio files are public. In many embodiments, access to the audio file can be limited to certain classes of users such as friends. In other embodiments, fields regulating any number of forms of engagement with the uploaded audio content are provided.

When audio content has been submitted in response to a campaign, an audio file or a URL to an audio file containing the audio content is saved in a database within the online marketing platform. The audio content is then associated with the campaign and made accessible to users with appropriate permissions. Accessing of audio files and other forms of engagement are discussed further below.

Video Submissions

Figure 5C:
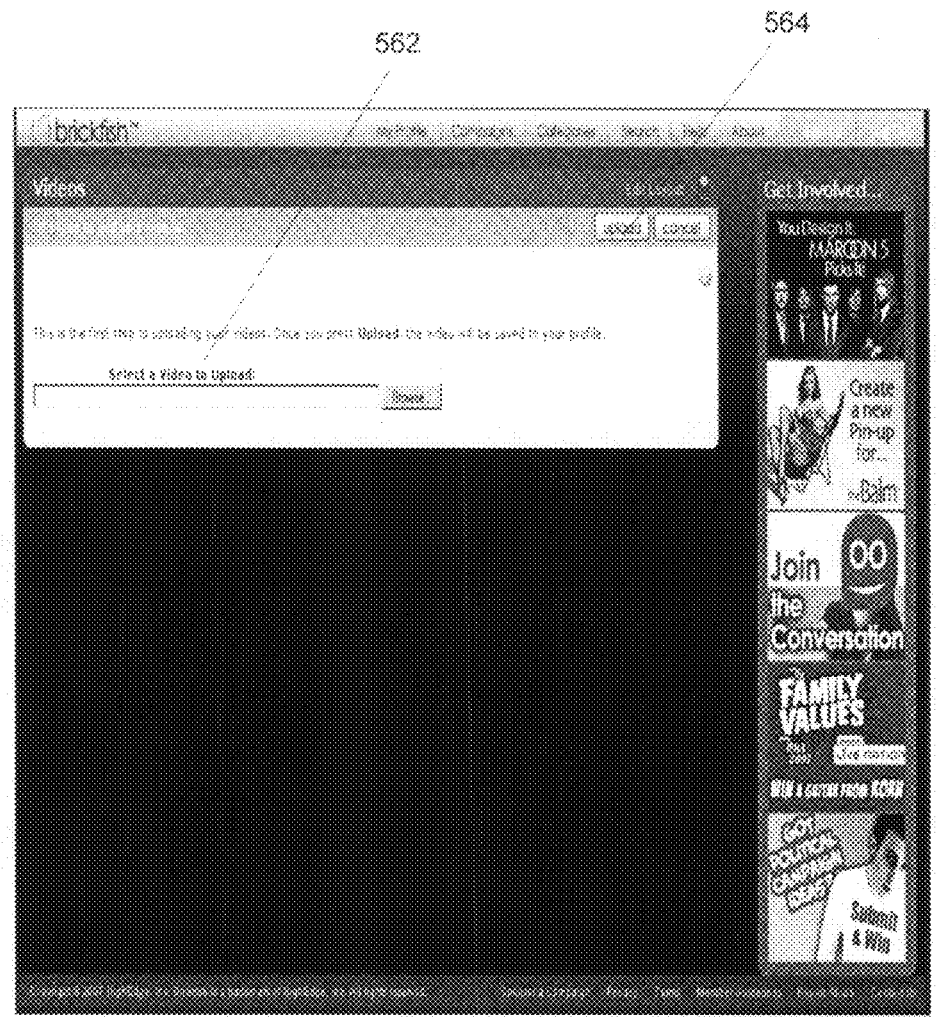
Figure 5D:
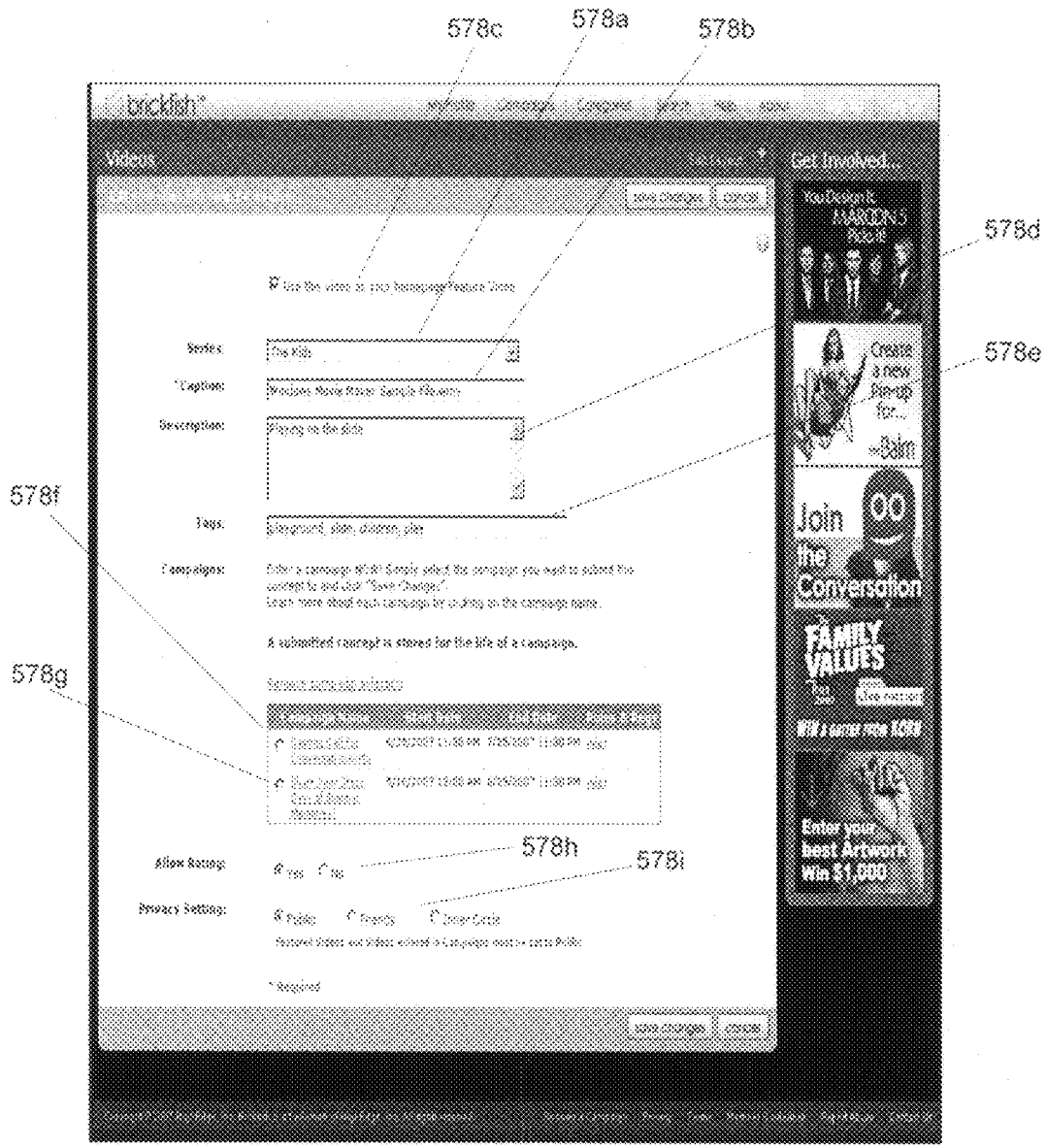

A screen shot showing a template that can be used to upload a video submission in response to a campaign in accordance with an embodiment of the invention is shown in FIG. 5C. The screen shot 560 includes a mechanism 562 for selecting a video file and a button 564 for uploading the video file. Once a file has been uploaded, the user is presented with the template shown in FIG. 5D. The template 578 includes a number of fields. A series is more than one segments of audio or video. A form that can be used to upload a series of videos in accordance with an embodiment of the invention is shown in FIG. 5D. The template 578 includes a pull down menu 578a that can be used to identify a series in which to include the video content, a text field 578b to enter a title, a check box 578c to indicate whether the video should be featured on the user's profile page, a text field 578e in which to enter descriptive information and a text field 578e in which searchable tags can be entered. In addition to descriptive information, the template 578 also includes a list of campaigns 578f that are currently accepting video submissions. Each campaign in the list has an associated check box 578g that can be used to select one of the campaigns. A number of fields are also included that in the template that regulate user engagement with the submission. A toggle field 578h determines whether users can rate the video content and a toggle field 578i determines who can view the video content. Although specific templates are shown in FIGS. 5C and 5D, any mechanism enabling the uploading of a video file to a server can be used to submit video content in response to a campaign in accordance with an embodiment of the invention.

When a video file has been submitted in response to a campaign, the video file is uploaded to a database within the online marketing platform. Web servers within the online marketing platform enable users to access the video content. Viewing of video content and other forms of engagement involving video are discussed in detail below.

Series Submissions

In a number of embodiments, an audio series or a video series can be submitted to a campaign. A series is more than one segment of audio or video. A form that can be used to upload a series of videos in accordance with an embodiment of the invention is shown in FIG. 5D. In other embodiments, other mechanisms are used to submit a series of audio and/or video to a campaign.

Blog Submissions

Figure 5E:
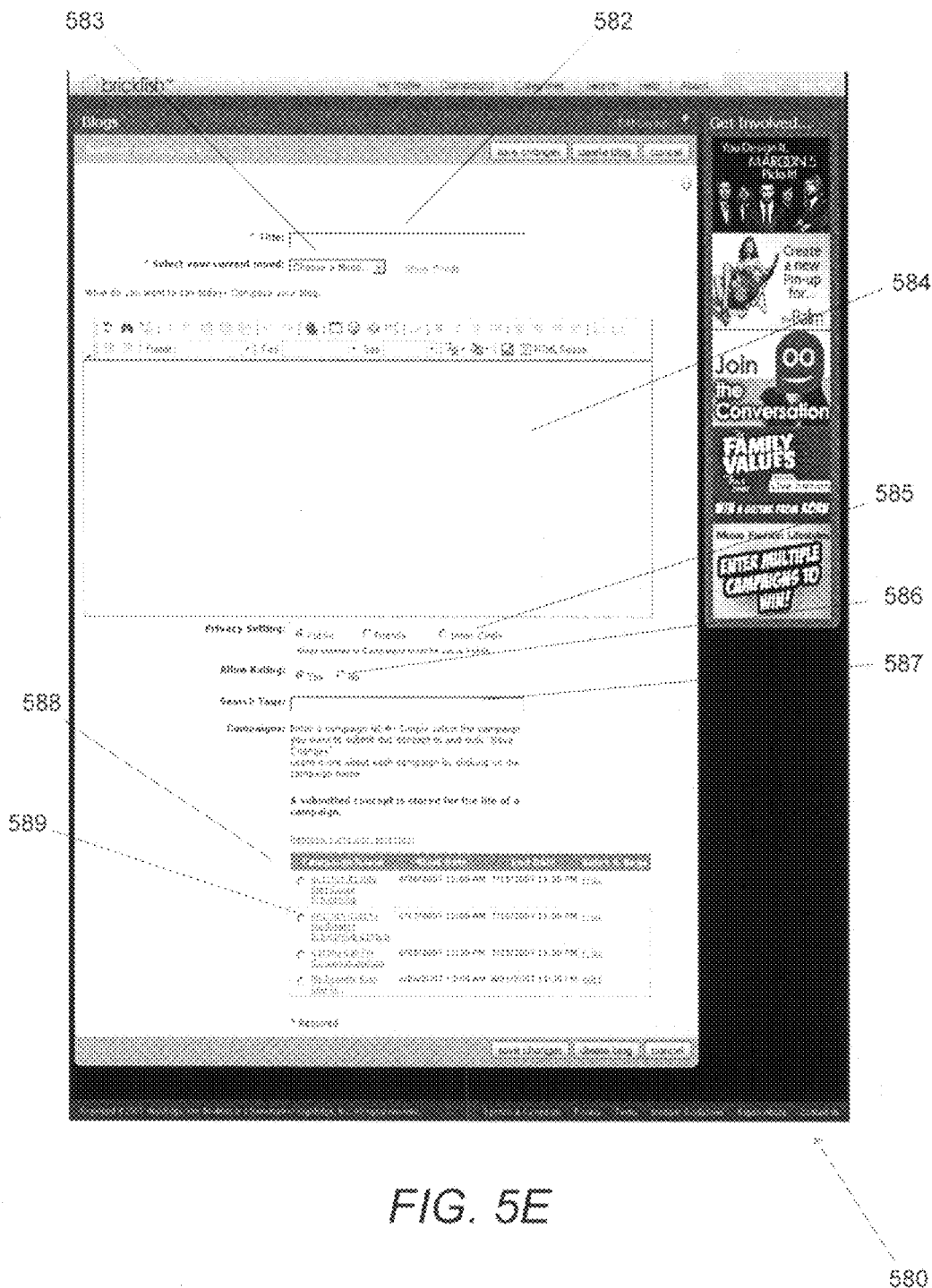

As discussed above, many campaigns can involve submission of a point of view. In several embodiments, the point of view is submitted as a blog entry. A screen shot of a template that can be used to provide a blog submission in response to a campaign is shown in FIG. 5E. The template 580 includes a text field 582 in which the title of the blog entry can be entered and a pull down menu 582 that can be used to indicate the user's mood when submitting or composing the blog. The template also includes a text field 584 in which a blog entry can be entered. A number of fields are provided for regulating the engagement of other users with respect to the blog entry. A toggle 585 determines the users that can access the blog entry and a toggle 586 determines whether users can rate the blog entry. Searchable tags can also be entered in a text field 587.

The template 580 enables users to submit a blog entry in response to a specific campaign. A user can select a campaign from a list of campaigns 588 using a check box 589 associated with the campaign. When a user submits a blog entry in response to a campaign, the blog entry is saved in a database within the online marketing platform. Depending on the permissions provided by the user that uploaded the blog entry, web servers can provide users with access to the blog entry. Viewing of blog entries and other forms of engagement are discussed further below.

Mashup Submissions

Mashups are a form of content that includes a series of images and/or video clips that have been spliced together to make a video. A mashup may include transition effects between scenes such as fading. It may include a separate audio track, borders, effects, or other manipulations of the original images and videos. Mashups are typically characterized in that the image and/or video clips are drawn from content that is being repurposed. The mashup effectively contextualizes the content in a manner that was not envisaged at the time of the content's creation. Online marketing platforms in accordance with a number of embodiments of the invention include a web based mashup authoring tool to facilitate the creation of mashups.

User interfaces including forms similar to those described above with respect to video can be used to submit mashups in response to campaigns in accordance with embodiments of the invention. When a mashup is submitted, the mashup and other information captured during the submission are stored in a database within the online marketing platform. Web servers can then provide access to the mashup. Viewing mashups and other forms of engagement are discussed further below.

General Submission Templates

Figure 5F:
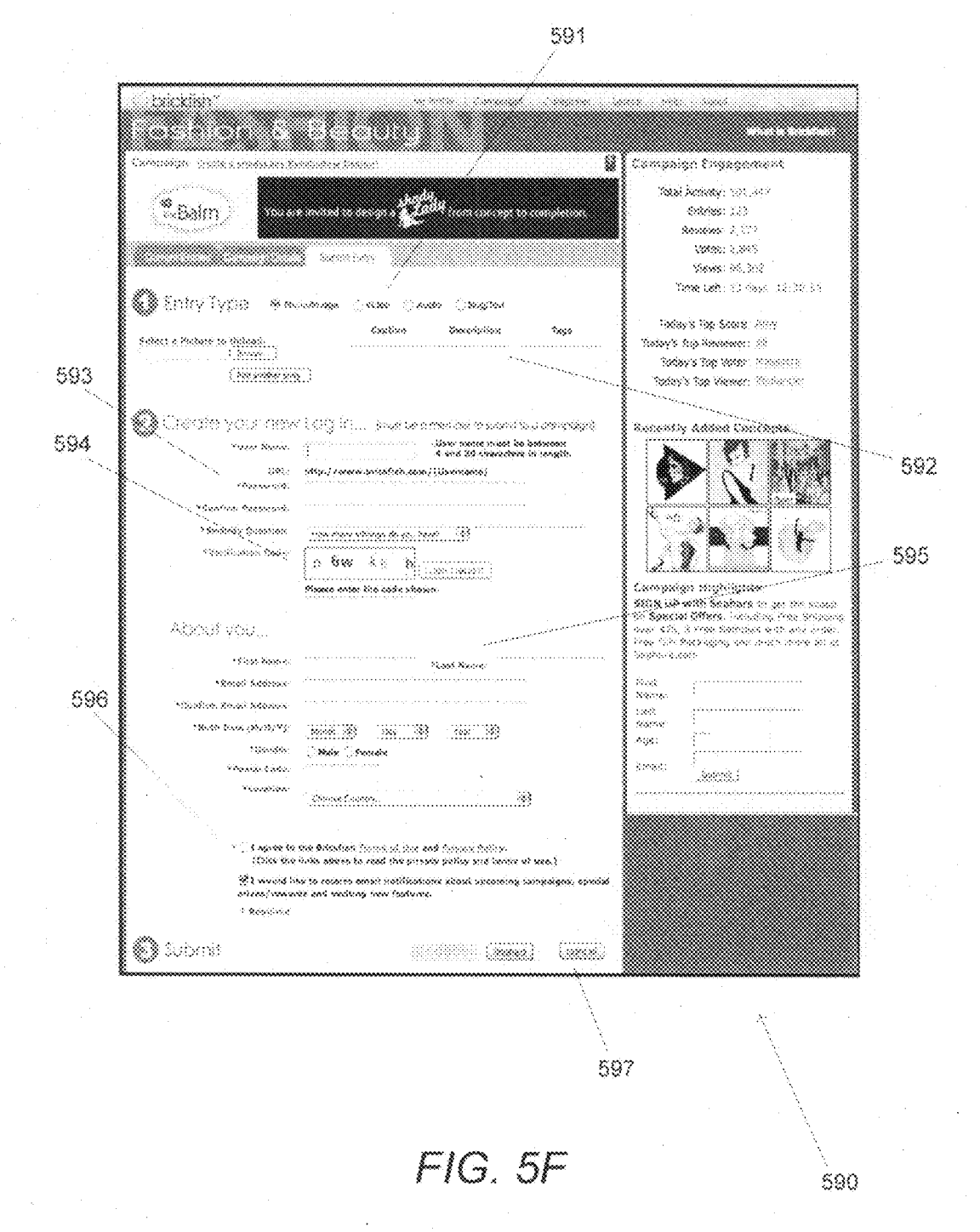

The examples discussed above utilize separate templates to capture information relevant to the specific type of media included in a submission. In a number of embodiments a generic template is used to facilitate submission of any type of media. A screen shot of a generic template is shown in FIG. 5F. The template 590 includes a toggle 591 that indicates the type of media used to express the submitted content. The template also includes a number of text fields 592 that enable description of the content and the association of searchable tags with the content.

The template 590 also includes text boxes 593 for capturing sign-in information and a CAPTCHA 594 (or similar mechanism). The sign in requirement and CAPTCHA increase the likelihood that the submission is from an actual person and not automatically generated. Fields 595 are also provided that enable a user to create an account with the online marketing platform. A check box 596 is also provided to confirm the user's consent to terms governing the submission of entries using the online marketing campaign. Control buttons 597 enable the completion of the submission, which is typically handled by the online marketing platform in a manner similar to that outlined above.

Poll/Survey Submissions

Figure 6:
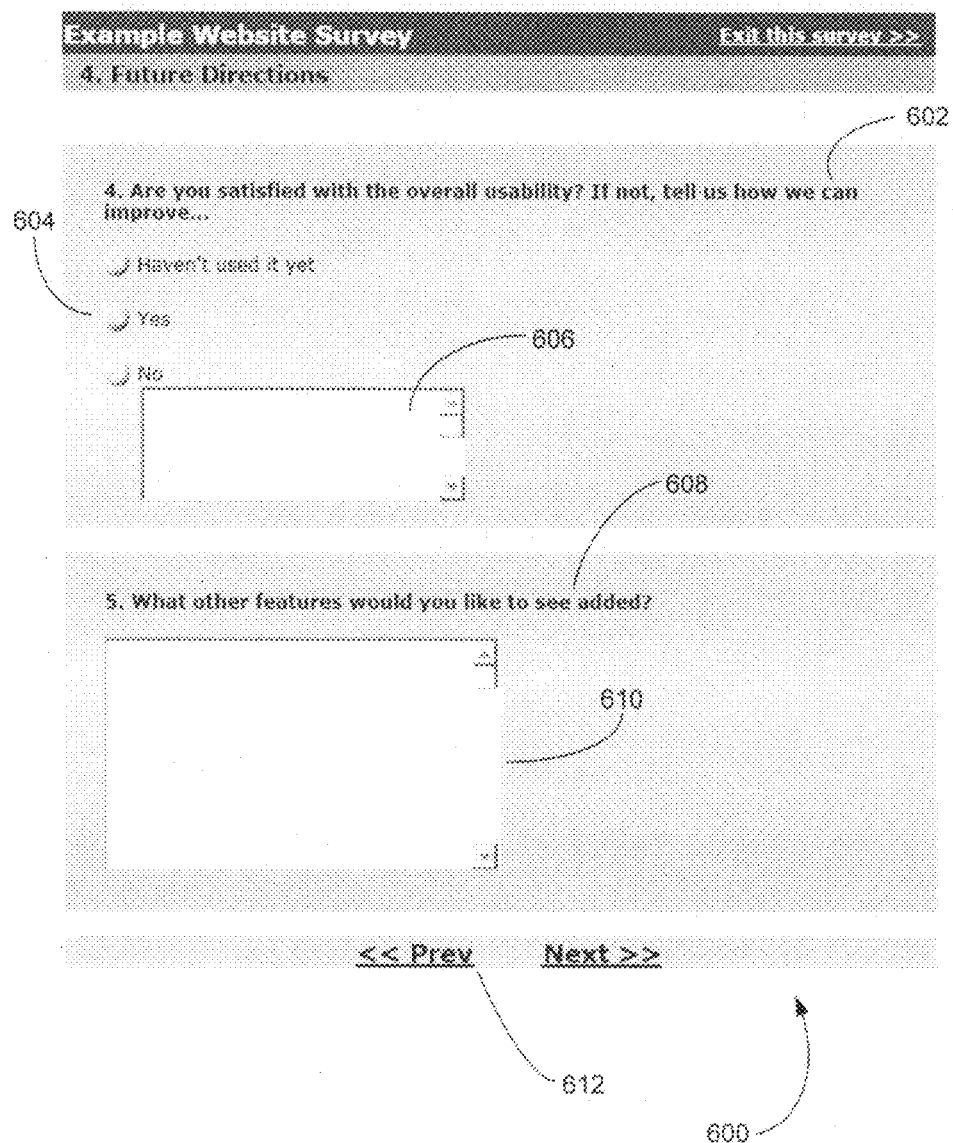
FIG. 6 is a screen shot of a form for receiving user submissions in response to a survey in accordance with an embodiment of the invention.

As discussed above, campaigns in accordance with many embodiments of the invention include polls or surveys. In many embodiments, polls are conducted using a series of text questions that solicit check box or toggle responses. A poll or survey can also include text boxes that enable free form responses to a question. A screen shot of a web page including several survey questions in accordance with an embodiment of the invention is shown in FIG. 6. The screen shot 600 includes the text 602 of a survey question and a toggle 604 to indicate an answer to the question. A text box 606 is also included. The text box 606 enables a user to elaborate in the event that the answer "No" is selected in response to the question. The screen shot shows a second question 608 that includes a text box 610. The text box 610 enables a user to enter free form text as a response. In addition to questions and fields to receive answers, the screen shot also includes links 612 that enable the user to navigate between pages of questions in the survey.

When a user submits responses to questions in a survey, the responses are stored in a database within the online marketing platform. The creator of the survey typically defines the manner in which other users can engage with the survey responses. Engagement with surveys and survey responses is discussed further below.

Viewing UGC

As discussed above, engagement with a campaign can take any of a variety of forms. The form of engagement that tends to occur with the highest frequency is the viewing of UGC submitted in response to a campaign. The term "view" is used here to describe the act of simply accessing a web page that includes information concerning a submission. In many embodiments, a web page including a number of submissions that were submitted in response to a campaign can be accessed via a link on the campaign's landing page. In a number of embodiments, the online marketing platform supports an online community with user profile pages and submissions can be viewed on the profile pages of the users responsible for the submissions. Submissions can also be propagated to any of a variety of web pages, where the submissions can be viewed. In a number of embodiments, a view is considered to have occurred when data including the submission is retrieved and formatted for viewing by a user (e.g. when submissions are part of an RSS feed). In several embodiments where a number of submissions are presented on a single web page, a view is only registered when a user scrolls over a submission to obtain additional information concerning the submission. Scroll over engagement is discussed further below.

Figure 7A:
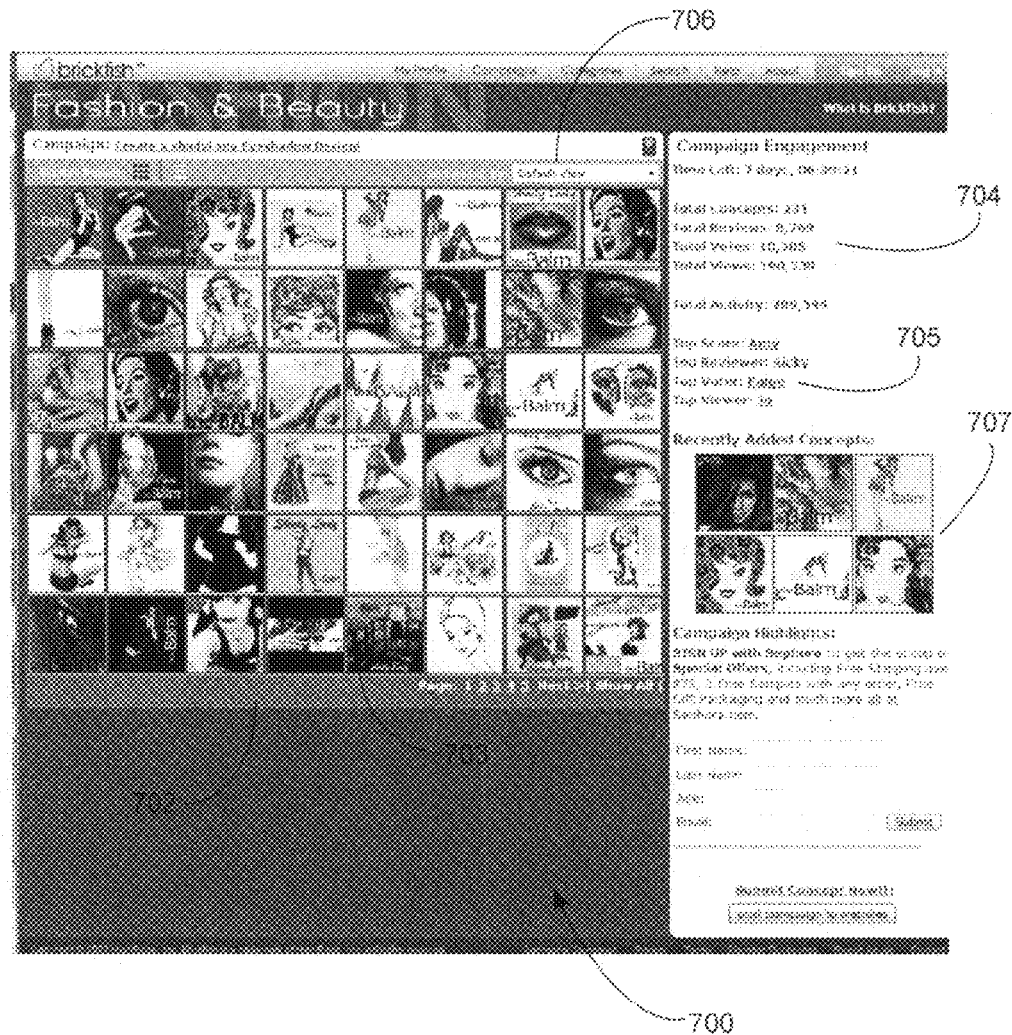
FIGS. 7A-7G are screen shots of web pages including submissions to campaigns in accordance with embodiments of the invention.

A screen shot of a web page including a submission of an image in accordance with an embodiment of the invention is shown in FIG. 7A. The screen shot 700 includes a grid 702 of thumbnail images 703. Each thumbnail is a thumbnail of an image submitted in response to the campaign. Each submission can be accessed by selecting its thumbnail. In addition to the thumbnails, the page includes statistics 704 concerning engagement with the campaign and information 705 identifying users that have had significant engagement with the campaign. The submissions selected for display in the grid can be determined in accordance with a variety of algorithms. In one embodiment, the grid includes the submissions that have achieved the highest levels of engagement. In another embodiment, the grid includes the submissions most recently added. In other embodiments, the submissions included in the grid view are determined using an algorithm that displays submissions, which have achieved high levels of engagement over a long period of time with submissions that have achieved a proportionately high level of engagement over a shorter period of time. In the illustrated embodiment, a pull down menu 706 is provided that enables the user to choose the submissions displayed in the grid view from one of a number of options. In addition to the grid view, a smaller grid 707 is provided that shows recently added submissions.

Figure 7B:
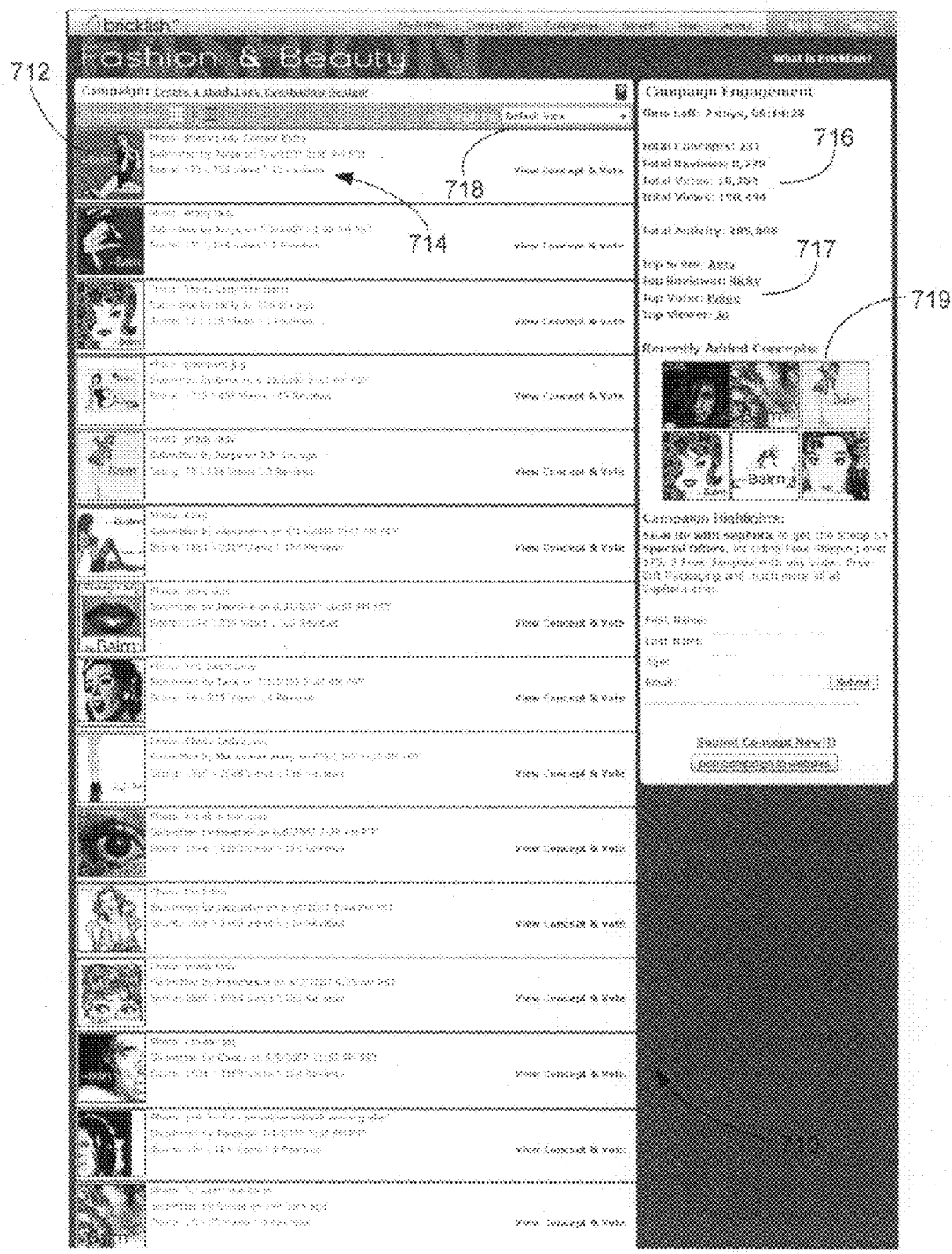

A screen shot of a web page including a number of submissions of images presented as an array of thumbnail images in accordance with an embodiment of the invention is shown in FIG. 7B. The screen shot 710 includes a list of thumbnails 712 of submissions and descriptive information 714 associated with the submission. In the illustrated embodiment, the descriptive information includes the title of the submission, the user that submitted the image and statistics concerning engagement with the submission. The web page also includes statistics 716 concerning engagement with the campaign and information 717 identifying users that have had significant engagement with the campaign. As with the grid view shown in FIG. 7A, the list view shown in FIG. 7B can be configured by the user to display submissions based on one of a number of different criteria. The specific criterion is selected using a pull down menu 718. In addition to the list view, the web page includes a small grid 719 showing recently added submissions. In the same way that a user can access a submission from the grid shown in FIG. 7A, a user can access one of the submissions in the list of submissions shown in FIG. 7B by selecting the submission of interest.

Figure 7C:

A screen shot showing a web page including an image submitted in response to a campaign in accordance with an embodiment of the invention is shown in FIG. 7C. The screen shot 730 includes an image 732 and descriptive text 734 that accompanies the image. The web page also includes statistics 736 concerning the progress of the submission within the campaign and statistics 738 concerning engagement with the submission.

In addition to information concerning the submission, the web page also includes information 740 concerning the user responsible for the submission. In the illustrated embodiment, the information concerning the user includes an image and the user's display name. In other embodiments, other information concerning a user can be displayed.

The web page also includes information 741 enabling the viral distribution of the submission. In the illustrated embodiment, the information includes a URL that can be used to refer other users to the submission and information that can be used to manually propagate the submission to other web sites, via instant messaging (IM), email and other methods of electronic viral distribution. The viral distribution of submissions is discussed further below.

Reviews 742 of the submission posted by other users are also included on the web page. The reviews are listed below the submitted image and include information identifying the user that submitted the review and a text comment. In other embodiments, reviews can include other information including a rating of the submission. Submission of reviews is discussed further below.

Additional information concerning the campaign is also displayed on the web page 730. In the illustrated embodiment, the information includes a scrolling display 744 of thumbnails showing the relative ranking of the submission and a small grid 746 of thumbnails showing recommended submissions. Users may also navigate to the full listing of concepts entered in response to a campaign. The recommendations can be made based upon voting and/or engagement patterns of other users. In a number of embodiments, a recommendation engine determines the users that engaged with the submission being viewed and recommends other submissions which those users engaged. The recommendation engine is designed to fuel engagement by feeding visitors to a page containing a submission with other concepts that might be of interest to the user. The scrolling display and the thumbnails can be used to access other submissions.

Figure 7D:
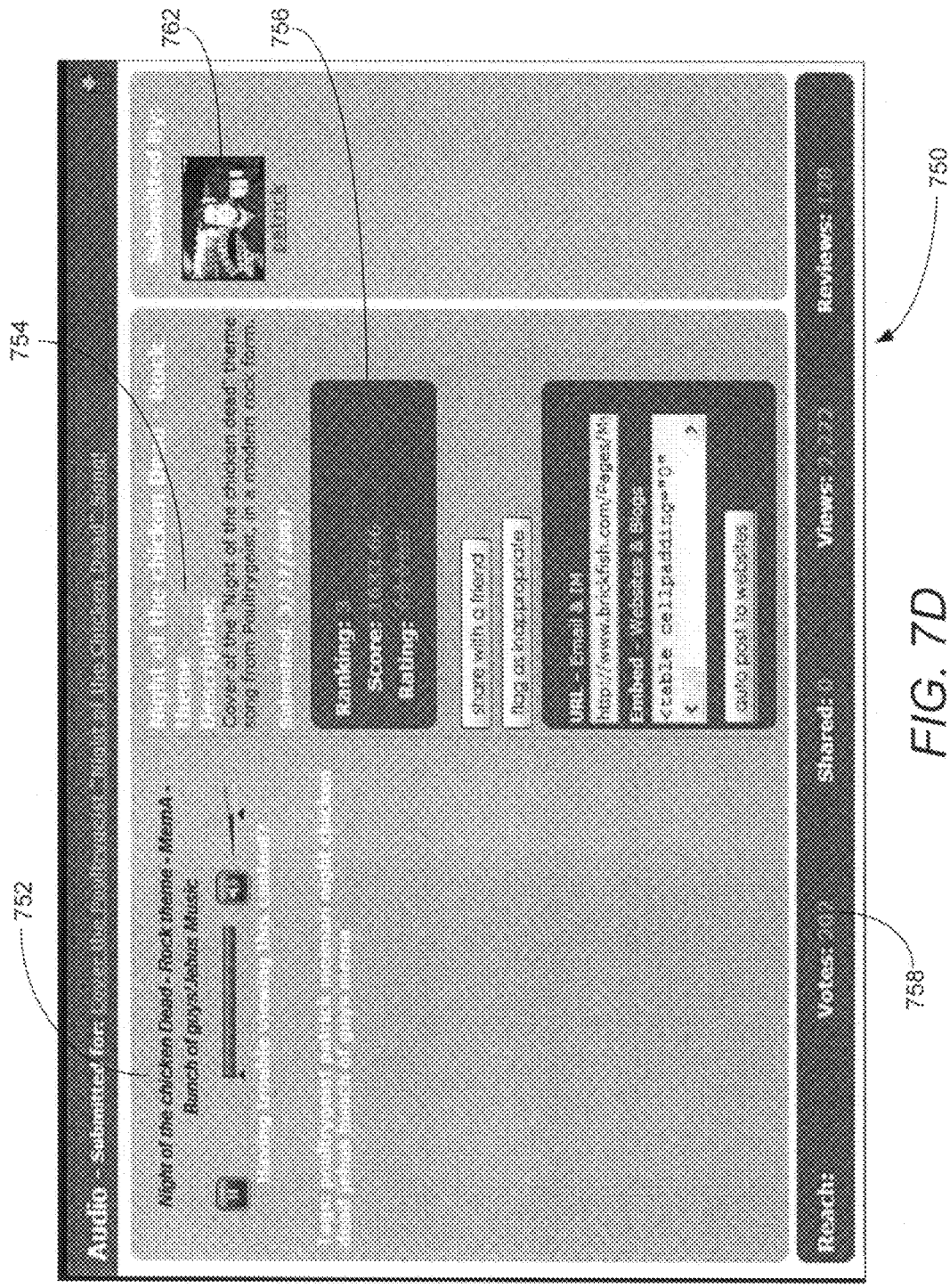

A screen shot showing an audio submission in accordance with an embodiment of the invention is shown in FIG. 7D. The web page 750 includes a player 752 that is configured to play the audio submission. The web page also includes descriptive information 754 concerning the submission, statistics concerning the progress of the submission, and statistics concerning engagement with the submission. The web page also includes information 760 facilitating the viral distribution of the submission. In the illustrated embodiment, the information 760 includes a URL that can be used to refer the submission to other users and information that can be used to manually propagate the submission to other web sites.

The web page 750 also includes information 762 concerning the user that submitted the audio content. In the illustrated embodiment, the user information includes an image and a user's display name. Users can navigate to a full profile of the user to view more detailed information concerning the user and any additional campaign entries that the user may have submitted in any of a variety of campaigns. In other embodiments, other information can be provided concerning the user.

Figure 7E:
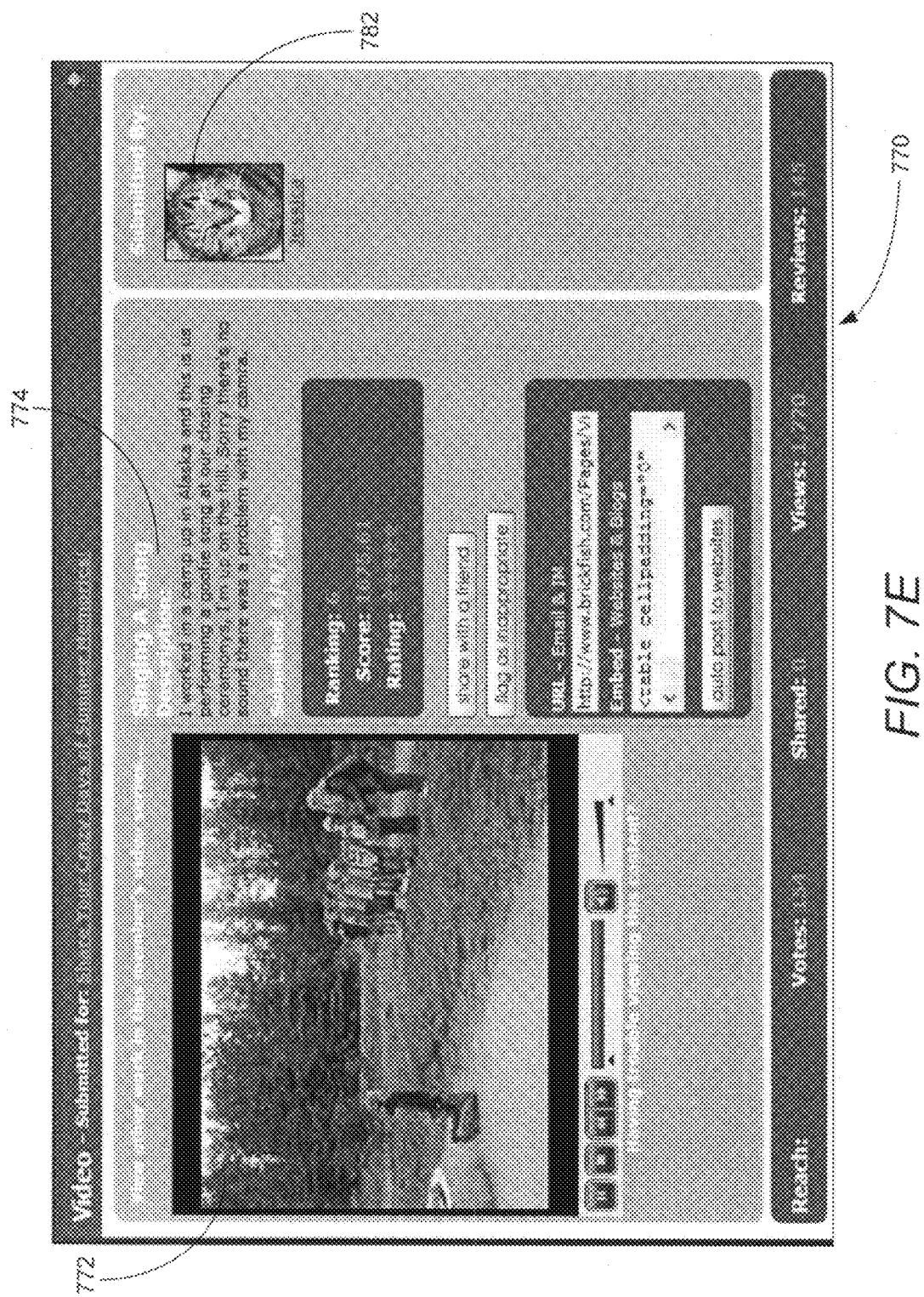

A screen shot showing a video submission in accordance with an embodiment of the invention is shown in FIG. 7E. The web page 770 includes a video player 772 that can be used view the video submission. The web page also includes text 774 describing the video submission, statistics 776 concerning the progress of the submission, and statistics 778 concerning engagement with the submission. The web page also includes a variety of buttons 780 and information 782 that enable users to engage with the submission. A button enables a user to cast a vote and share the submission with a friend. In addition, a URL 783 is provided that enables the submission to be referred to a friend. Information 784 is also provided that enables the manual and/or automatic propagation of the submission. A user may also submit a rating based on 1 to 5 stars as well as post a review about this particular submission, campaign and/or campaign creator. As with several of the web pages described above, information 782 is also provided with respect to the user responsible for the submission. Users can obtain more granular detailed information by clicking on the user who submitted the concept and seeing the user's full profile.

A similar web page to the web page shown in FIG. 7E can be used to display mashup submissions. A mashup player that is distinct from the video player 772 shown in FIG. 7E can be used to play a mashup depending upon the manner in which the mashup is stored within the online marketing platform. A user accessing a mashup is typically provided with the same experience as a user accessing a video submission.

A user's ability to view a poll or a survey in accordance with an embodiment of the invention is typically determined by the nature of the poll or survey. In a number of embodiments, the user is not able to view individual submissions, but can view statistics collated across the entire group of respondents and/or certain subsets of the survey respondents. In other embodiments, a user can share the user's own survey results with friends or the user can be provided with information concerning other users that provides similar survey responses. In several embodiments, a user's survey responses are displayed on a web page associated with the user for any user to view. In other embodiments, other opportunities to view poll and/or survey results are provided.

Figure 7F:
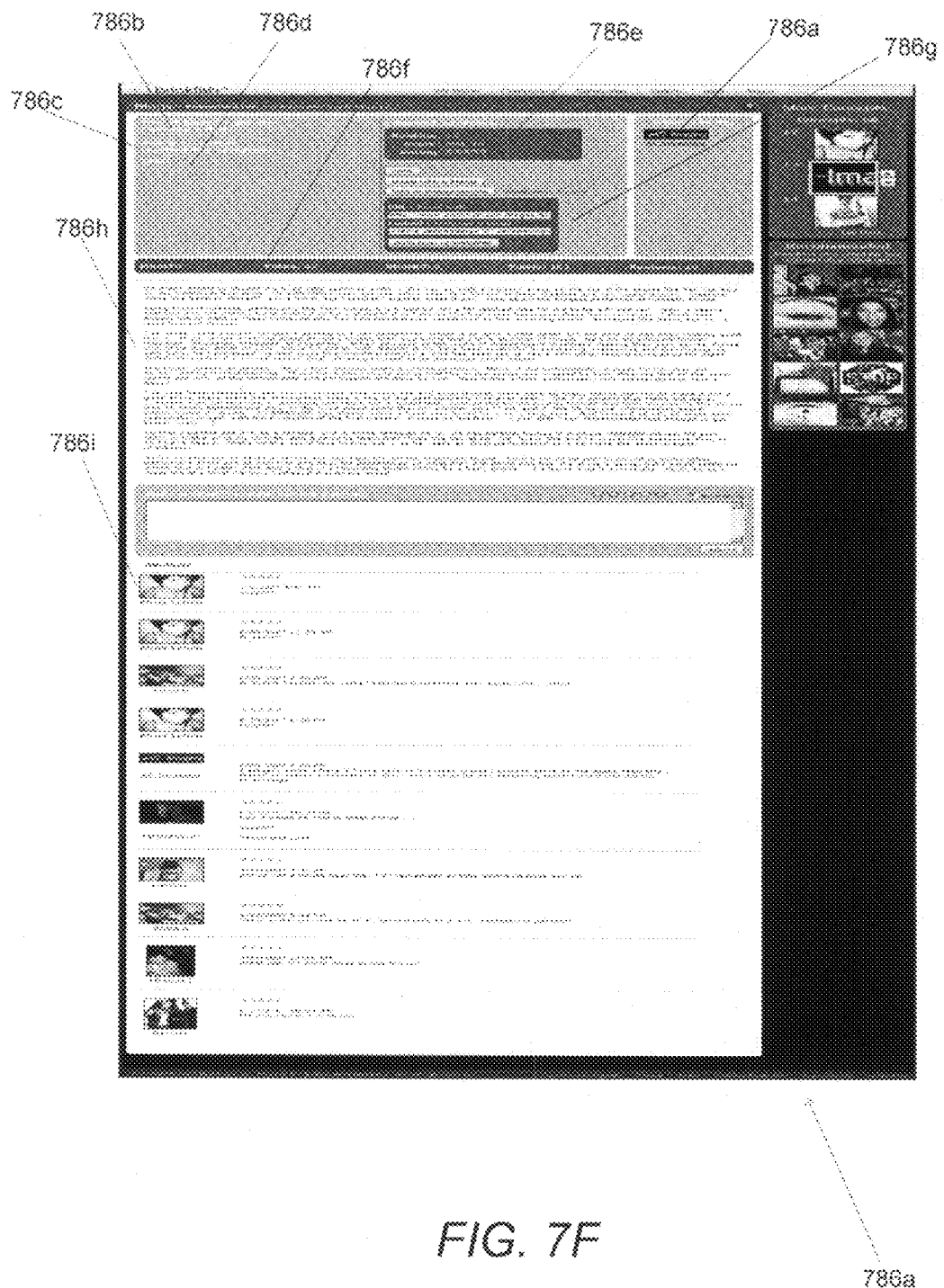

A web page including a blog submission in accordance with an embodiment of the invention is shown in FIG. 7F. The web page 786a includes information 786a identifying the user that submitted the blog entry, a title 786b of the blog entry and the date 786c on which the blog entry was added. In addition to the above descriptive information, the web page 786a also includes tags 786d, statistics 786e concerning the impact that the blog submission is having within a campaign, and statistics 786f concerning user engagement with the blog entry. The web page also includes information 786g enabling the viral distribution of the blog entry and the text 786h of the blog entry itself. Below the text of the blog entry are remarks 786i that users have posted with respect to the entry and to the right of the blog entry are a scrolling list 786j of thumbnails of submissions in rank order and a small grid 786k of thumbnails showing recommended submissions. Although a specific web page layout is shown in FIG. 7F, other web page layouts can be used for viewing blog submissions. In a number of embodiments, blog submissions can be presented in a web page in the form of a debate. In several embodiments, the blog submissions are presented side by side for comparison purposes.

The act of viewing is typically a passive act. In many embodiments, scrolling over a submission (without clicking or selecting it) can result in additional information being displayed in relation to the submission and/or the display of a larger image associated with the submission. In many embodiments, the act of scrolling over a submission is separately recorded as a "scroll-over" or "active view". The subtle act of scrolling over the submission is considered in many embodiments to be an indication of a higher level of interest than simply visiting a website from which the submission can be accessed.

Figure 7G:

A screen shot showing a user scrolling over an image submission to obtain additional information concerning the submission is shown in FIG. 7G. The screen shot is of the web page 700 shown in FIG. 7A with the user scrolling over one of the submission thumbnails 703 in the grid 702. The scroll over causes a window 790 to be displayed that includes a larger image 792 of the submission, descriptive information 794 concerning the submission, and statistics concerning the progress of the submission. In other embodiments, other scroll over events can be used to present additional information concerning submissions to users viewing a campaign.

Although many of the web pages described above are provide by web servers associated with a site hosting a campaign, many embodiments of the invention enable propagation of submissions to other web sites and, as is discussed further below, engagement activities such as viewing, playing, click through to obtain more information, voting and reviewing of users with propagated submissions can be tracked by the online marketing platform.

Accessing UGC

Viewing a submission is a passive form of engaging with a submission. A submission can also be accessed. "Accessing" is a term used to describe an affirmative action to more deeply engage the content of a submission and online marketing platforms in accordance with many embodiments of the invention track accesses of submissions separately from submission views. When the submission is an image, accessing the submission typically involves clicking on a thumbnail. When the image is audio content, video convent, or a mashup, accessing the submission typically involves playing the content using a player embedded within the web site. When a campaign involves a survey, accessing, the survey results can involve reviewing the answers to the questions. Reviewing survey answers often involves clicking on a thumbnail or navigating between a numbers of different pages including the submitted answers. In other embodiments, other actions that lead to a deeper engagement with the content of the submission are considered accessing the submission.

Voting

An important aspect of many campaigns is user involvement in the selection of one or more winners of the campaign. Online marketing platforms in accordance with many embodiments of the invention provide mechanisms that enable users to vote for their preferred submissions. In a number of embodiments, users can vote by pressing a button provided on the page on which the user viewed and/or accessed the submission. In many embodiments, users can vote for more than one submission and, in several embodiments, can vote for a submission more than once. In a number of embodiments, the frequency with which a user can vote during a specified timeframe is once every 24 hours. The frequency of voting can be set to occur once every x minutes on a per campaign basis in the campaign manager. In many embodiments, techniques are used for weighting votes and for detecting users that are trying to unfairly influence the outcome of a campaign. Systems and methods for coordinating voting during a campaign are discussed in the U.S. patent application entitled "System and Method for Voting in Online Competitions" to Rose et al., filed Jul. 27, 2007, the disclosure of which is incorporated above by reference in its entirety.

In a number of embodiments, voting for a submission includes selecting as a favorite one of a number of submissions displayed side by side. Online marketing platforms in accordance with many embodiments of the invention use this display to enable users to cycle through the submissions in a campaign and pick between pairs of submissions to narrow down to a single entry. In addition to enabling a user to sort through a number of entries, online marketing platforms can collect information during side by side comparisons to keep track of the submissions that a user preferred. A user can watch a preferred submission and compare the preferred entry or entries against new submissions. In a number of embodiments, the user is notified when new submissions are added. In other embodiments, the user is notified when a submission that the user has not viewed reaches a predetermined engagement score.

Figure 8A:
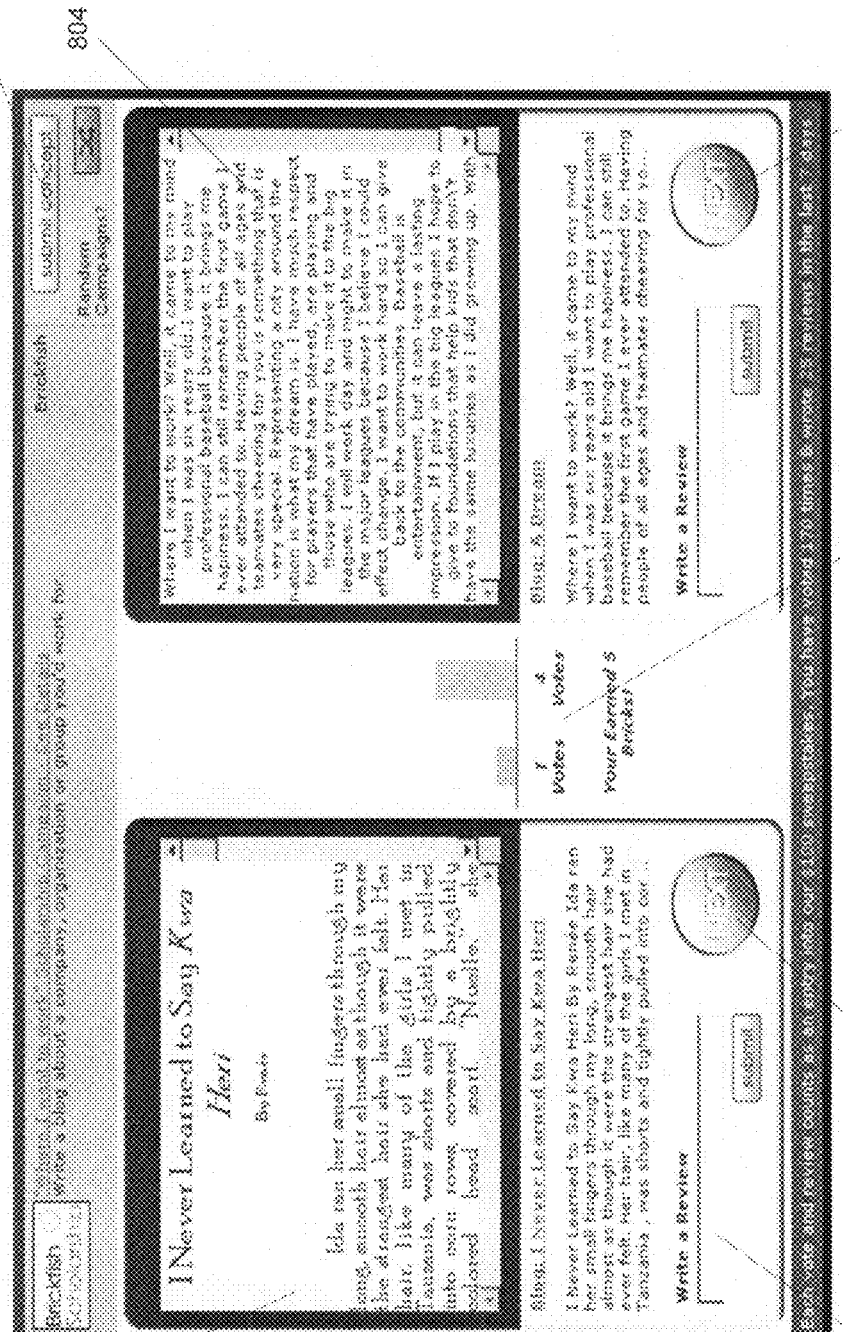
FIG. 8A is a screen shot of web page including a side by side display of two blog submissions in accordance with an embodiment of the invention.

A screen shot of a web page including two blog submissions presented side by side in accordance with an embodiment of the invention is shown in FIG. 8A. The web page 800 includes a first blog submission 802 arrayed next to a second blog submission 804. The user is provided with a text field 806 in which to write reviews with respect to each blog submission and a next button 808, which effectively discards one of the blog submissions and causes another of blog submission to replace the discarded submission. As the user views the two blog submissions, information 810 is provided concerning the votes that each of the two blog submissions has received. The web page 800 also includes a button 812 that the user can select to provide a blog submission in response to the campaign. Although blog submissions are shown in FIG. 8A, other submissions can be presented. In addition, more than two submissions can be presented side by side.

In the illustrated embodiment, a user can use the "next" buttons 808 to cycle through the submissions responsive to a campaign and ultimately select a favorite submission. In a number of embodiments, a vote is cast separately by the user with respect to the favorite submission. In several embodiments, the comparison process involves the automatic casting of preferential votes with respect to the viewed submissions.

In several embodiments, web pages presenting submissions in a side by side view also provide mechanisms for a user to add a submission to a favorites list and/or add the submission to a watch list. When a user adds a submission to a watch list, the user is associated with the submission in a database within the online marketing platform and the user is notified when predetermined events occur with respect to the submission. In a number of embodiments, the user is notified, when a new submission is submitted in response to the campaign in which the submission being watched is entered. In several embodiments, the user is notified when a predetermined number of new submissions have been submitted in response to the campaign. In other embodiments, other criteria are used to determine whether to send a notification and the user can specify the nature of the notification (e.g. Instant Message, or email).

Reviewing

Figure 8B:
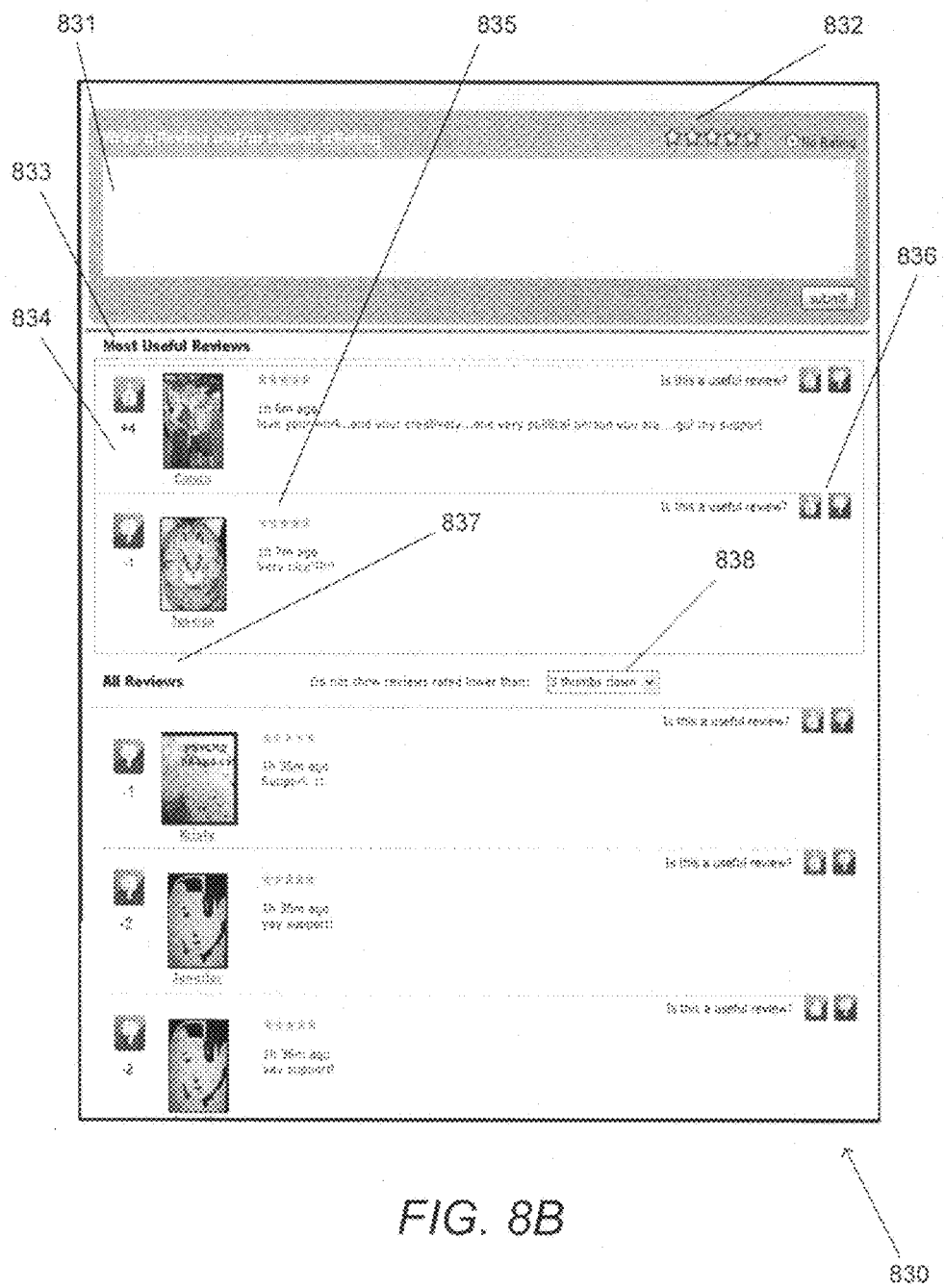
FIG. 8B is a screen shot of a web page showing reviews that have been peer rated in accordance with an embodiment of the invention.

As discussed above, users can provide reviews with respect to other user's submissions. In several embodiments, the reviews include information identifying the reviewer, a comment and/or a rating. In other embodiments, reviews can involve additional information including links to other submissions, other campaigns, other submissions in other campaigns and/or other web sites. In addition, reviews can be threaded to associate reviews that deal with similar subject matter. In a number of embodiments, a peer review system is used to filter meaningless or negative reviews. Under the peer review system, a user can rate the usefulness of another user's review. The most useful reviews can then be displayed and in a number of embodiments contribute more to a submission's engagement score than reviews that are not useful to other users. In some embodiments the creator can select their favorite reviews posted with respect to a submission, which can drive more engagement and interaction. In several embodiments, reviews are rated using an up or down vote. In a number of embodiments, reviews are rated by assigning a number of stars or a numerical value to the usefulness of the review. A screen shot including a list of reviews and a mechanism for voting on the usefulness of the reviews is shown in FIG. 8B. The screen shot 830 shows a web page including a text box 831 in which a review can be entered and a rating mechanism 832 that can be used to rate submissions. Below the text box is a short list 833 of the most useful reviews that have already been provided. Each review includes a rating 834, which in the illustrated embodiment is the net number of "thumbs up" and "thumbs down" that have been assigned to a review. The review itself includes a rating 835 of the submission and an associated comment. A mechanism 836 is provided to enable the user to express his or her own opinion with a "thumbs up" or a "thumbs down".

Below the list of most useful reviews, a list 837 of other reviews is presented in accordance with one of a number of criteria that can be selected form a pull down menu 838. In a number of embodiments, the pull down menu enables a user to limit the displayed reviews to reviews with a rating of at least one "thumb down", at least two "thumbs down", at least three "thumbs down" or all remarks. In other embodiments, other mechanisms can be used for peer rating of reviews and/or the display of peer rated reviews that result in the higher, rated reviews being displayed more prominently.

Awards

In a number of embodiments, users and/or individual pieces of content can receive awards. The awards can be provided on a periodic basis within a campaign and can be based on user nominations. In several embodiments, awards are automatically awarded based upon the number of user nominations. In a number of embodiments, a user is automatically informed when he or she is nominated for an award and/or receives an award. In many embodiments, the awards can be for characteristics such as, but not limited to, the "funniest" submission, the most "artistic" submission, etc. In several embodiments, the awards are displayed in conjunction with a user's profile or in association with the submission that received the award. In many embodiments, a web page displaying of submissions to a campaign can also include images of submissions that recently received awards. In a number of embodiments, the awards are simply a form of recognition as opposed to prizes that provide the winner with some benefit other than recognition. In many embodiments, the awards include a prize.

Viral Distribution

Viral distribution of submissions can lead to significant engagement with campaigns. Online marketing platforms in accordance with many embodiments of the invention use recommendations and propagation to achieve distribution of a submission. The direct recommendation of a submission from one user to another user is often referred to as peer-to-peer distribution resulting in the spread of viral activity throughout the internet. Propagation is an example of one-to-many viral distribution. In other embodiments, other peer-to-peer and/or one-to-many viral distribution techniques can be utilized to increase engagement with a submission and/or a campaign.

Recommendations

In many embodiments, recommendations are used to virally propagate submissions. Recommendations are typically a message from one user to another user drawing the recipient's attention to a submission. In many instances, a recommendation includes a mechanism for linking the recipient to the submission. In a number of embodiments, the recommending user simply presses a button located on the web page on which the user viewed or accessed the submission. The button causes a user interface to be generated enabling a message to be sent to another user containing information concerning the submission. In several embodiments, users copy and paste a URL provided in conjunction with the submission into an email or text message that is then sent to another user. The recipient can use the URL to access the submission. In other embodiments, other mechanisms are used for sending messages to a recipient that enable the recipient to access a submission identified within the message.

Propagation of Submissions

Figure 9A:
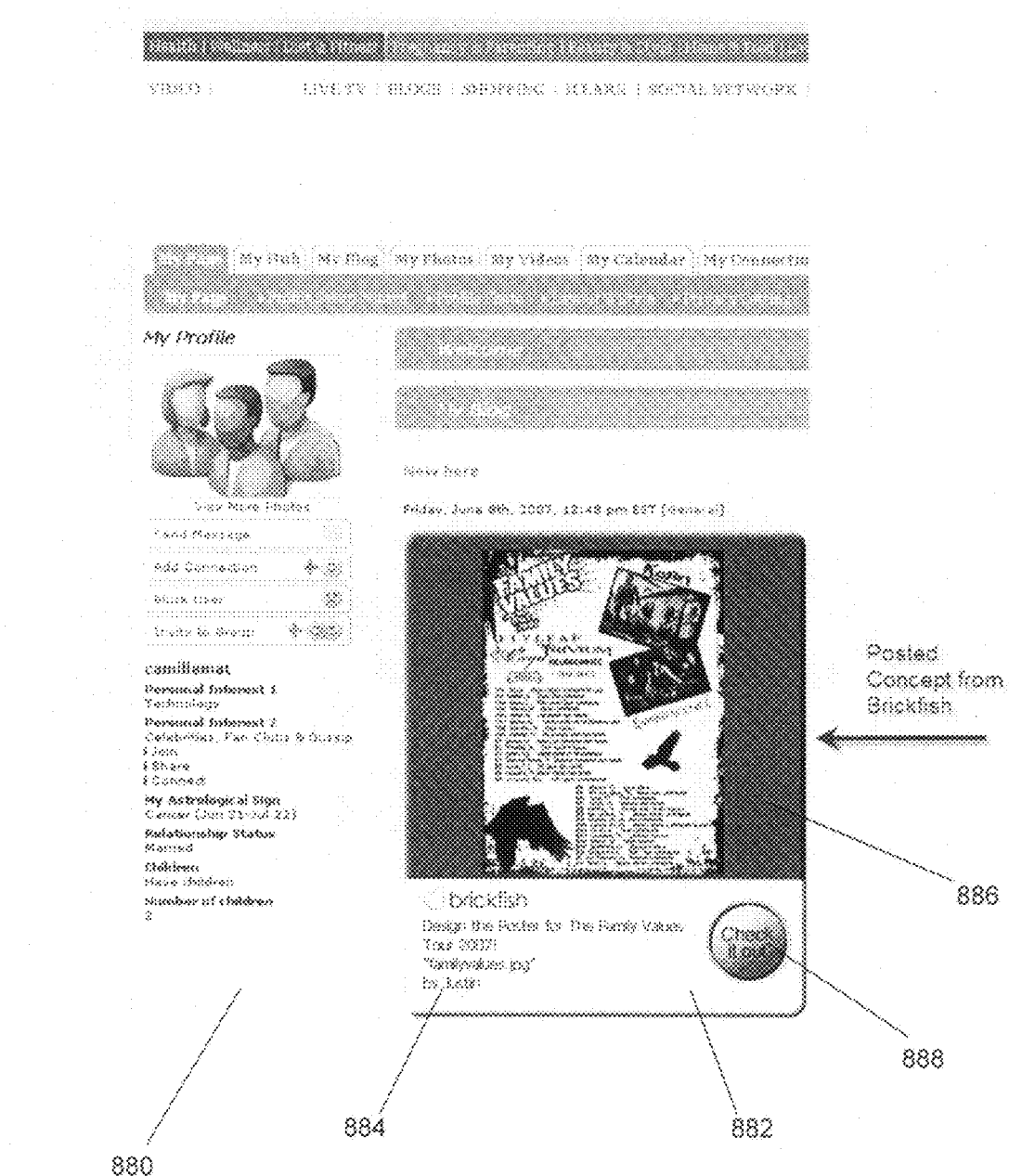
FIG. 9A is a screen shot of a web page including a propagated submission in accordance with an embodiment of the invention.
Figure 9B:
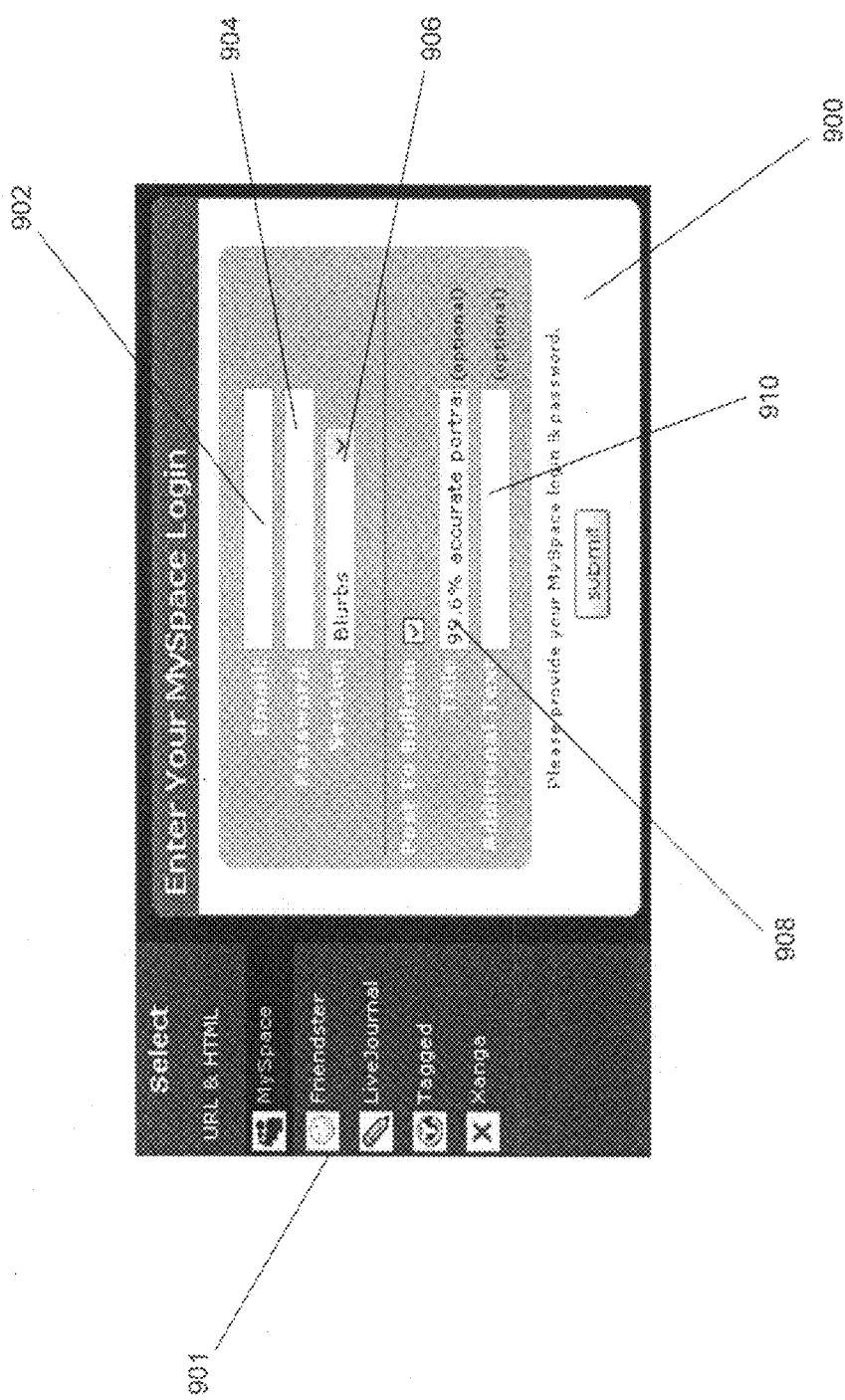
FIG. 9B is a screen shot of a web page including a form that enables the automatic propagation of a submission to an online campaign in accordance with an embodiment of the invention.

Online marketing platforms in accordance with embodiments of the present invention can enable the propagation of submissions to a wide range of web sites on the Internet. A screen shot of a web page in accordance with an embodiment of the invention that includes' a propagated submission is shown in FIG. 9A. The screen shot shows a web page 880 that includes information 882 about a submission to a campaign. The submission information 882 includes but is not limited to text 804 concerning the submission, which in the illustrated embodiment indicates that the campaign is "Design the Poster for The Family Values Tour 2007", the name of the submission is "familyvalues.jpg" and the display name of the person that posted the submission is "Justin". A display name is often the first name of the submitter however often times members create other display names and monikers. The submission information also includes an image 886 drawn from the submission and a link 888 that can be used by an appropriately configured web browser to navigate to the web site that is hosting the campaign in order to view the submission in its entirety. In other embodiments, other portions of a submission are included in the submission information displayed on a propagated website. When a submission includes audio and/or video, propagated web sites in accordance with embodiments of the invention can display a clip of the audio and/or video. Mixed media submissions, which will allow for the display of blog and photo related media in addition to audio files, can also be propagated to other web sites. Such mixed media submissions are represented in a manner that conveys the multiple aspects of the content of the submission. Users who view a propagated concept on another website can also virally distribute that content A portal server in accordance with an embodiment of the invention can provide a web page to a guest or member of the site that includes a form requesting information enabling propagation of a submission to another web site. A screen shot of a form in accordance with an embodiment of the invention is shown in FIG. 9B. The form 900 includes a selection of web sites (not limited to those shown) to which the submission can be propagated 901 and a series of fields in which information can be entered to enable the propagation of the submission to the selected web site. In the illustrated embodiment, the fields include a field for an email address or associated user login id 902, a field for a password 904 to the selected site, a section 906 indicating where the propagated submission should be posted on the propagated web site, a title 908 and a field for entry of additional text 910. In other embodiments, other fields can be provided to obtain information required to post display information on the selected web site.

Figure 10:
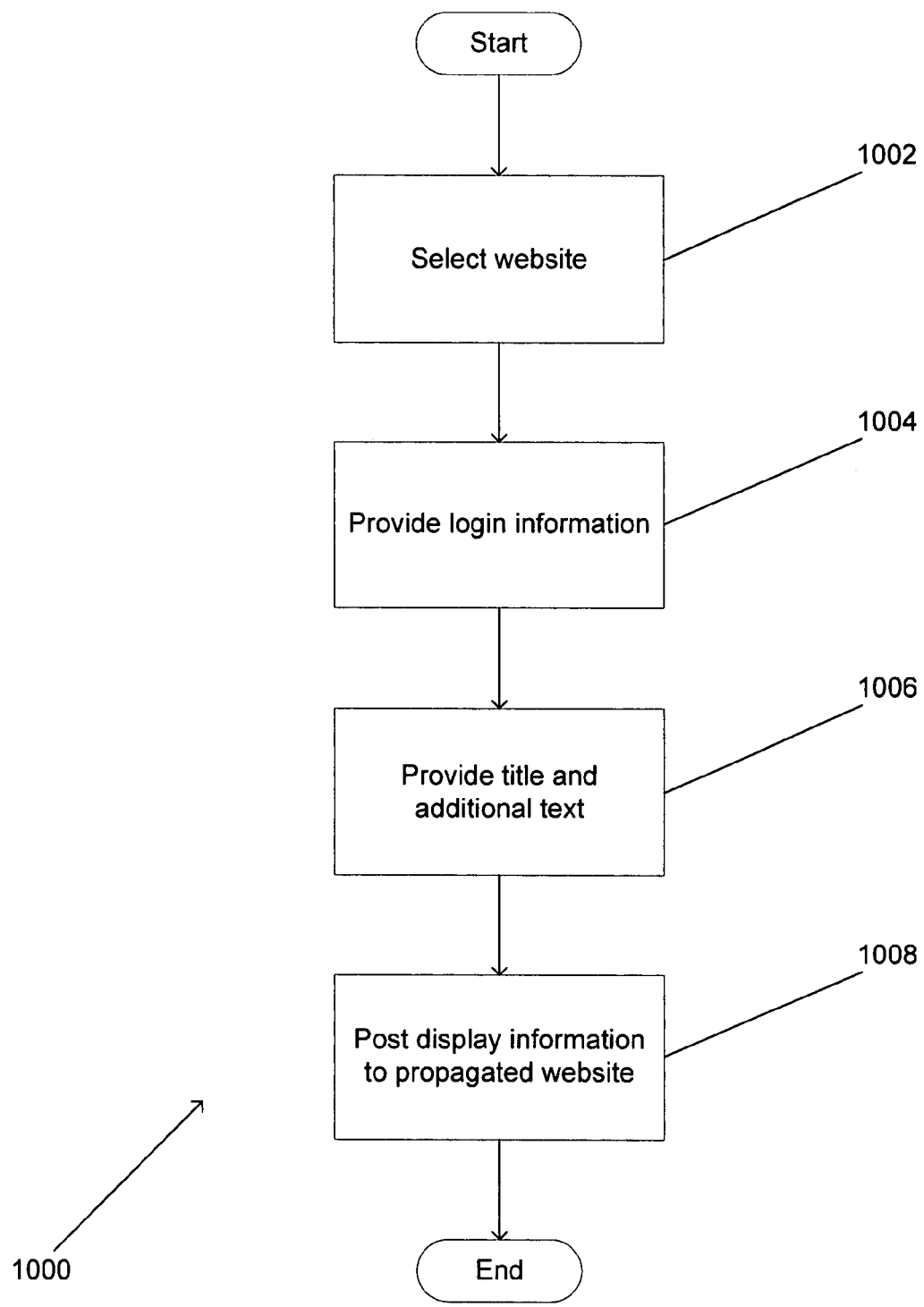
FIG. 10 is a flow chart showing a process for propagating a submission to a remote web site in accordance with an embodiment of the invention.

A process for propagating a submission to a web site is shown in FIG. 10. The process 1000 includes selecting a web site (1002) from a list of possible web sites, providing (1004) login information that will enable an application server to automatically log into the website and post the submission to an identified portion of the web site, provision (1006) of information about the submission and posting (1008) of the display information to the propagated website. As indicated above, the posting is typically performed by an application server. While the embodiment shown in FIG. 10 is a generalized example of a process that can be used to post display information to a web site in order to propagate a campaign submission, other processes in accordance with embodiments of the invention can be used that are customized to the requirements of specific web sites for the posting of display information to the web site. In a number of embodiments, additional information and/or other types of information concerning the propagated submission can be collected and incorporated into the information posted on the propagated web site.

Figure 11:
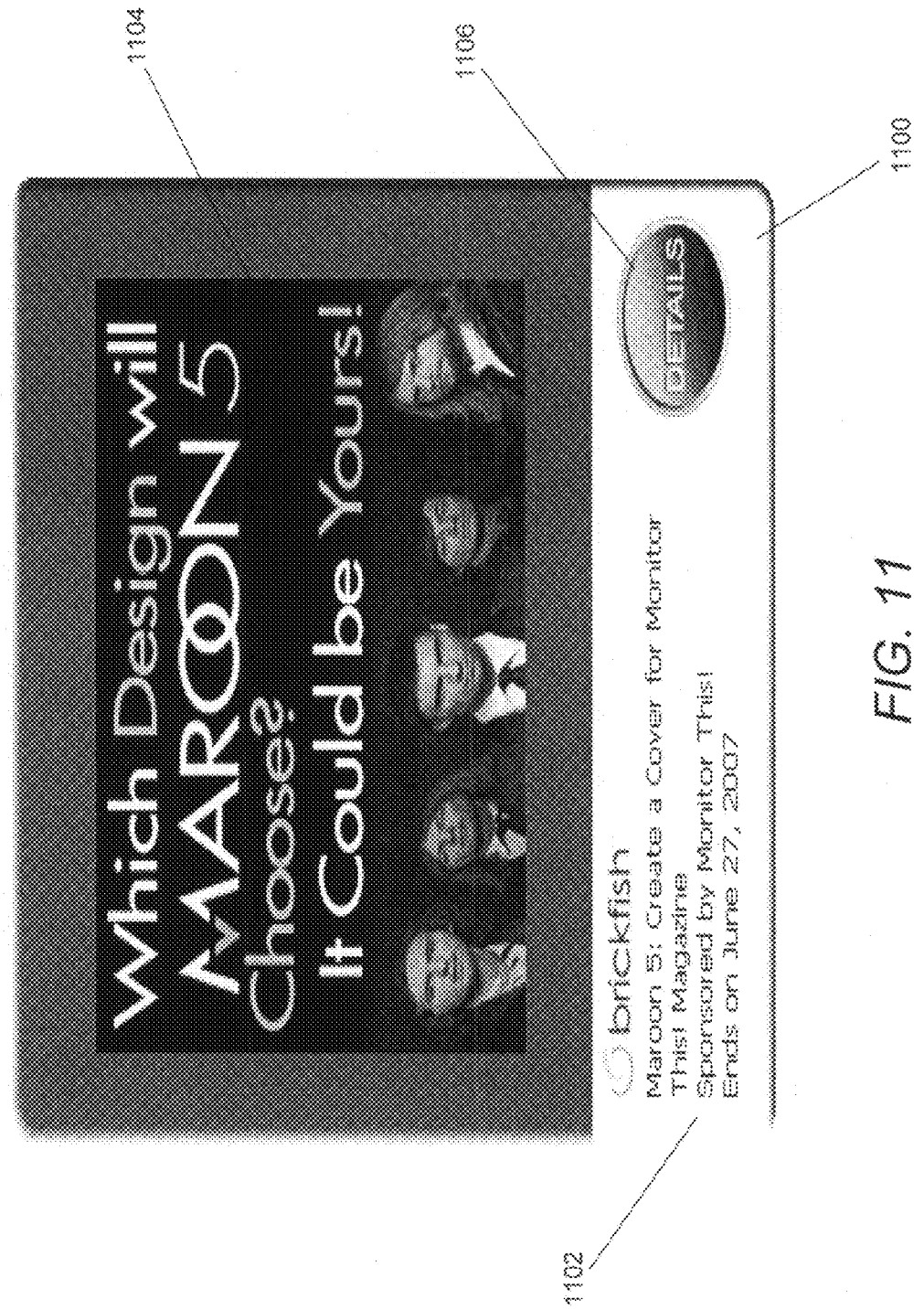
FIG. 11 is a screen shot of a web page including a propagated campaign in accordance with an embodiment of the invention.

While much of the discussion above has focused on the propagation of a single submission, many embodiments of the invention enable the propagation of more than one submission and/or propagation of an entire campaign. A screen shot of a propagated campaign in accordance with an embodiment of the invention is shown in FIG. 11. The screen shot shows the propagated campaign 1100, which includes text concerning the campaign 1102, an image associated with the campaign 1104 and a link 1106 to the campaign web site. In the illustrated embodiment, the text associated with the campaign includes the title of the campaign "Maroon 5: Create a Cover for Monitor This! Magazine" and information concerning the creator of the campaign (i.e. "Monitor This!"). The text also includes the date upon which the campaign ends (i.e., Jun. 27, 2007). The image 1104 shows an image that is associated with the campaign. In many embodiments, the image is a single image. In other embodiments, the image is a combination of a campaign image and other images, such as several high ranking submissions. In many embodiments, the submissions are displayed as an automatic slideshow of images. In a number of embodiments, the submissions are displayed as a flip book that a user can control. As indicated above, the display information determines the manner in which various pieces of information retrieved from the portal server concerning a submission are displayed. For example, the display information can identify audio and/or video to display. In addition to a user originating a propagated item from an online marketing platform users who view this propagated concept on other sites and networks, for example MySpace may perform a secondary propagation of that item to another web site, which can ignite the viral spread of the concept throughout the internet.

The display information used to propagate a submission is stored in the database at the time of submission or creation of the campaign. The propagation player code (i.e. everything except the data fields) is stored on one of the servers, which is typically an application server. The display information that is posted on the syndicated web site to generate a display similar to that show in FIG. 11 references the propagation player code and the required media assets and other information stored in the database.

Notification of Winners

In many embodiments, campaigns such as surveys do not include winners. In other embodiments, such as campaigns that include rewards, the campaign can include winners. When a campaign that includes winners is completed, the winners of the campaign can be automatically notified by an online marketing platform in accordance with embodiments of the invention. In several embodiments, the manner of the notification is determined by the user responsible for the winning submission. For example, a user can choose to receive notification via email, text message, instant message, RSS feed, and/or browser or desktop widgets.

Other Notifications

In many embodiments, users can receive a variety of other notifications from an online marketing platform. In several embodiments, users can select to receive alerts concerning new campaigns. In a number of embodiments, the alerts are categorized by media type. In addition, alerts can be based on the time left in a campaign. Alerts can also be generated by a recommendation engine. The recommendation engine could recommend campaigns and/or submissions that the recommendation engine determines are likely to be of interest to a user based upon the user's previous engagement with the online marketing platform. In addition to the alerts described above, users can receive alerts concerning a change in status of one of the user's campaign entries, concerning the attainment of a particular standing, concerning the submission of a predetermined number of new entries in a campaign, concerning and/or the viral propagation of a submission Tracking Engagement The ability to track engagement for a campaign can provide information that is extremely valuable to the creator and for the sponsor of the campaign. As discussed above, engagement with a submission and/or a campaign involves communication between a user's web browser and servers within the online marketing platform. These communications can be used to track engagement. In many embodiments, all forms of engagement are tracked including views, scroll overs, accesses, voting, reviews, plays and viral distribution. In many embodiments, additional forms of engagement are tracked. As will be discussed further below, quantifying engagement enables reports to be provided to campaign creators concerning the reach of the campaign and the engagement of users with the campaign. Quantifying the engagement also enables owners of online marketing platforms to charge for access to the platform on a cost-per-engagement (CPE) basis. Both reporting and marketing arrangements involving CPE are discussed further below.

Tracking Viral Distribution

Tracking viral distribution can provide valuable information concerning engagement with a campaign. As discussed above, a user's engagement with a campaign or submission involves communication with at least one of the servers within the online marketing platform. This is also true, when a user virally distributes a submission and/or campaign. These communications can be used to track information concerning viral distribution of a campaign throughout the Internet.

Tracking Recommendations

In many embodiments, recommending a submission to another user via the messaging functionality provided within an online marketing platform can be tracked. The message itself causes an action within the online marketing platform and the action can be associated with the submission page from which the message action was taken. In instances where the recommendation is manual and involves the inclusion of a URL from the submission page in a text message or email to another user. The recipient's subsequent access of the submission using the URL provided on the submission page enables the online marketing platform to detect that a recommendation has occurred. In other embodiments, other techniques can be used for tracking recommendations.

Tracking Propagated Content

Propagation of submissions or other information arising from the campaign or the campaign itself to other web sites enables visitors to the propagated web site to engage with a campaign without visiting the website that is hosting the campaign. In many embodiments of the invention, propagation of submissions and campaigns and engagement with propagated submissions and campaigns are tracked.

Figure 12:
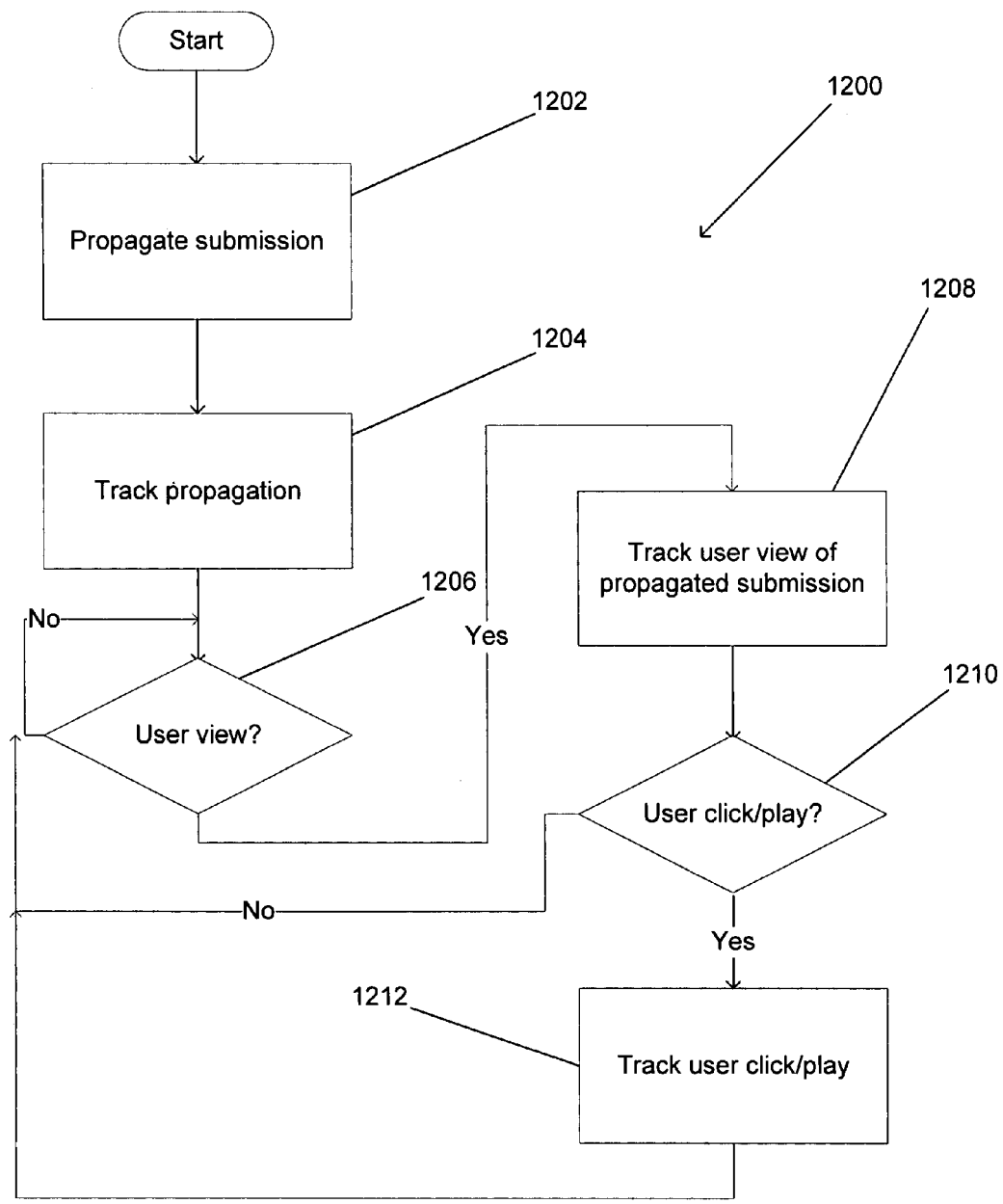
FIG. 12 is a screen shot of a process for tracking user engagement in accordance with an embodiment of the invention.

A flow chart showing a process for tracking events associated with the propagation of a submission and/or a campaign in accordance with an embodiment of the invention is shown in FIG. 12. The process 1200 includes propagating (1202) a submission and tracking (1204) the act of propagation. In many embodiments, the information that is tracked when propagation occurs is the specific submission that was propagated, the site to which it was propagated, the date of the propagation and the member that propagated the submission (if known). In other embodiments, other information is tracked.

Once the submission has been propagated, user views are detected (1206). In many embodiments, visiting a propagated site generates a request to a portal server within the online marketing platform for information associated with the propagated submission. The request is based upon the display information posted on the propagated web site. The request itself is, typically generated by an appropriately configured user computer or member device and includes a request for information specified in a Uniform Resource Locator (URL) contained within the display information. In many embodiments, the request can take other forms capable of obtaining specific information from a remote server. When a portal server receives such a request, the portal server can track (1208) that a user view has occurred irrespective of where on the internet the view has occurred. In a number of embodiments, the information tracked includes the submission that was viewed, the full URL of the web site where the propagated submission was viewed, the date and/or time when the submission was viewed, and the IP address of the device that was used to view the propagated submission. In other embodiments, other information associated with the user view can be tracked.

Once the view of a propagated submission has been tracked, the process determines (1210) whether selection has occurred. A user viewing the propagated submission can select a submission by clicking on the submission. In embodiments where the propagated submission includes an audio and/or video clip, selection can lead to playing the audio and/or video clip. The selection of a propagated submission typically results in the generation of a request by the user's computing device for information from a portal server within the online marketing platform. Therefore, when a user selection of a propagated submission is detected, the selection is tracked (1212). In many embodiments the information that is tracked in response to a user selection includes, the submission that was selected, the URL of the web site where the propagated submission was selected, the date and/or time when the submission was selected, and the IP address of the device that was used to select the propagated submission. In other embodiments, other information associated with a user selection can be tracked.

In many embodiments, the tracking of user views and user selections continues in the manner outlined above until the campaign ends. In other embodiments, the online marketing platform continues to track user views and user selections following the completion of a campaign. Although a specific process is shown in FIG. 12, other embodiments of the invention use other processes to track propagation and engagement with propagated campaigns and/or submissions.

Campaign Reporting

As discussed above, many online marketing platforms in accordance with embodiments of the invention track engagement of members, visitors and guests of the online marketing platform with respect to campaigns and with respect to individual campaign submissions. The collected tracking information can be analyzed to provide valuable information to the creator of one or more campaigns concerning the type of engagement that occurred during the campaign. In a number of embodiments of the invention, portal servers are configured to provide reports concerning engagement with one or more campaigns.

Figure 13:
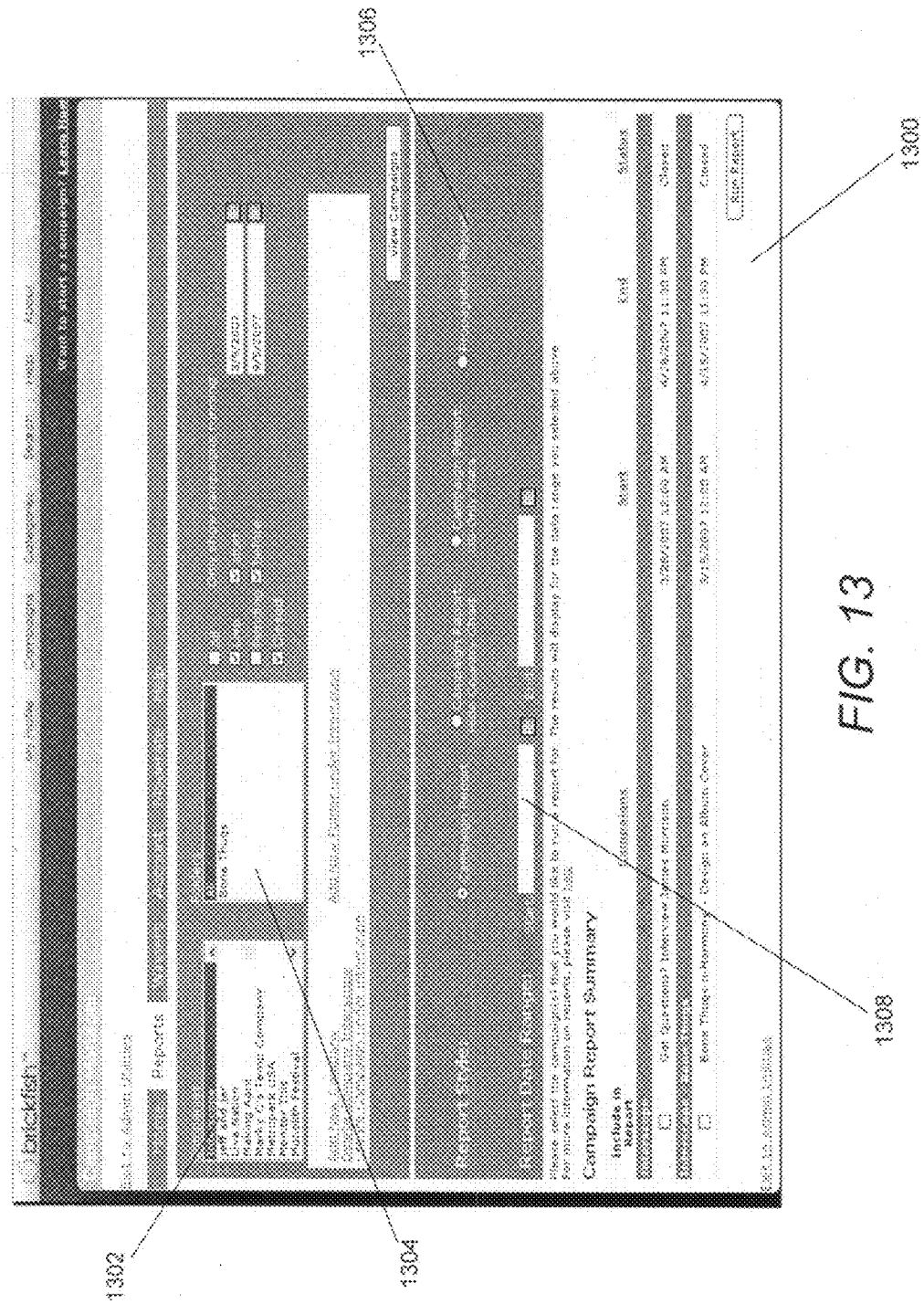
FIG. 13 is a screen shot of a web page that provides a user interface to a campaign creator enabling the generation of reports concerning one or more campaigns in accordance with an embodiment of the invention.

A screen shot showing a user interface that can be used to request the generation of one of a number of reports in accordance with an embodiment of the invention is shown in FIG. 13. The user interface 1300 includes a list 1302 of companies, a list 1304 of the campaigns associated with a selected company, a selection 1306 of report styles, selections 1308 of date ranges and a list 1310 of the campaigns that can be analyzed in the generation of a report. In other embodiments, user interfaces providing other options can be used to facilitate report generation.

The user interface illustrated in FIG. 13 provides permission-based access to campaign reports. Only specific roles within the system (i.e. campaign creators and certain administrators) have access to the user interface and the ability to generate reports. Most roles, for example campaign creators, are also restricted to accessing only those companies, folders, and campaigns to which they have been granted access. As one example, an advertising agency can be a campaign creator or administrator. The advertising agency has access to an account that includes a list of the companies represented by the agency and that organizes the campaigns created by the agency according to the company with which the campaign is associated.

As indicated above, the user interface shown in FIG. 13 provides the ability to specify the information that is to be included in a campaign report. In many instances, information from multiple campaigns can be included in a single report, custom date ranges can be provided, and the campaign report can be limited based upon geographic region. One such demographic filter is the ability to generate a campaign report that compares engagement of users within the United States of America with engagement of users outside of the United States of America.

An example of a report in accordance with an embodiment of the invention is shown in FIGS. 14A-14G. The campaign report 1400 includes information concerning the campaign 1402, information concerning the submissions that received the highest number of votes during the campaign 1404, an engagement score 1406 and a breakdown of campaign views 1408.

In a number of embodiments, reports can be generated that include statistics concerning engagement broken down according to such actions as voters, viewers, reviewers, contestants, as wells as votes, views, clicks, reviews and submissions. Information tracked by the online marketing platform concerning members can also be used to provide breakdowns of engagement based on age, gender and geography. Information tracked concerning the IP address of user devices engaging with the campaign can also be used to provide broader geographic information for both members and guests. A report showing statistical breakdowns in relation to different forms of engagement in accordance with an embodiment of the invention is shown in FIG. 14B, which includes various graphical representations of the breakdown of reviews, views and votes. In other embodiments, other categories of engagement can be shown in a report using any variety of text, tables and/or graphical representation techniques.

In many embodiments, separate data is provided in relation to propagation activity. Reports relating to propagation can include information relating to propagated submissions including the type of propagation (whether the submission was propagated by manually posting a URL onto a web page or automatically propagated by an application server in response to a user request), statistical summaries of posts, views and click-throughs from external sites, and examples of most-viewed and most-posted submissions. Information concerning propagation is shown in FIGS. 14C-14F, which includes a table of statistics associated with views of viral propagated campaigns and submissions. The statistics detail the sites to which the campaign and/or submissions were propagated, the percentage of views associated with automated propagations, the percentage of views associated with manual propagations, propagated views with respect to the total numbers of views, the number of clicks and the number of posts. In other embodiments, other statistics concerning engagement associated with propagation of a campaign can be included in a report such as text, tables and/or graphical representations such as charts. In many embodiments, a detailed viral report is compiled that contains information concerning viral activity, links to propagated content and/or engagement both from within the online marketing platform and from propagated or syndicated servers for a single submission or all submissions to the campaign. Excerpts from a detailed viral activity report are shown in FIGS. 15A-15D.

Figure 14A:
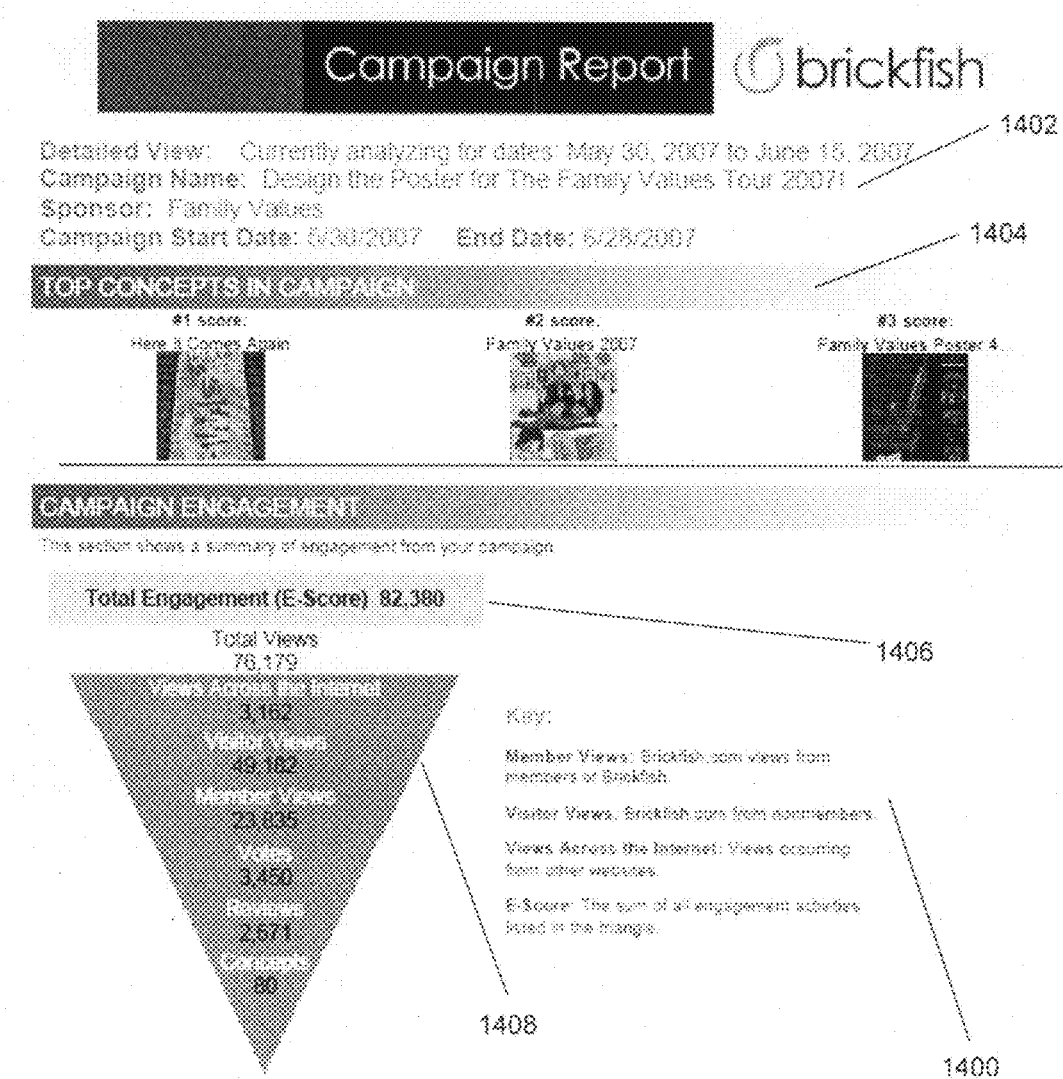
Figure 14B:
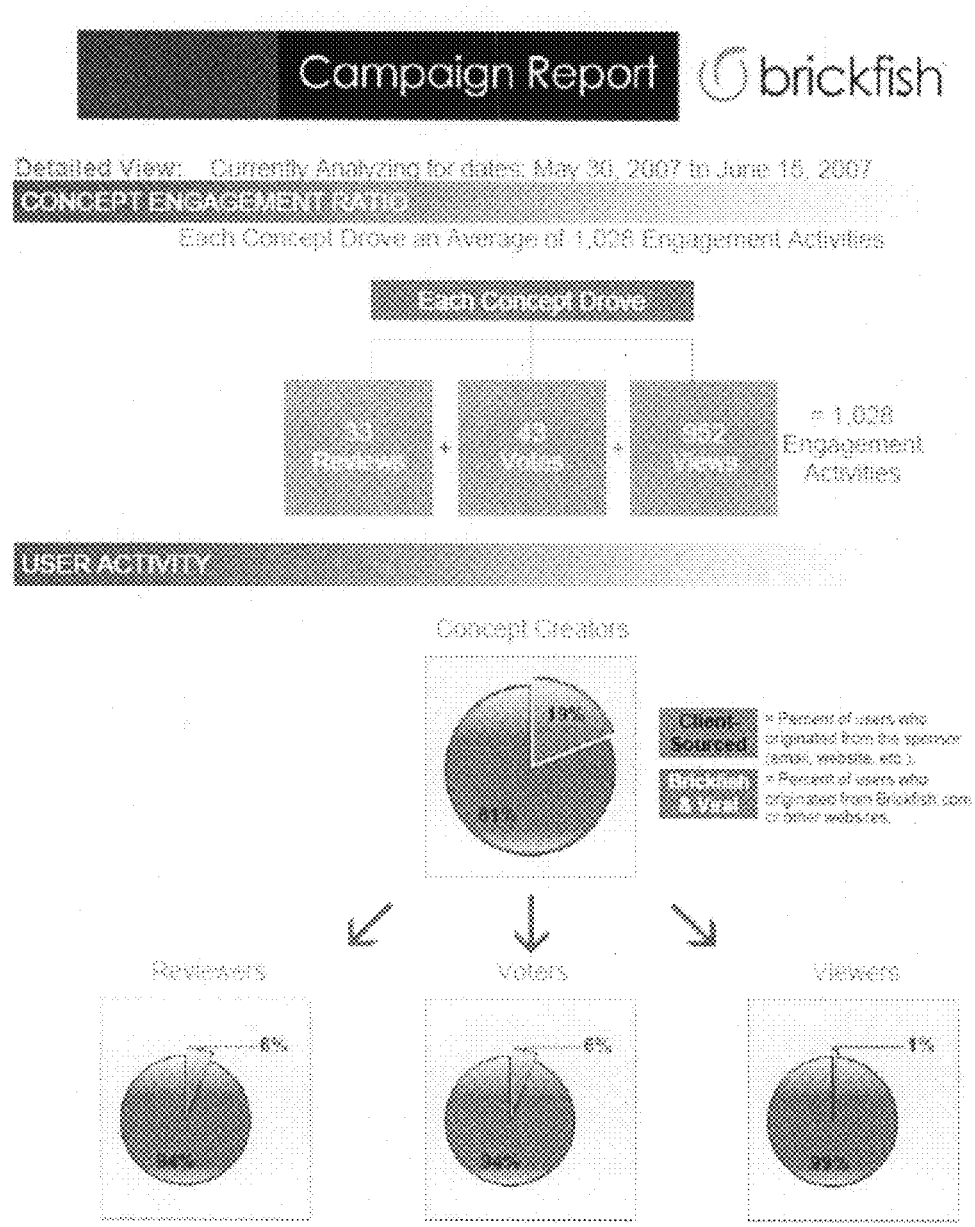
Figure 14C:
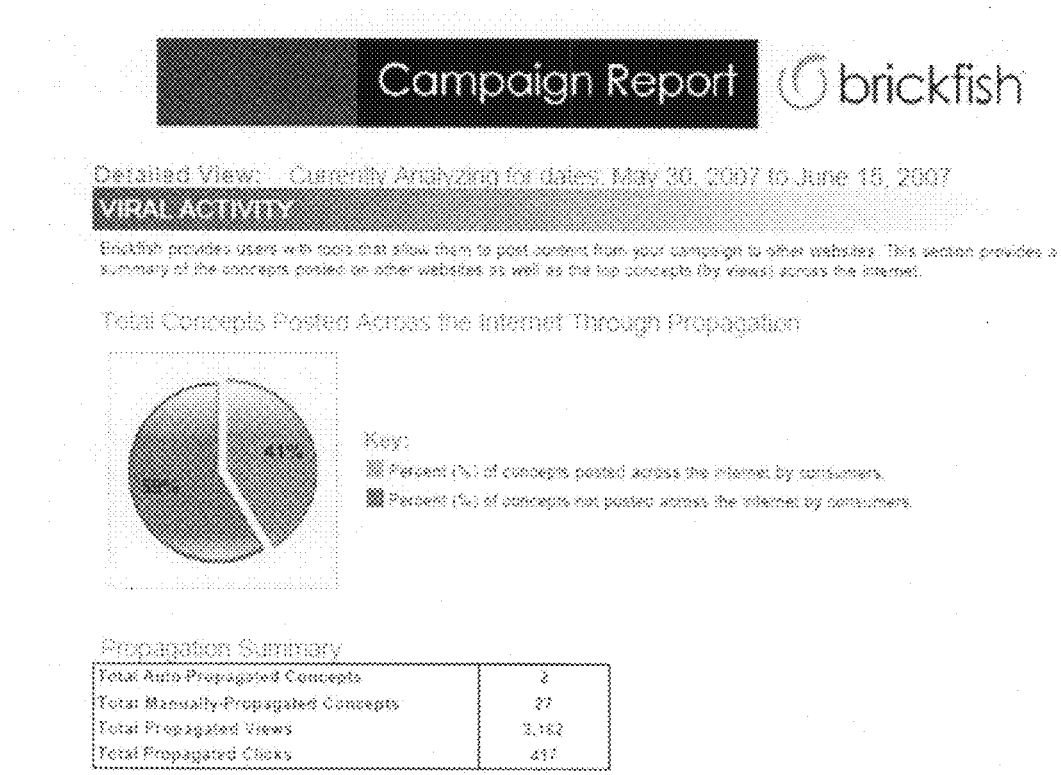
Figure 14D:
Figure 14E:
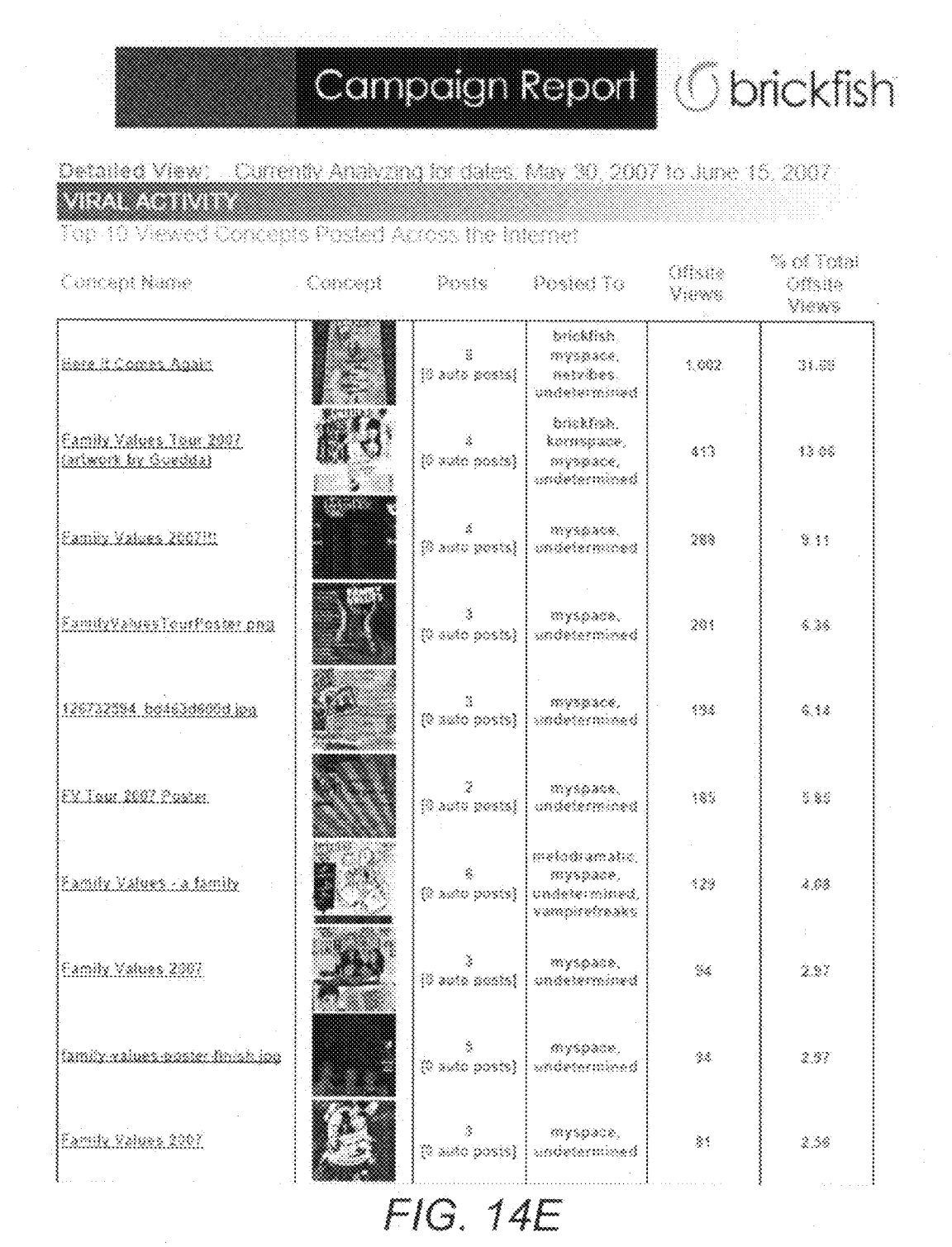
Figure 14G:
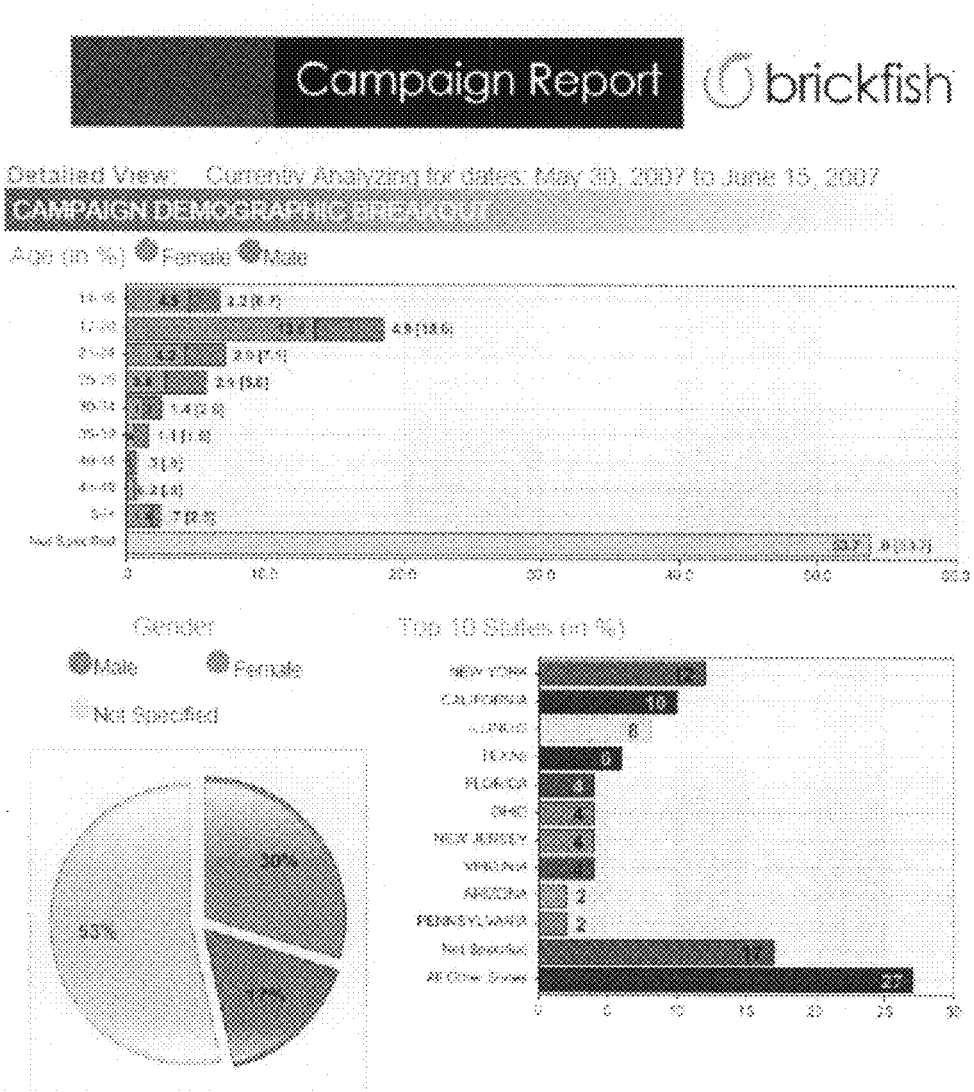
Figure 15A:
Figure 15A:
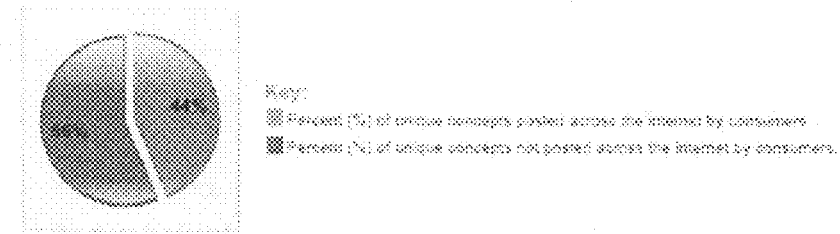

Referring back to the report shown in FIGS. 14A-14G, online marketing platforms in accordance with embodiments of the invention are capable of generating reports that break down engagement based upon information ascertainable concerning a user. In many embodiments, statistics are provided concerning engagement by different classes of users (e.g. members, guests, and/or visitors). In several embodiments, demographic statistics are provided that use user profiles to relate engagement information with demographic information. Statistics concerning engagement based on user class and user demographic are shown in FIGS. 14F and 14G. In other embodiments, reports are generated including statistics that are broken down according to ascertainable attributes of users.

Figure 16:
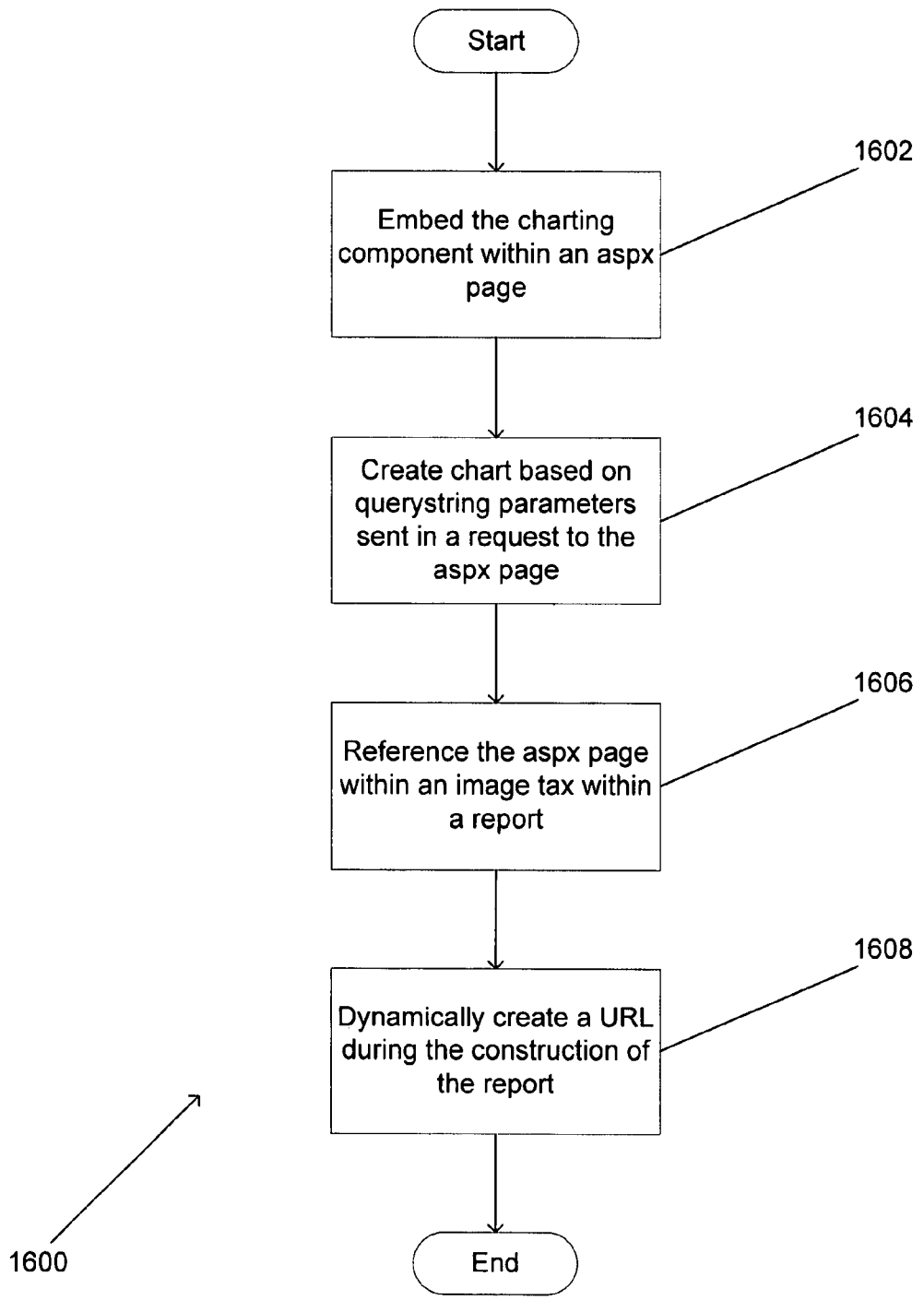
FIG. 16 is a flow chart showing a process for generating a chart that can be streamed to a campaign creator viewing a web page containing a report in accordance with an embodiment of the invention.

Many of the reports discussed above include graphs that are generated on the fly and can be streamed to campaign computers. A process in accordance with an embodiment of the invention for generating a chart within a farm of portal servers in accordance with an embodiment of the invention is shown in FIG. 16. The process 1600 includes embedding (1602) the charting component within an aspx page, creating (1604) a chart based on a querystring including parameters that are sent in the request to the aspx page, referencing (1606) the aspx page within the src attribute of an image tag within the report, and during the construction of the report, dynamically creating (1608) a URL that includes the necessary querystring values from the database. The process shown in FIG. 16 enables each chart to be streamed as a separate image request while including the charts in a single web page in the same manner in which requests to any other set of images in a page would be handled. In a number of embodiments, a software application such as .Netcharting distributed by Corporate Web Solutions Ltd. Of Vancouver, Canada is used in the implementation of streamed charts.

In addition to generating reports that can be displayed on a campaign computer, many embodiments of the invention include the capability to generate reports in the form of a "pdf" file, which is readable by Adobe Reader of Adobe Systems Incorporated of San Jose, Calif. In several embodiments, other file types can be generated.

CPE Based Marketing Arrangements

The ability to track engagement enables operators of online marketing platforms to enter into marketing arrangements in accordance with embodiments of the invention where a fee is paid based on the level of engagement with a particular campaign. As can readily be appreciated the forms of engagement considered in calculating the fee and the weighting applied to different forms of engagement are aspects of a CPE based marketing arrangement that can be negotiated. Systems and methods for providing CPE based marketing are discussed in U.S. patent application entitled "Content Distribution System Including Cost-Per-Engagement Based Advertising" to Rose et al., filed Jul. 24, 2007, the disclosure of which is incorporated above by reference in its entirety.

Syndication of a Campaign

The creator of a campaign can syndicate a campaign to a web site that is unrelated to the servers hosting the campaign. Syndicating a campaign can drive traffic on a web site to a specific campaign without the need to direct the traffic away from the syndicated web site. The syndicated campaign appears to the user to be part of the syndicated site. As a result of syndication, a syndicated site can host campaigns without the need to incur the expense of implementing a platform to host the campaign. The "Powered by" model allows companies to enjoy all of the benefits and features of the online marketing platform and drive traffic to their own website.

Figure 17:
FIG. 17 conceptually illustrates a web page including a syndicated campaign within an iFrame in accordance with an embodiment of the invention.

A screen shot of a syndicated web site in accordance with an embodiment of the invention is shown in FIG. 17. The screen shot 1700 includes an upper banner area 1702 that is a region that can contain any information desired by the syndicated web site. The screen shot 1700 also includes a lower portion 1704 that contains information concerning a campaign. Much of the same functionality that is provided when a user accesses a campaign directly from a portal server is provided to viewers that view a campaign syndicated into a syndicated web site. As an example, the syndicated web site includes links 1706 that enable a user to create an account to become a member of the online marketing platform hosting the campaign and/or sign into the online marketing platform. The user can also navigate through the syndicated portion of the web site as if the user were navigating through web pages provided directly by the portal server hosting the campaign.

In many embodiments, the contents of the lower portion of the screen are determined by an iFrame incorporated into the web site. The iFrame typically includes a URL that enables a user computer or member device to obtain information concerning a campaign from a portal server within the online marketing platform. The information obtained by the user computer or member device is then displayed as part of the syndicated web site. In many embodiments, the iFrame has a predetermined size. In several embodiments, the iFrame must be at least 1000×800 pixels. In other embodiments, the iFrame has a width of 1024 pixels or is not limited in size.

Figure 18:
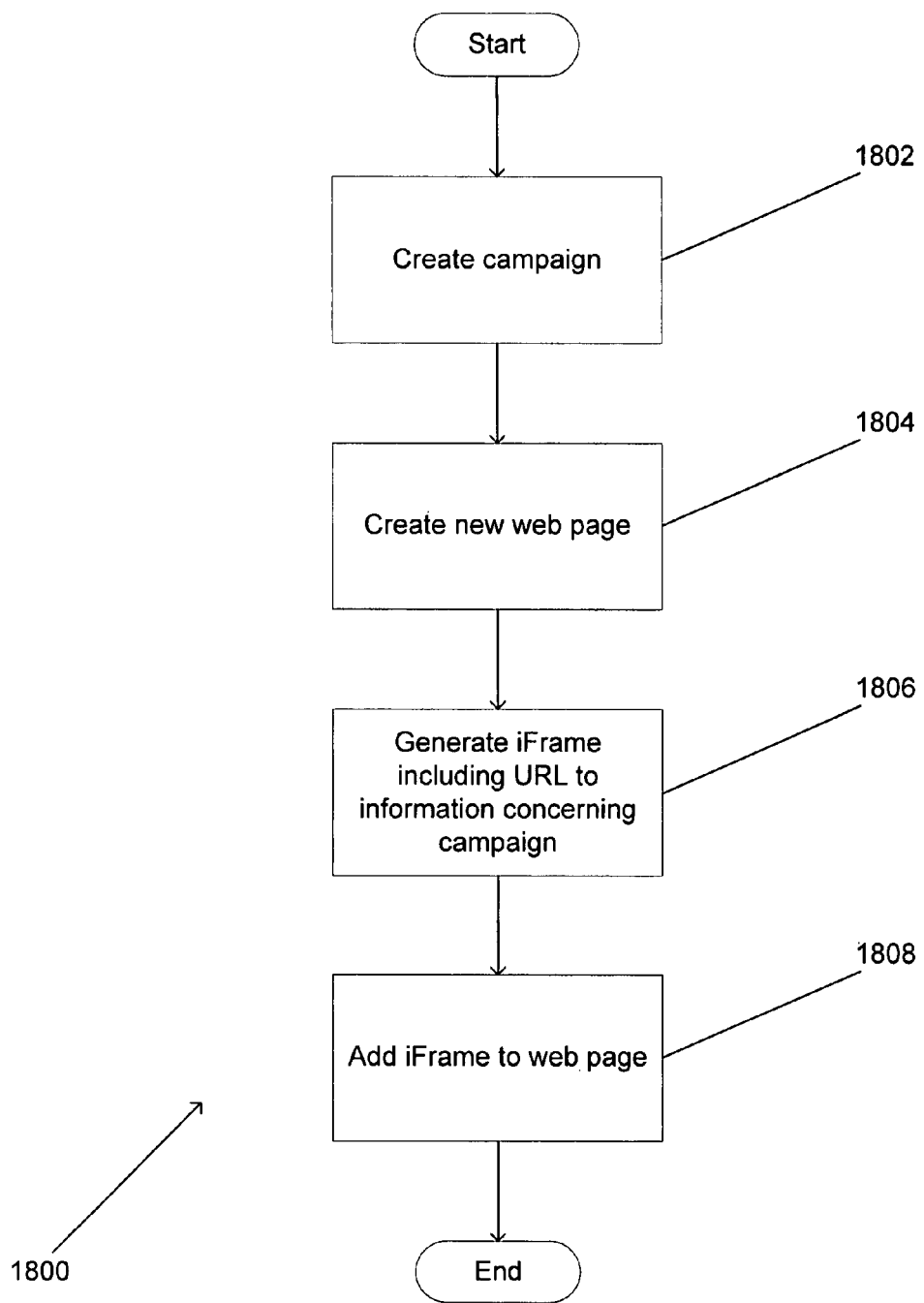
FIG. 18 is a flow chart showing a process for automatically syndicating an entire campaign to a remote server in accordance with an embodiment of the invention.

A process for syndicating a campaign to a web site in accordance with an embodiment of the invention is shown in FIG. 18. The process 1800 includes creating (1802) a campaign, creating (1804) a new web page, generating (1804) an iFrame that identifies desired information concerning a campaign and adding (1806) the iFrame to the new web page. In a number of embodiments, the process of adding the generated iFrame to a web page is performed manually. In other embodiments, the creator of the campaign provides information enabling the automatic addition of the iFrame to a specified web page. An iFrame in accordance with an embodiment of the invention is shown in FIG. 19.

Online Communities

Many embodiments of online marketing platforms in accordance with embodiments of the invention include associated online communities. The term "online community" is a term used to describe a group of active members of a web site. Participants can be viewers or visitors to the online marketing platform and not require any acknowledgement (guest or registered member) in order to perform view engagement activities. In many instances, an online community can also embrace participation by "guests" (i.e. users that have not established a user profile within the community). In several embodiments, the creation of an online community is facilitated by providing the ability for visitors to a web site to join as members of the site. As part of the membership, users are often provided with the opportunity to create a customized profile that can be viewed by other users of the web site. In a number of embodiments, the user profile includes demographic information that can be used to break down user engagement by demographic. When the user is logged into the online marketing platform using the user's profile, actions performed by the user on the site, such as providing submissions in response to a campaign, messaging other users and providing comments or ratings, can be associated with the user's profile. In a number of embodiments, active participation in an online community is rewarded.

Campaign Manager

Online marketing platforms in accordance with a number of embodiments of the invention include web based user interfaces for managing one or more campaigns. A web page generated by a campaign manager application in accordance with an embodiment of the invention is shown in FIG. 13. The web page shown in FIG. 13 is a page that a campaign generator can provide to a campaign creator interested in generating a report concerning one or more campaigns. Screen shots of various web pages generated by a campaign manager application in accordance with an embodiment of the invention are shown in FIGS. 20A-20 E.

Figure 20A:
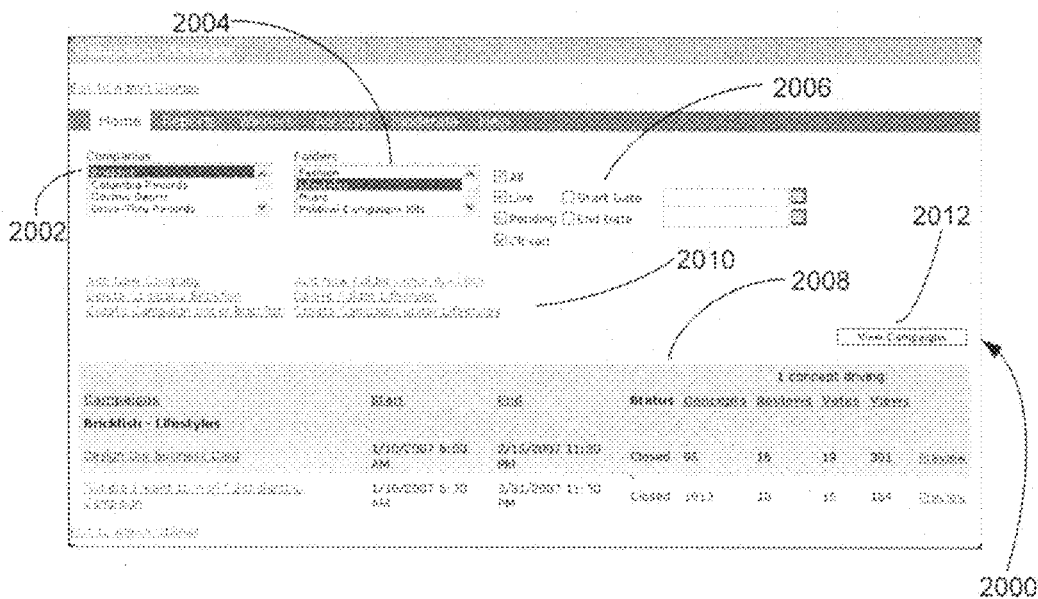
FIGS. 20A-20E show screen shots of a web pages generated by a campaign manager application in accordance with an embodiment of the invention.
Figure 20B:
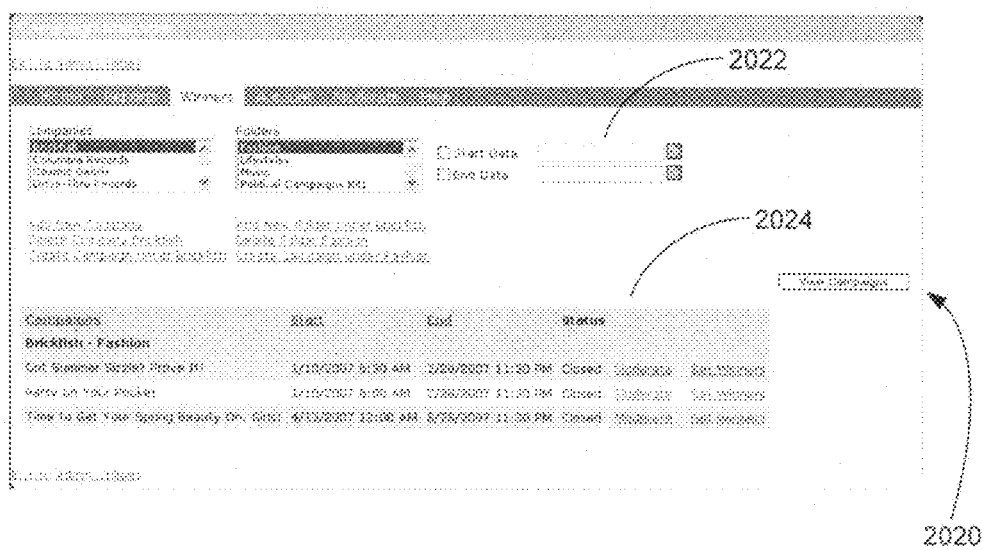
Figure 20C:
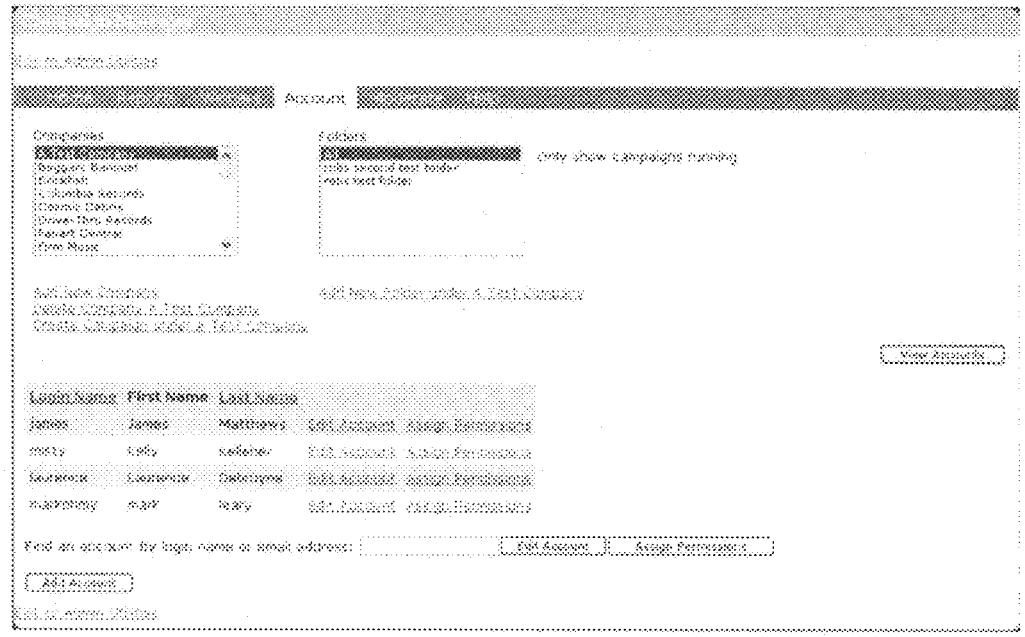
Figure 20D:
Figure 20E:
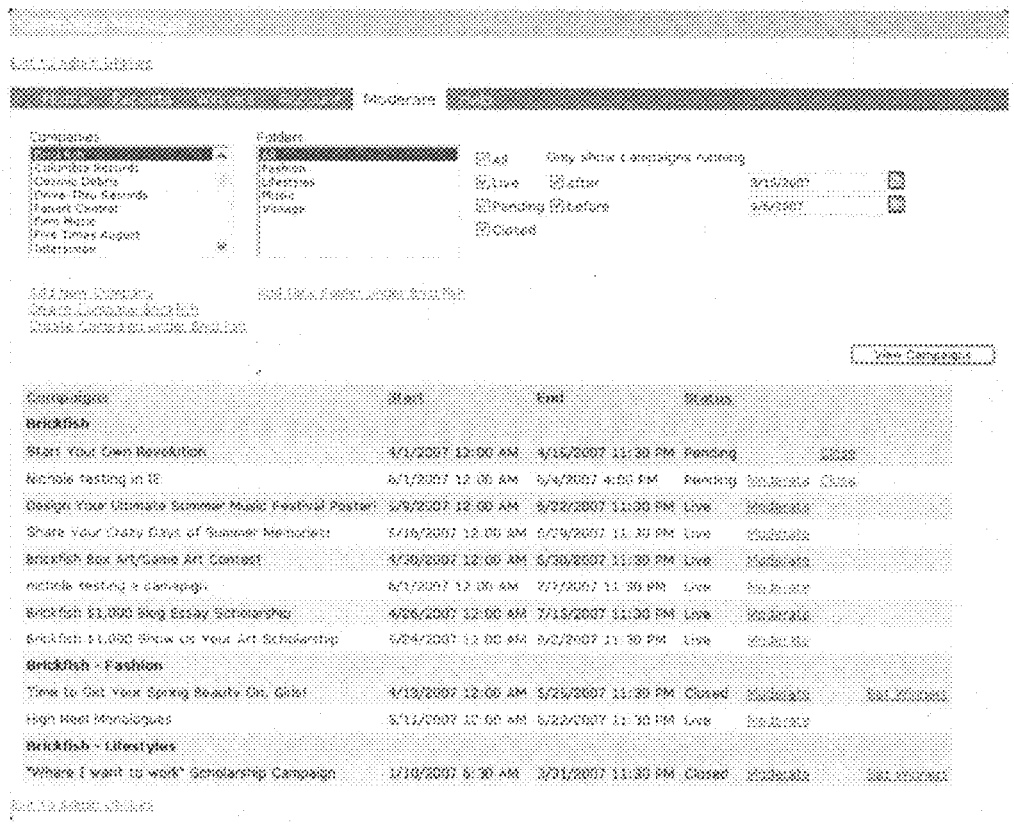

A screen shot showing a web page that lists all of the campaigns managed by a campaign creator is shown in FIG. 20A. The web page 2000 includes a list 2002 of the companies or sponsors represented by the campaign creator and a list 2004 of campaign types. The two lists can be used to filter the campaigns displayed to the campaign creator. In addition to the lists, a group of check boxes 2006 are also provided to further limit the campaigns shown to the campaign creator. In the illustrated embodiment, the check boxes enable selection of all campaigns, live campaigns, pending campaigns, closed campaigns, and/or campaigns based on start date and/or end date. The campaigns identified by the various criteria expressed in the lists and check boxes are presented in a list 2008.

In addition to presenting a list of campaigns, the web page 2000 includes links that enable modification of information concerning the companies represented by a campaign creator and that enable the creation of new campaigns. The web page also includes a button 2012 that enables the campaign creator to view listed campaigns.

Many embodiments of campaign manager applications in accordance with embodiments of the invention track and/or set winners of campaigns, manage permissions afforded to users that can access the campaign creator's account and moderate campaigns. Examples of web pages generated by a campaign manager application in accordance with an embodiment of the invention that provide a user interface for performing each of these functions are shown in FIGS. 20B-20E.

Moderation of Content

Figure 21:
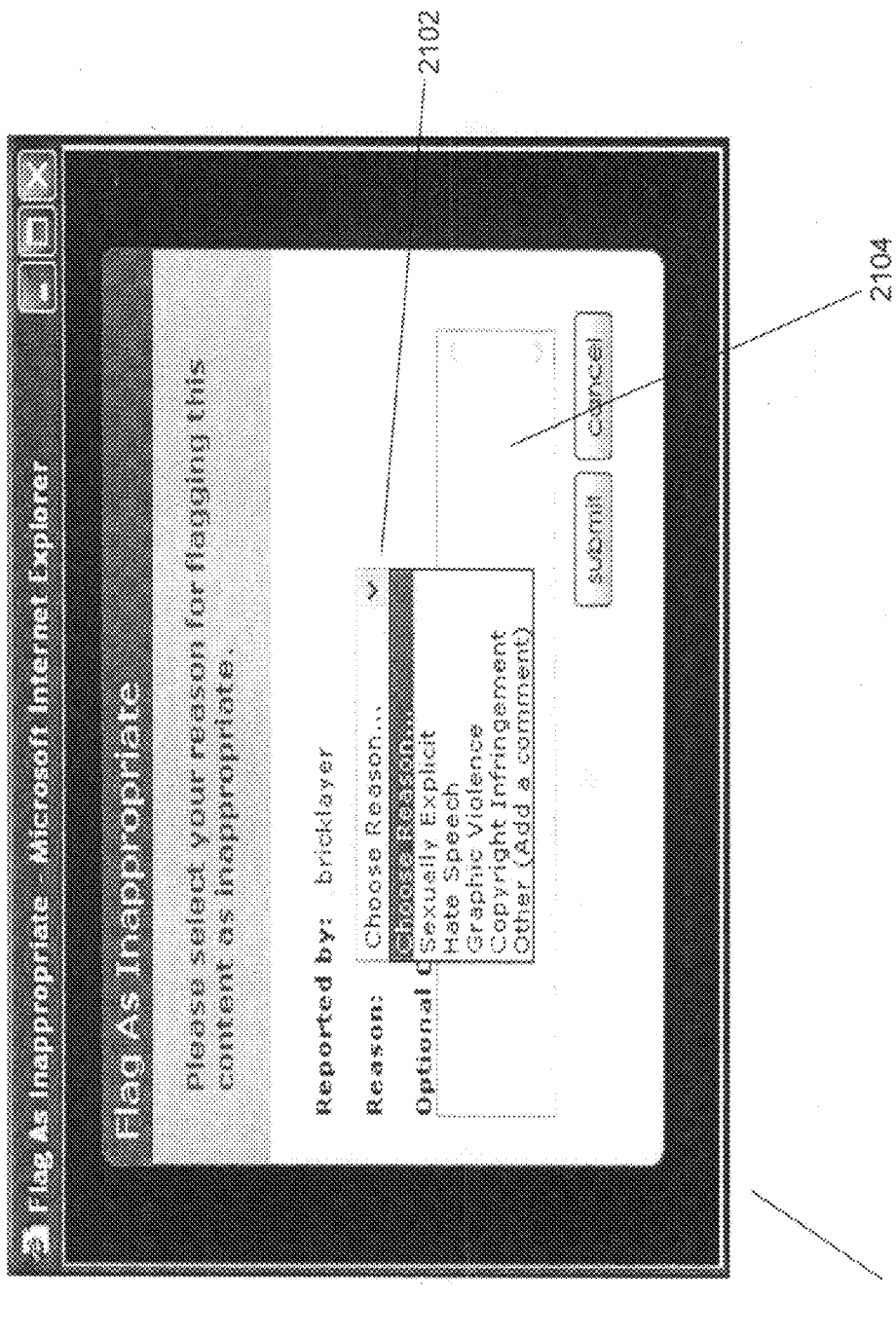
FIG. 21 is a screen shot of a user interface enabling flagging of inappropriate content in accordance with an embodiment of the invention.

A problem commonly encountered within online communities is the need to moderate behavior within the community to ensure that offensive behavior is restricted. Many embodiments of the invention include mechanisms enabling members and guests to flag submissions that they believe inappropriate. A screen shot of a user interface enabling the flagging of inappropriate submissions in accordance with an embodiment of the invention is shown in FIG. 21. The screen shot 2100 includes a pull down menu 2102 from which a user can select a reason for flagging the submission. The screen shot also shows a text box 2104 in which a user can place a comment relating to the reason for flagging the submission. The user interface shown in FIG. 21 is designed for simplicity. Providing a simple interface for flagging submissions encourages users to flag submission as opposed to simply navigating away. In other embodiments, other mechanisms for flagging submissions can be provided.

Figure 22:
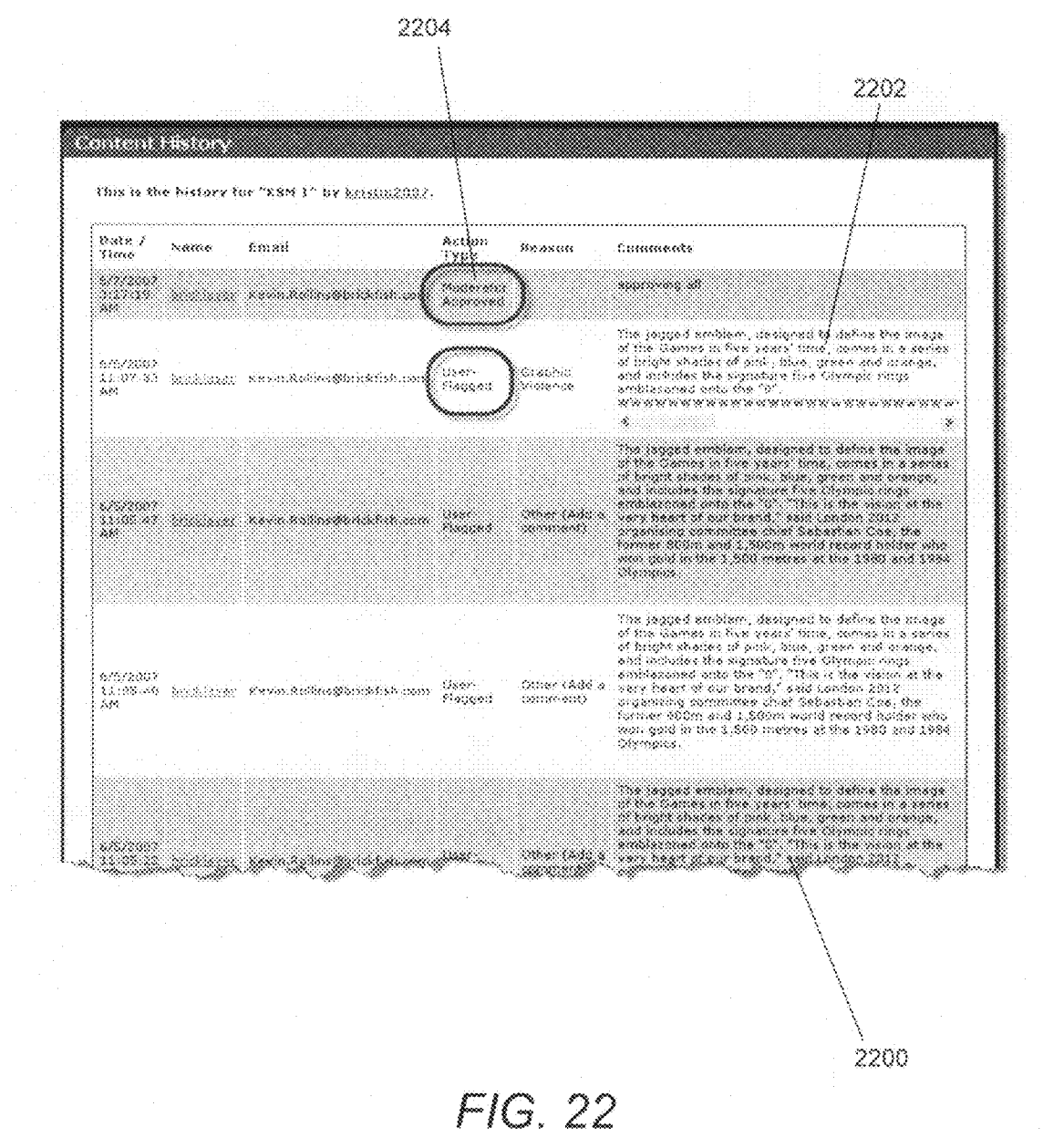

Many online marketing platforms in accordance with embodiments of the invention include the ability to generate reports concerning the history of a submission. A partial screen shot of a report in accordance with an embodiment of the invention is shown in FIG. 22. The report includes a list of instances 2202 in which users have flagged submissions and actions 2204 taken by moderators. The report can be used by moderators to quickly review objections to a submission and to make a determination concerning whether the submission should be removed from the campaign. The ability of the online marketing platform to generate a report concerning the history of a submission can be extremely useful when dealing with members irate at a submission being present on the system or at a submission being removed from the system.

In many embodiments, any member of the site can be granted moderation privileges. In this way, moderation of campaigns can be performed by campaign creators. The moderation privileges may be simple privileges such as approving a specific submission. Moderators associated with the online marketing platform can possess more extensive privileges including the removal of submission from the platform. In a number of embodiments, the moderation privileges are divided amongst members and administrators. In other embodiments, only the platform's administrators have moderation privileges.

Figure 23:
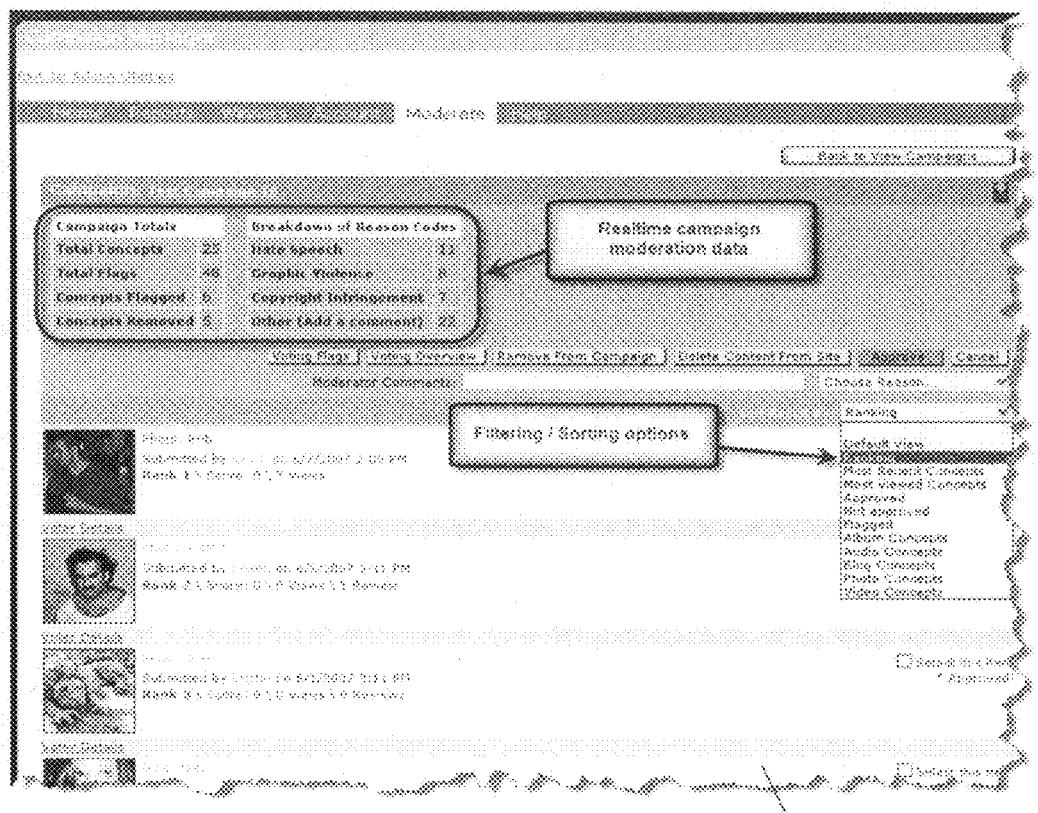
FIG. 23 is a screen shot of a web generated by a campaign manager application showing a summary of real time moderation activities with respect to a campaign in accordance with an embodiment of the invention.

In several embodiments, a user interface is provided that enables a moderator to monitor submissions to a specific campaign. An annotated partial screen shot of a user interface in accordance with an embodiment of the invention is shown in FIG. 23. The user interface 2300 enables sorting and filtering of submissions based on a variety of criteria including whether the submission has been flagged, approved or not approved. The user interface also includes statistics concerning the moderation of the campaign. In addition to the user interface shown in FIG. 23, online marketing platforms in accordance with embodiments of the invention can generate moderation reports similar to the report shown in FIG. 24. Reports 2400 of the type shown in FIG. 24 provide information concerning all submissions to a campaign and not simply the moderation history of a single submission, as is the case in FIG. 22. The report in FIG. 24 shows a comparison of the moderation history of a number of campaigns 2402. The report compares the number of submissions 2404, and the different moderation activities performed in relation to the submissions 2406 and the different moderation actions performed in relation to other activities associated with participation in the online community 2408 (such as blogs, photos, video, audio etc.). In addition to a comparison, the report also identifies the moderator responsible for a particular campaign 2410 and the time that has elapsed since the moderator last reviewed the campaign 2412. As can be appreciated the nature of the user interface provided to moderators and the reports generated based upon moderation activity are typically dependent upon the requirements of the moderators engaged in regulating campaigns.

While the above description contains many specific embodiments of the invention, these should not be construed as limitations on the scope of the invention, but rather as an example of one embodiment thereof. Accordingly, the scope of the invention should be determined not by the embodiments illustrated, but by the appended claims and their equivalents.

What is claimed is:
1. An online marketing platform, comprising:
a campaign hosting system including a database used to create a social networking environment for an associated online community, where the campaign hosting system is connected to a network;
a campaign creation device connected to the network; and
a plurality of user devices connected to the network;
wherein the campaign creation device is configured to provide campaign information to the campaign hosting system via the network;
wherein the campaign hosting system is configured to automatically create an online campaign within the social networking environment that is customized according to the campaign information and to store the campaign as one of a plurality of online campaigns in the database;
wherein the campaign is a solicitation for a response to an idea;
wherein at least one of the user devices is configured to provide profile information to the campaign hosting system via the network and the campaign hosting system is configured to store the profile information in the database to create a user profile within the social networking environment;
wherein each user device is configured to engage with the online campaign within the social networking environment;
wherein each user device is configured to access the user profile within the social networking environment;
wherein at least one user device is configured to provide user generated content in the form of media to the campaign hosting system via the network for posting within the social networking environment as a response to the campaign, and the campaign hosting system is configured to store the user generated content in the database in a way that associates the user generated content with the campaign and the user profile of the user that submitted the user generated content;
wherein the at least one user device is configured to access the user generated content within the social networking environment;
wherein a winner of the campaign related to the user generated content is determined using the server system;
wherein the server is configured to transmit propagation information via the network;
wherein the server is configured to receive requests for information concerning the propagated user generated content via the network; and
wherein the server and the database are configured to track the requests for information.

2. The online marketing platform of claim 1, wherein the media is an image, an album of images, audio, a series of audio, video, a series of videos, a blog, a series of blog entries, a mashup, or a series of mashups.

3. The online marketing platform of claim 1, wherein:
at least one user device is configured to communicate a vote for the user generated content to the campaign hosting system via the network;
the campaign hosting system is configured to add the vote to a vote tally for the user generated content and to store the vote tally in the database in a way that associates the vote tally with the user generated content; and
at least one user device is configured to access a real-time vote tally for the user generated content by communicating with the campaign hosting system via the network.

4. The online marketing platform of claim 1, wherein:
at least one user device is configured to provide a rating of the user generated content to the campaign hosting system via the network;
the campaign hosting system is configured to store the rating in the database in a way that associates the rating with the user generated content; and
at least one user device is configured to access the rating by communicating with the campaign hosting system via the network.

5. The online marketing platform of claim 4, wherein the rating is a score.

6. The online marketing platform of claim 1, wherein:
at least one user device is configured to provide a review of the user generated content to the campaign hosting system via the network;
the campaign hosting system is configured to store the review in the database in a way that associates the review with the user generated content; and
at least one user device is configured to access the review by communicating with the campaign hosting system via the network.

7. The online marketing platform of claim 6, wherein:
at least one user device is configured to provide a rating of the review to the campaign hosting system via the network;
the campaign hosting system is configured to store the rating of the review in the database in a way that associates the rating with the review; and
at least one user device is configured to access the rating of the review by communicating with the campaign hosting system via the network.

8. The online marketing platform of claim 7, wherein the rating of the review is a score.

9. The online marketing platform of claim 1 wherein:
at least one user device is configured to provide an award nomination for the user generated content to the campaign hosting system via the network;
the campaign hosting system is configured to store the award nomination in the database in a way that associates the award nomination with the user generated content; and
at least one user device is configured to access the award nomination by communicating with the campaign hosting system via the network.

10. The online marketing platform of claim 9, wherein:
the campaign hosting system is configured to provide awards to the user generated content and record the award in the database in a way that associates the award with the user generated content; and
at least one user device is configured to access the award by communicating with the campaign hosting system via the network.

11. The online marketing platform of claim 1, wherein:
at least one user device is configured to provide messages addressed to the user profile to the campaign hosting system via the network;
the campaign hosting system is configured to store the message in the database in a way that associates the message with the user profile; and
at least one user device is configured to provide access to a user profile and retrieve messages addressed to the user profile.

12. The online marketing platform of claim 1, wherein:
at least one user device is configured to provide an award nomination for a user profile to the campaign hosting system via the network;
the campaign hosting system is configured to store the award nomination in the database in a way that associates the award nomination with the user profile; and
at least one user device is configured to access the award nomination by communicating with the campaign hosting system via the network.

13. The online marketing platform of claim 12, wherein:
the campaign hosting system is configured to provide awards to the user profile and record the award in the database in a way that associates the award with the user profile; and
at least one user device is configured to access the award by communicating with the campaign hosting system via the network.

14. The online marketing platform of claim 1, wherein:
at least one user device is configured to provide access information concerning a remote server to the campaign hosting system via the network; and
the campaign hosting system is configured to use the access information to propagate the user generated content to a web page hosted by the remote server.

15. The online marketing platform of claim 14, wherein the user device is configured to access the user generated content via the remote server.

16. The online marketing platform of claim 14, wherein:
the campaign hosting system is configured to propagate the user generated content by inserting HTML code into the web page; and
the HTML code enables information concerning the submission to be retrieved from the campaign hosting system.

17. The online marketing platform of claim 1, wherein:
the campaign creation device is configured to provide access information concerning a remote server to the campaign hosting system; and
the campaign hosting system is configured to use the access information to syndicate the online campaign to a remote server.

18. The online marketing platform of claim 17, wherein the user device is configured to access the online campaign via the remote server.

19. The online marketing platform of claim 17, wherein:
the user device is configured to provide access information concerning the remote server to the campaign hosting platform; and
the campaign hosting platform is configured to use the access information to embed the online campaign within an iframe in a web page hosted by the remote server.

20. The online marketing platform of claim 1, wherein the campaign hosting system is configured to track in real time the engagement of the user devices with the online campaign.

21. The online marketing platform of claim 20, wherein the campaign hosting system is configured to generate a real time engagement score for the online campaign based upon tracked real time engagement.

22. The online marketing platform of claim 20, wherein the campaign hosting system is configured to generate real time reports of the tracked engagement.

23. The online marketing platform of claim 20, wherein the campaign hosting system is configured to track the submission of user generated content.

24. The online marketing platform of claim 23, wherein:
at least one user device is configured to communicate a vote for the user generated content to the campaign hosting system via the network;
the campaign hosting system is configured to add the vote to a vote tally for the user generated content and to store the vote tally in the database in a way that associates the vote tally with the user generated content;
at least one user device is configured to access in real-time the vote tally for the user generated content by communicating with the campaign hosting system via the network; and
the campaign hosting system is configured to track the votes that the user generated content receives.

25. The online marketing platform of claim 23, wherein:
at least one user device is configured to provide a rating of the user generated content to the campaign hosting system via the network;
the campaign hosting system is configured to store the rating in the database in a way that associates the rating with the user generated content;
at least one user device is configured to access the rating by communicating with the campaign hosting system via the network; and
the campaign hosting system is configured to track the average rating that the user generated content receives.

26. The online marketing platform of claim 25, wherein:
at least one user device is configured to provide a review of the user generated content to the campaign hosting system via the network;
the campaign hosting system is configured to store the review in the database in a way that associates the review with the user generated content;
at least one user device is configured to access the review by communicating with the campaign hosting system via the network; and
the campaign hosting system is configured to track the number of reviews that the user generated content receives.

27. The online marketing platform of claim 26, wherein:
at least one user device is configured to provide a rating of the review to the campaign hosting system via the network;
the campaign hosting system is configured to store the rating of the review in the database in a way that associates the rating with the review;
at least one user device is configured to access the rating of the review by communicating with the campaign hosting system via the network; and
the campaign hosting system is configured to track the average rating that the review receives.

28. The online marketing platform of claim 27, wherein the campaign hosting system is configured to generate web pages that display a plurality of reviews ordered according to the average rating of each review.

29. The online marketing platform of claim 23, wherein:
at least one user device is configured to provide an award nomination for the user generated content to the campaign hosting system via the network;
the campaign hosting system is configured to store the award nomination in the database in a way that associates the award nomination with the user generated content;
at least one user device is configured to access the award nomination by communicating with the campaign hosting system via the network; and
the campaign hosting system is configured to track the number of award nominations that the user generated content receives.

30. The online marketing platform of claim 29, wherein:
the campaign hosting system is configured to provide awards to the user generated content and record the award in the database in a way that associates the award with the user generated content;
each user device is configured to access the award by communicating with the campaign hosting system via the network; and
the campaign hosting system is configured to track the number of awards that the user generated content receives.

31. The online marketing platform of claim 23, wherein:
at least one user device is configured to provide messages recommending user generated content to the campaign hosting system via the network; and
the campaign hosting system is configured to track the number of times the user generated content is recommended.

32. The online marketing platform of claim 23, wherein:
at least one user device is configured to provide an award nomination for a user profile to the campaign hosting system via the network;
the campaign hosting system is configured to store the award nomination in the database in a way that associates the award nomination with the user profile;
at least one user device is configured to access the award nomination by communicating with the campaign hosting system via the network; and
the campaign hosting system is configured to track the number of awards that the user profile receives.

33. The online marketing platform of claim 32, wherein:
the campaign hosting system is configured to provide awards to the user profile and record the award in the database in a way that associates the award with the user profile;
at least one user device is configured to access the award by communicating with the campaign hosting system via the network; and
the campaign hosting system is configured to track the number of awards that the user profile receives.

34. The online marketing platform of claim 23, wherein:
at least one user device is configured to provide access information concerning a remote server to the campaign hosting system via the network;
the campaign hosting system is configured to use the access information to propagate the user generated content to a web page hosted by the remote server; and
the campaign hosting system is configured to track the number of times the user generated content is propagated.

35. The online marketing platform of claim 34, wherein:
at least one user device is configured to engage with the user generated content via the remote server; and
the campaign hosting system is configured to track engagement with the user generated content that occurs via the remote server.

36. The online marketing platform of claim 23, wherein:
the campaign creation device is configured to provide access information concerning a remote server to the campaign hosting system;
the campaign hosting system is configured to use the access information to syndicate the online campaign to a remote server; and
the campaign hosting system is configured to track the number of sites to which a campaign is syndicated.

37. The online marketing platform of claim 36, wherein:
at least one user device is configured to engage with the online campaign via the remote server; and
the campaign hosting system is configured to track engagement with the online campaign that occurs via the remote server.

38. The online marketing platform of claim 23, wherein the campaign hosting system is configured to track the geographic location of the user devices that engage with the online campaign.

39. The online marketing platform of claim 38, wherein the campaign hosting system is configured to determine geographic location using information contained within a user profile stored in the database that is associated with the user device engaging with the online campaign.

40. The online marketing platform of claim 38, wherein the campaign hosting system is configured to determine geographic location using an IP address associated with the user device engaging with the online campaign.

41. The online marketing platform of claim 23, wherein the campaign hosting system is configured to track demographic information concerning at least one of the users engaging with the online campaign.

42. The online marketing platform of claim 40, wherein the campaign hosting system is configured to determine demographic information concerning a user engaging with the online campaign by extracting information from a user profile stored in the database that is associated with the user device engaging with the online campaign.

43. The online marketing platform of claim 1, wherein the campaign hosting system is configured to restrict access to the online campaign based upon campaign information provided by the campaign creation device.

44. The online marketing platform of claim 43, wherein the campaign hosting system is configured to restrict access to the online campaign based upon the geographic location of the user device.

45. The online marketing platform of claim 43, wherein the campaign hosting system is configured to restrict access to the online campaign to a defined demographic of users.

46. An online marketing platform, comprising:
a campaign hosting system including a database used to create a social networking environment for an associated online community, where the campaign hosting system is connected to a network;
a campaign creation device connected to the network; and
a plurality of user devices connected to the network;
wherein the campaign creation device is configured to provide campaign information to the campaign hosting system via the network;
wherein the campaign hosting system is configured to automatically create an online campaign within the social networking environment that is customized according to the campaign information and to store the campaign as one of a plurality of online campaigns in the database;
wherein the campaign is a solicitation for a response to an idea;
wherein at least one of the user devices is configured to provide profile information to the campaign hosting system via the network and the campaign hosting system is configured to store the profile information in the database to create a user profile within the social networking environment;
wherein each user device is configured to engage with the online campaign within the social networking environment;
wherein each user device is configured to access the user profile within the social networking environment;
wherein at least one user device is configured to provide user generated content in the form of media to the campaign hosting system via the network for posting within the social networking environment as a response to the campaign, and the campaign hosting system is configured to store the user generated content in the database in a way that associates the user generated content with the campaign and the user profile of the user that submitted the user generated content;
wherein the at least one user device is configured to access the user generated content within the social networking environment;
wherein a winner of the campaign related to the user generated content is determined using the server system
wherein each engagement with the campaign using the server system is tracked in real time;
and
wherein the number of each type of engagement that has occurred using the server system is displayed within the online campaign.

47. The online marketing platform of claim 46, wherein the media is an image, an album of images, audio, a series of audio, video, a series of videos, a blog, a series of blog entries, a mashup, or a series of mashups.

48. The online marketing platform of claim 46, wherein:
at least one user device is configured to communicate a vote for the user generated content to the campaign hosting system via the network;
the campaign hosting system is configured to add the vote to a vote tally for the user generated content and to store the vote tally in the database in a way that associates the vote tally with the user generated content; and
at least one user device is configured to access a real-time vote tally for the user generated content by communicating with the campaign hosting system via the network.

49. The online marketing platform of claim 46, wherein:
at least one user device is configured to provide a rating of the user generated content to the campaign hosting system via the network;
the campaign hosting system is configured to store the rating in the database in a way that associates the rating with the user generated content; and
at least one user device is configured to access the rating by communicating with the campaign hosting system via the network.

50. The online marketing platform of claim 49, wherein the rating is a score.

51. The online marketing platform of claim 46, wherein:
at least one user device is configured to provide a review of the user generated content to the campaign hosting system via the network;
the campaign hosting system is configured to store the review in the database in a way that associates the review with the user generated content; and
at least one user device is configured to access the review by communicating with the campaign hosting system via the network.

52. The online marketing platform of claim 51, wherein:
at least one user device is configured to provide a rating of the review to the campaign hosting system via the network;
the campaign hosting system is configured to store the rating of the review in the database in a way that associates the rating with the review; and
at least one user device is configured to access the rating of the review by communicating with the campaign hosting system via the network.

53. The online marketing platform of claim 52, wherein the rating of the review is a score.

* * * * *